(12) United States Patent
Mitsuya et al.

(10) Patent No.: US 8,351,511 B2
(45) Date of Patent: Jan. 8, 2013

(54) IMAGE PROCESSING APPARATUS AND IMAGE PROCESSING METHOD

(75) Inventors: Koji Mitsuya, Tokyo (JP); Tohru Kurata, Saitama (JP)

(73) Assignee: Sony Corporation, Tokyo (JP)

( * ) Notice: Subject to any disclaimer, the term of this patent is extended or adjusted under 35 U.S.C. 154(b) by 416 days.

(21) Appl. No.: 12/474,892

(22) Filed: May 29, 2009

(65) Prior Publication Data

US 2010/0020244 A1 Jan. 28, 2010

(30) Foreign Application Priority Data

Jun. 2, 2008 (JP) .................. 2008-144157

(51) Int. Cl.
*H04N 7/26* (2006.01)
*H04N 7/32* (2006.01)
*H04N 11/02* (2006.01)

(52) U.S. Cl. ......... 375/240.16; 375/240.12; 375/240.24; 375/240.26

(58) Field of Classification Search ............. 375/240.01, 375/240.16, 240.24
See application file for complete search history.

(56) References Cited

U.S. PATENT DOCUMENTS

| | | | | |
|---|---|---|---|---|
| 2007/0025444 A1* | 2/2007 | Okada et al. | ............ | 375/240.16 |
| 2007/0140591 A1* | 6/2007 | Kurata | ............ | 382/278 |
| 2007/0297694 A1* | 12/2007 | Kurata | ............ | 382/284 |
| 2009/0263044 A1* | 10/2009 | Imagawa et al. | ............ | 382/275 |

FOREIGN PATENT DOCUMENTS

| | | |
|---|---|---|
| JP | 2005-321902 | 11/2005 |
| JP | 2007-221631 | 8/2007 |
| JP | 2008-005084 | 1/2008 |
| WO | 2008-047664 | 4/2008 |

OTHER PUBLICATIONS

Japanese Office Action for corresponding JP2008-144157, issued on Jun. 8, 2010.

* cited by examiner

*Primary Examiner* — Joseph Ustaris
*Assistant Examiner* — On S Mung
(74) *Attorney, Agent, or Firm* — K&L Gates LLP

(57) ABSTRACT

Disclosed herein is an image processing apparatus, including, a local motion vector detection section, a global motion vector acquisition section, an index value calculation section, a motion compensation section, an addition ratio calculation section, and an addition section.

11 Claims, 60 Drawing Sheets

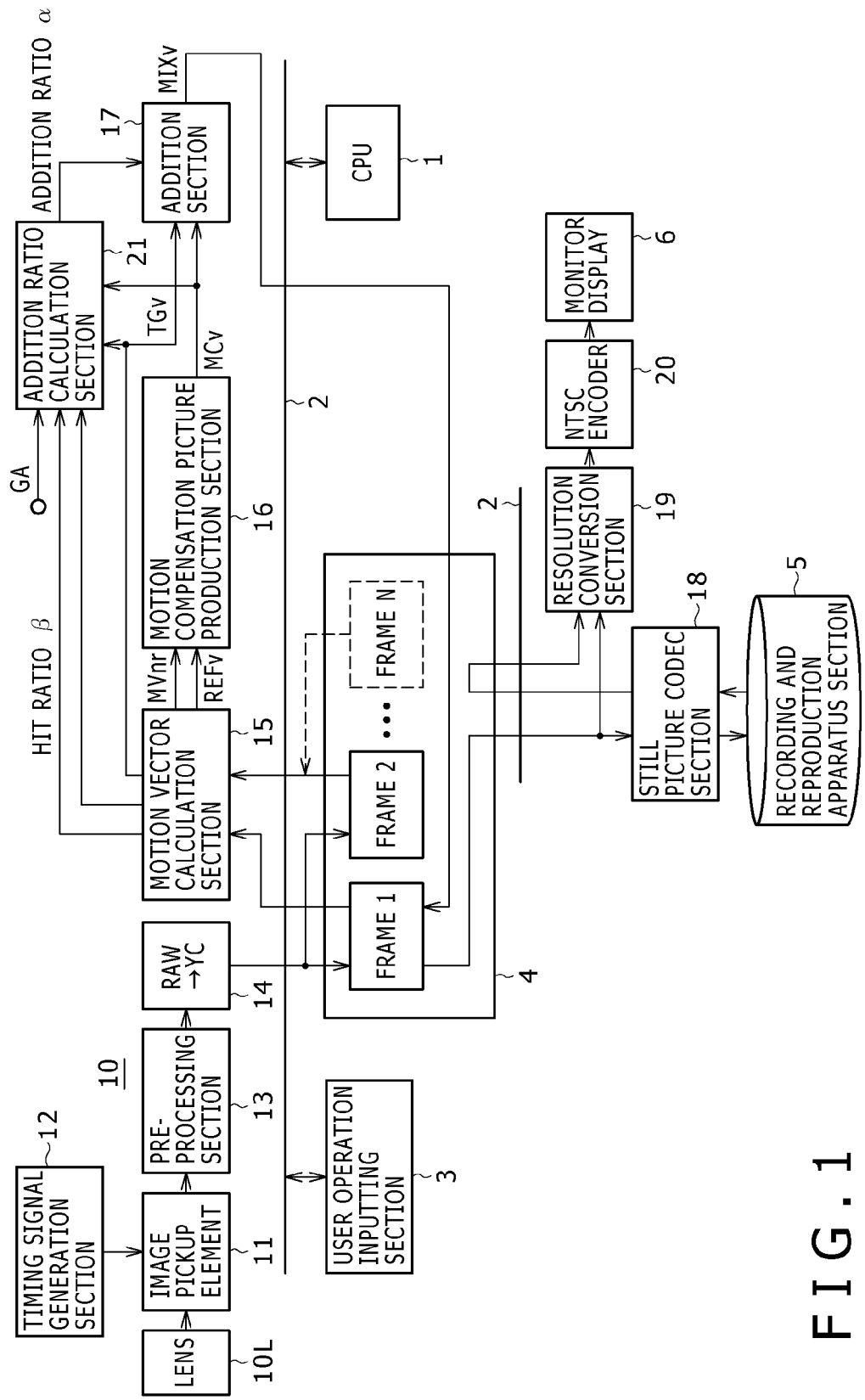
F I G . 1

FIG.21A
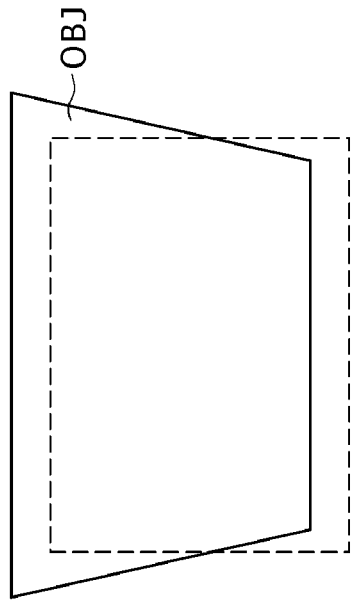
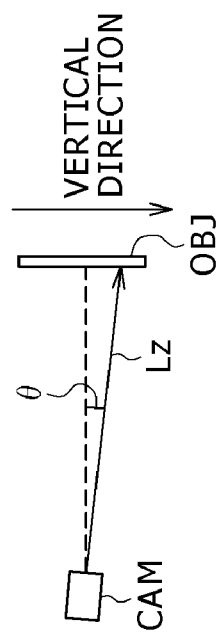
FIG.21B
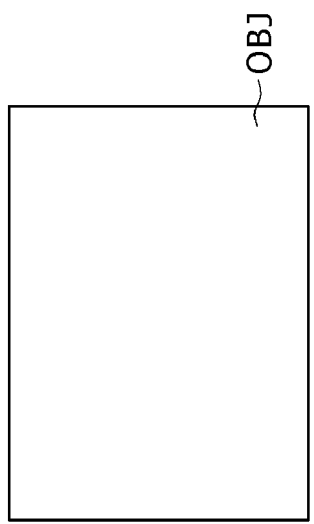
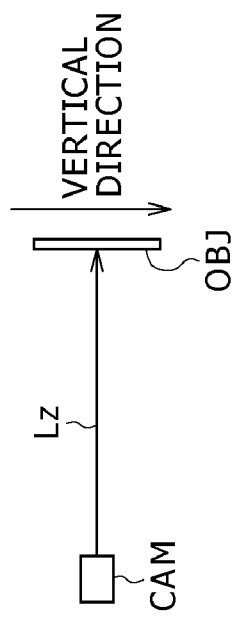

FIG.22

(EXPRESSION 8) ORTHOGONAL PROJECTION TRANSFORMATION $$a = \frac{a \cdot x + b \cdot y + c}{g \cdot x + h \cdot y + i}$$

$$b = \frac{d \cdot x + e \cdot y + f}{j \cdot x + k \cdot y + l}$$

FIG. 24

(EXPRESSION 9) EXTENSION EXPRESSION OF AFFINE TRANSFORMATION $$\begin{pmatrix} v \\ w \end{pmatrix} = \begin{pmatrix} p0 \cdot x + q0 \cdot y + r0 & p1 \cdot x + q1 \cdot y + r1 & c \\ p2 \cdot x + q2 \cdot y + r2 & p3 \cdot x + q3 \cdot y + r3 & f \end{pmatrix} \begin{pmatrix} x \\ y \\ 1 \end{pmatrix}$$

FIG. 25

(EXPRESSION 10) EXTENDED AFFINE TRANSFORMATION $$\begin{pmatrix} v \\ w \end{pmatrix} = \begin{pmatrix} a & b & c & d & e & f \\ g & h & i & j & k & l \end{pmatrix} \begin{pmatrix} x^2 \\ xy \\ y^2 \\ x \\ y \\ 1 \end{pmatrix}$$

$$= \begin{pmatrix} a \cdot x^2 + b \cdot xy + c \cdot y^2 + d \cdot x + e \cdot y + f \\ g \cdot x^2 + h \cdot xy + i \cdot y^2 + j \cdot x + k \cdot y + l \end{pmatrix}$$

FIG. 26

(EXPRESSION 11) SOLUTION 1 TO EXTENDED AFFINE TRANSFORMATION BY LEAST SQUARES METHOD $$a = \frac{V0 \cdot C1 - V1 \cdot C0}{A0 \cdot C1 - A1 \cdot C0}$$

$$b = \frac{W0 \cdot D1 - W1 \cdot D0}{B0 \cdot D1 - B1 \cdot D0}$$

$$c = \frac{V0 \cdot A1 - V1 \cdot A0}{A1 \cdot C0 - A0 \cdot C1}$$

$$d = \frac{W0 \cdot B1 - W1 \cdot B0}{B1 \cdot D0 - B0 \cdot D1}$$

FIG.27

(EXPRESSION 12) SOLUTION 2 TO EXTENDED AFFINE TRANSFORMATION BY LEAST SQUARES METHOD $$e = \frac{1}{\overline{xy} \cdot \overline{y} - \overline{x} \cdot \overline{y2}} \{(\overline{x2y} \cdot \overline{x} - \overline{x3} \cdot \overline{y})a + (\overline{xy2} \cdot \overline{x} - \overline{x2y} \cdot \overline{y})b + (\overline{x} \cdot \overline{y3} - \overline{xy2} \cdot \overline{y})c + (\overline{xy} \cdot \overline{x} - \overline{x2} \cdot \overline{y}) d + \overline{vx} \cdot \overline{y} - \overline{vy} \cdot \overline{x}\}$$

$$f = \frac{1}{\overline{x} \cdot \overline{y2} - \overline{xy} \cdot \overline{y}} \{(\overline{x2y} \cdot \overline{xy} - \overline{x3} \cdot \overline{y2})a + (\overline{xy2} \cdot \overline{xy} - \overline{x2y} \cdot \overline{y2})b + (\overline{xy} \cdot \overline{y3} - \overline{xy2} \cdot \overline{y2})c + ((\overline{xy})^2 - \overline{x2} \cdot \overline{y2})d + \overline{vx} \cdot \overline{y2} - \overline{vy} \cdot \overline{x}\}$$

$$\left[ \begin{array}{l} \text{FOR } g, h, i, j, k \text{ AND } l, v \text{ IN EXPRESSIONS OF} \\ a, b, c, d, e \text{ AND } f \text{ IS REPLACED WITH } w \end{array} \right]$$

FIG. 28

(EXPRESSION 13) SOLUTION 3 TO EXTENDED AFFINE TRANSFORMATION BY LEAST SQUARES METHOD

WHERE

| | |
|---|---|
| t0  | $R2 \cdot S3 - R3 \cdot S2$ |
| t1  | $P2 \cdot S3 - P3 \cdot S3$ |
| t2  | $Q2 \cdot S3 - Q3 \cdot S3$ |
| t3  | $T2 \cdot S3 - T3 \cdot S3$ |
| t4  | $R0 \cdot S3 - R3 \cdot S0$ |
| t5  | $R1 \cdot S3 - R3 \cdot S1$ |
| t6  | $Q2 \cdot P3 - Q3 \cdot P2$ |
| t7  | $R2 \cdot P3 - R3 \cdot P2$ |
| t8  | $S2 \cdot P3 - S3 \cdot P2$ |
| t9  | $T2 \cdot P3 - T3 \cdot P2$ |
| t10 | $Q0 \cdot P3 - Q3 \cdot P0$ |
| t11 | $Q1 \cdot P3 - Q3 \cdot P1$ |

| | |
|---|---|
| A0 | $t0 \, (P0 \cdot S3 - P3 \cdot S0) - t4 \cdot t1$ |
| C0 | $t0 \, (Q0 \cdot S3 - Q3 \cdot S0) - t4 \cdot t2$ |
| V0 | $t0 \, (T0 \cdot S3 - T3 \cdot S0) - t4 \cdot t3$ |

| | |
|---|---|
| A1 | $t0 \, (P1 \cdot S3 - P3 \cdot S1) - t5 \cdot t1$ |
| C1 | $t0 \, (Q1 \cdot S3 - Q3 \cdot S1) - t5 \cdot t2$ |
| V1 | $t0 \, (T1 \cdot S3 - T3 \cdot S1) - t5 \cdot t3$ |

| | |
|---|---|
| B0 | $t6 \, (R0 \cdot P3 - R3 \cdot S0) - t10 \cdot t7$ |
| D0 | $t6 \, (S0 \cdot P3 - S3 \cdot S0) - t10 \cdot t8$ |
| W0 | $t6 \, (T0 \cdot P3 - T3 \cdot S0) - t10 \cdot t9$ |

| | |
|---|---|
| B1 | $t6 \, (R1 \cdot P3 - R3 \cdot P1) - t11 \cdot t7$ |
| D1 | $t6 \, (S1 \cdot P3 - S3 \cdot P1) - t11 \cdot t8$ |
| W1 | $t6 \, (T1 \cdot P3 - T3 \cdot P1) - t11 \cdot t9$ |

FIG. 29

(EXPRESSION 14) SOLUTION 4 TO EXTENDED AFFINE TRANSFORMATION BY LEAST SQUARES METHOD $t12 = n \cdot y2 - y \cdot y$
$t13 = n \cdot x2y - x2 \cdot y$
$t14 = n \cdot y3 - y2 \cdot y$
$t15 = n \cdot xy2 - xy \cdot y$
$t16 = n \cdot xy - x \cdot y$
$t17 = n \cdot yy - v \cdot y$
$t18 = n \cdot wy - w \cdot y$ $P0 = t12(n \cdot x4 - x2 \cdot x2) - t13 \cdot t13$
$Q0 = t12(n \cdot x2y2 - x2 \cdot y2) - t13 \cdot t14$
$R0 = t12(n \cdot x3y - x2 \cdot xy) - t13 \cdot t15$
$S0 = t12(n \cdot x3 - x2 \cdot x) - t13 \cdot t16$
$T0 = t12(n \cdot vx2 - x2 \cdot v) - t13 \cdot t17$ $P1 = t12(n \cdot x2y2 - y2 \cdot x2) - t14 \cdot t13$
$Q1 = t12(n \cdot x4 - y2 \cdot y2) - t14 \cdot t14$
$R1 = t12(n \cdot xy3 - y2 \cdot xy) - t14 \cdot t15$
$S1 = t12(n \cdot xy2 - y2 \cdot x) - t14 \cdot t16$
$T1 = t12(n \cdot vy2 - y2 \cdot v) - t14 \cdot t17$ $P2 = t12(n \cdot x3y - xy \cdot x2) - t15 \cdot t13$
$Q2 = t12(n \cdot xy3 - xy \cdot y2) - t15 \cdot t14$
$R2 = t12(n \cdot x2y2 - xy \cdot xy) - t15 \cdot t15$
$S2 = t12(n \cdot x2y - xy \cdot x) - t15 \cdot t16$
$T2 = t12(n \cdot vxy - xy \cdot v) - t15 \cdot t17$ $P3 = t12(n \cdot x3 - x \cdot x2) - t16 \cdot t13$
$Q3 = t12(n \cdot xy2 - x \cdot y2) - t16 \cdot t14$
$R3 = t12(n \cdot x2y - x \cdot xy) - t16 \cdot t15$
$S3 = t12(n \cdot y2 - x \cdot x) - t16 \cdot t16$
$T3 = t12(n \cdot vx - x \cdot v) - t16 \cdot t17$

FIG.30

(EXPRESSION 15) SOLUTION 5 TO EXTENDED AFFINE TRANSFORMATION BY LEAST SQUARES METHOD

WHERE $n$ = TOTAL NUMBER OF BLOCKS
$x4 = \Sigma x^4$
$x3y = \Sigma x^3 y$
$x2y2 = \Sigma x^2 y^2$
$xy3 = \Sigma xy^3$
$y4 = \Sigma y^4$ $x3 = \Sigma x^3$
$x2y = \Sigma x^2 y$
$xy2 = \Sigma xy^2$
$y3 = \Sigma y^3$ $x2 = \Sigma x^2$
$xy = \Sigma xy$
$y2 = \Sigma y^2$ $x = \Sigma x$
$y = \Sigma y$ $vx2 = \Sigma vx^2$
$vxy = \Sigma vxy$
$vy2 = \Sigma vy^2$
$vx = \Sigma vx$
$vy = \Sigma vy$
$v = \Sigma v$

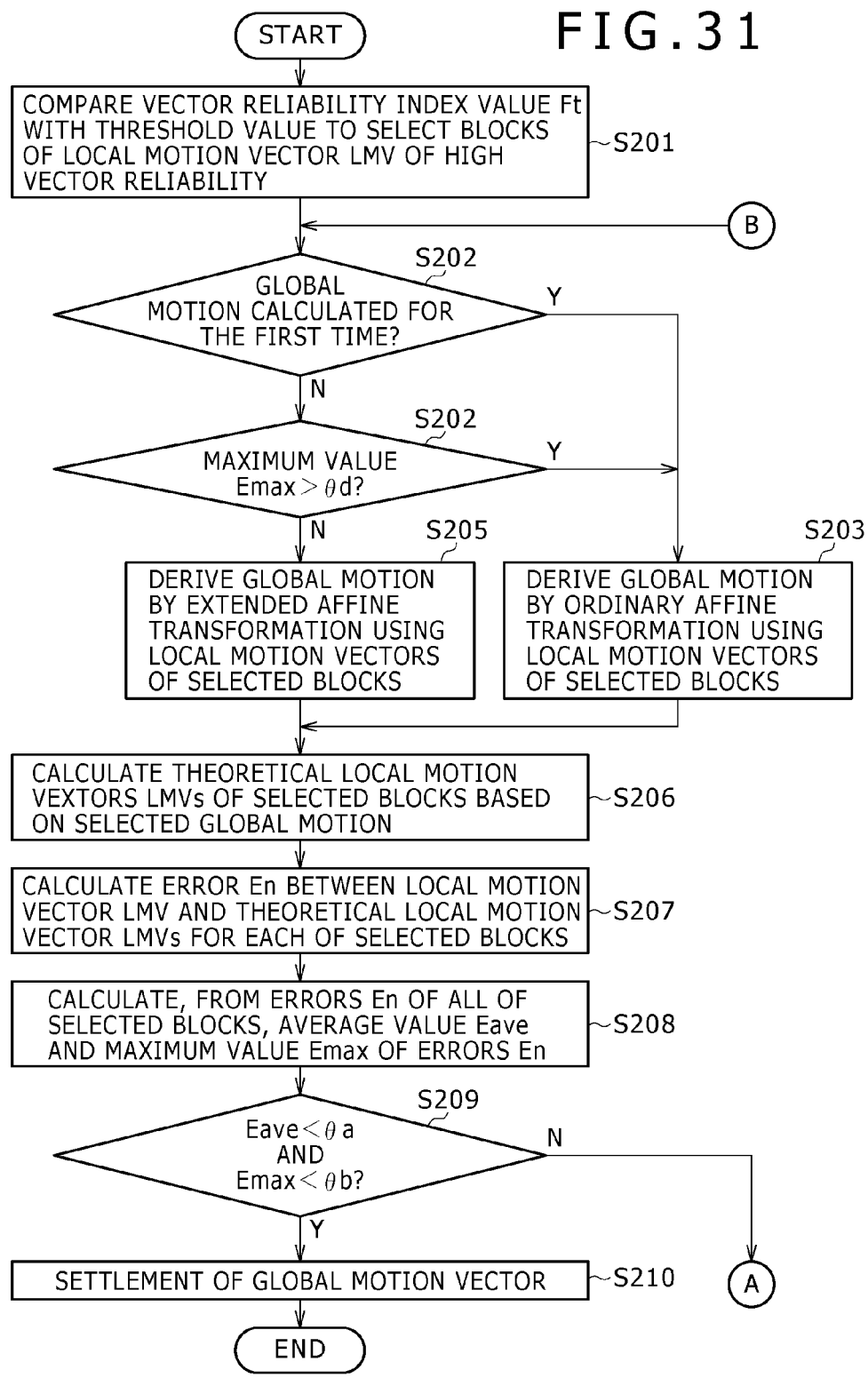

BACKGROUND/MOVING IMAGE PICKUP OBJECT DECISION SECTION

FIG.50

| GAIN GA | HIT RATIO $\beta$ | ADDITION RATIO $\alpha$ (MULTIPLE) TO REFERENCE ADDITION RATIO $\alpha_0$ |
|---|---|---|
| 0 | 0 | 1 TIME ($\alpha = \alpha_0$) |
| | 0.25 | 1.25 TIMES ($\alpha = \alpha_0 + 0.25\alpha_0$) |
| | 0.5 | 1.5 TIMES ($\alpha = \alpha_0 + 0.5\alpha_0$) |
| | 1.0 | 2 TIMES ($\alpha = \alpha_0 + \alpha_0$) |
| 1 | 0 | 1 TIME ($\alpha = \alpha_0$) |
| | 0.25 | 1.5 TIMES ($\alpha = \alpha_0 + 0.5\alpha_0$) |
| | 0.5 | 2 TIMES ($\alpha = \alpha_0 + \alpha_0$) |
| | 1.0 | 3 TIMES ($\alpha = \alpha_0 + 2\alpha_0$) |
| 2 | 0 | 1 TIME ($\alpha = \alpha_0$) |
| | 0.25 | 2 TIMES ($\alpha = \alpha_0 + \alpha_0$) |
| | 0.5 | 3 TIMES ($\alpha = \alpha_0 + 2\alpha_0$) |
| | 1.0 | 5 TIMES ($\alpha = \alpha_0 + 4\alpha_0$) |
| 3 | 0 | 1 TIME ($\alpha = \alpha_0$) |
| | 0.25 | 3 TIMES ($\alpha = \alpha_0 + 2\alpha_0$) |
| | 0.5 | 5 TIMES ($\alpha = \alpha_0 + 4\alpha_0$) |
| | 1.0 | 9 TIMES ($\alpha = \alpha_0 + 8\alpha_0$) |

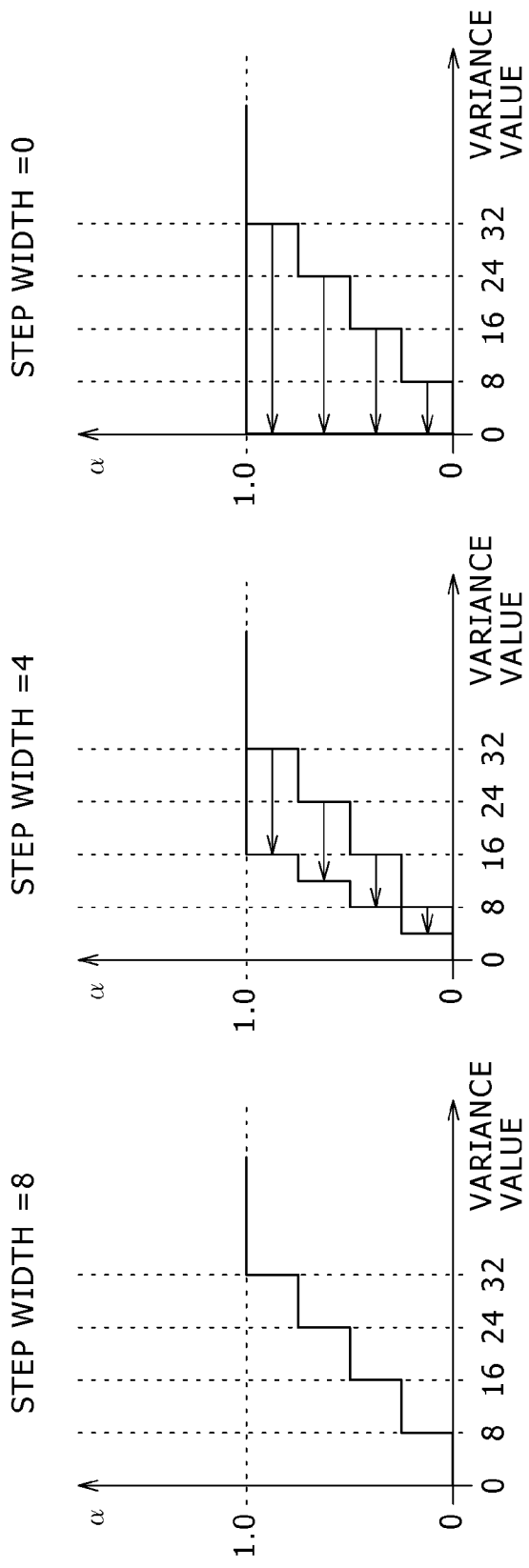

FIG.52

| GAIN GA | HIT RATIO β | STEP WIDTH |
|---|---|---|
| 0 | 0 | 8 |
|   | 0.25 | 8 |
|   | 0.5 | 8 |
|   | 1.0 | 4 |
| 1 | 0 | 8 |
|   | 0.25 | 8 |
|   | 0.5 | 4 |
|   | 1.0 | 2 |
| 2 | 0 | 8 |
|   | 0.25 | 4 |
|   | 0.5 | 2 |
|   | 1.0 | 1 |
| 3 | 0 | 8 |
|   | 0.25 | 2 |
|   | 0.5 | 1 |
|   | 1.0 | 0 |

MOVING IMAGE
PICKUP OBJECT

MOVING IMAGE
PICKUP OBJECT

HIT RATIO $\beta$ (ONLY $\beta=0$ AND $\beta=1$)

ADDITION RATIO $\alpha$

⟨INTERPOLATION IN DECREASING DIRECTION OF HIT RATIO β⟩

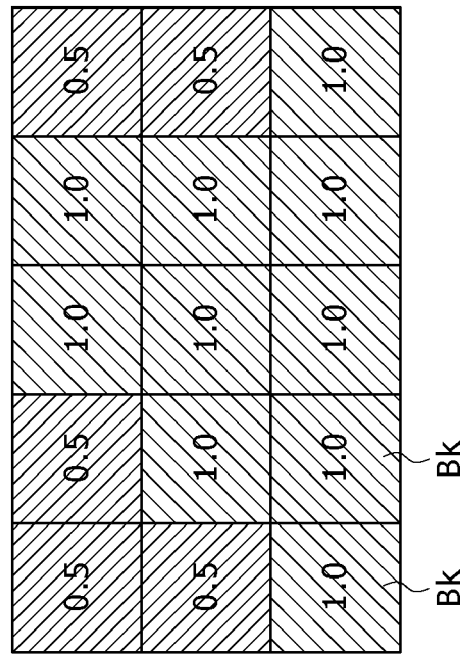
FIG. 60A
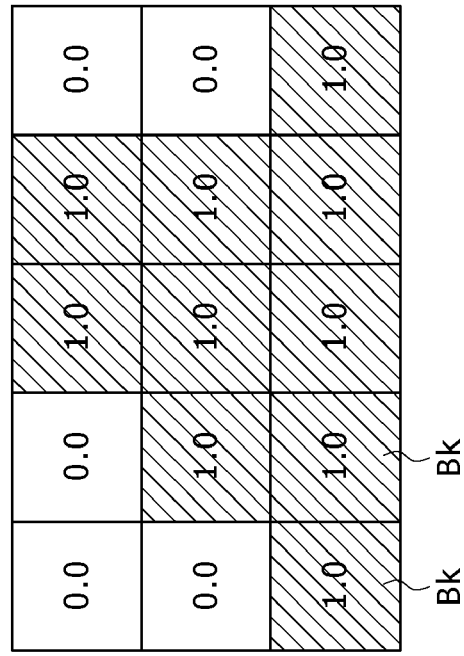
FIG. 60B
⟨INTERPOLATION IN INCREASING DIRECTION OF HIT RATIO β⟩

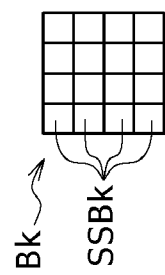

FIG.69

(EXPRESSION 1) AFFINE TRANSFORMATION $$\begin{bmatrix} v \\ w \end{bmatrix} = \begin{bmatrix} a & b & c \\ d & e & f \end{bmatrix} \begin{bmatrix} x \\ y \\ 1 \end{bmatrix} = \begin{bmatrix} a \cdot x + b \cdot y + c \\ d \cdot x + e \cdot y + f \end{bmatrix}$$

FIG.70

(EXPRESSION 2) APPLICATION 1 OF LEAST SQUARES METHOD TO AFFINE TRANSFORMATION $$V_n = \begin{bmatrix} a & b & c \\ d & e & f \end{bmatrix} \begin{bmatrix} x_n \\ y_n \\ 1 \end{bmatrix}$$

$$\varepsilon_n^2 = \left| V_n - \begin{bmatrix} v_n \\ w_n \end{bmatrix} \right|^2$$

$$\varepsilon^2 = \Sigma \varepsilon_n^2$$
$$= \Sigma \{ (a \cdot x_n + b \cdot y_n + c - v_n)^2 + (d \cdot x_n + e \cdot y_n + f - w_n)^2 \}$$

WHERE $x_n$ = HORIZONTAL COMPONENT OF CENTER COORDINATE OF EACH BLOCK n
$y_n$ = VERTICAL COMPONENT OF CENTER COORDINATE OF EACH BLOCK n
$v_n$ = HORIZONTAL COMPONENT OF MOTION VECTOR OF EACH BLOCK n
$w_n$ = VERTICAL COMPONENT OF MOTION VECTOR OF EACH BLOCK n
$V_n$ = THEORETICAL VECTOR OF EACH BLOCK n DETERMINED FROM AFFINE TRANSFORMATION
$\varepsilon_n$ = ERROR (DISTANCE) OF MOTION VECTOR OF EACH BLOCK n FROM THEORETICAL VECTOR
$\varepsilon$ = SUM TOTAL OF $\varepsilon_n$

FIG.71

(EXPRESSION 3) APPLICATION 2 OF LEAST SQUARES
METHOD TO AFFINE TRANSFORMATION

FROM $\dfrac{\partial \varepsilon^2}{\partial a}=0$, $\dfrac{\partial \varepsilon^2}{\partial b}=0$, $\dfrac{\partial \varepsilon^2}{\partial c}=0$, a·x2+b·xy+c·x=vx   ···① a·xy+b·y2+c·y=vy   ···② a·x+b·y+c·n=v   ···③

WHERE
n   =TOTAL NUMBER OF BLOCKS
x2  =$\Sigma x^2$
xy  =$\Sigma xy$
y2  =$\Sigma y^2$
x   =$\Sigma x$
y   =$\Sigma y$
vx  =$\Sigma vx$
vy  =$\Sigma vy$
v   =$\Sigma v$

FIG.72

(EXPRESSION 4) APPLICATION 3 OF LEAST SQUARES METHOD TO AFFINE TRANSFORMATION

FROM ①, ②, ③ OF (EXPRESSION 3)

$$a = \frac{(n \cdot y2 - y^2)(n \cdot vx - v \cdot x) - (n \cdot xy - x \cdot y)(n \cdot vy - v \cdot y)}{(n \cdot x2 - x^2)(n \cdot y2 - y^2) - (n \cdot xy - x \cdot y)^2}$$

$$b = \frac{(n \cdot xy - x \cdot y)(n \cdot vx - v \cdot x) - (n \cdot x2 - x^2)(n \cdot vy - v \cdot y)}{(n \cdot xy - x \cdot y)^2 - (n \cdot x2 - x^2)(n \cdot y2 - y^2)}$$

$$c = \frac{(x \cdot y2 - xy \cdot y)(x \cdot vx - v \cdot x2) - (xy \cdot x - x2 \cdot y)(vy \cdot x - v \cdot xy)}{(n \cdot y2 - xy \cdot y)(x2 - n \cdot x2) - (xy \cdot x - x2 \cdot y)(x \cdot y - n \cdot xy)}$$

FIG.73

(EXPRESSION 5) APPLICATION 4 OF LEAST SQUARES METHOD TO AFFINE TRANSFORMATION $$d = \frac{(n \cdot y2 - y^2)(n \cdot wx - w \cdot x) - (n \cdot xy - x \cdot y)(n \cdot wy - w \cdot y)}{(n \cdot x2 - x^2)(n \cdot y2 - y^2) - (n \cdot xy - x \cdot y)^2}$$

$$e = \frac{(n \cdot xy - x \cdot y)(n \cdot wx - w \cdot x) - (n \cdot x2 - x^2)(n \cdot wy - w \cdot y)}{(n \cdot xy - x \cdot y)^2 - (n \cdot x2 - x^2)(n \cdot y2 - y^2)}$$

$$f = \frac{(x \cdot y2 - xy \cdot y)(x \cdot wx - w \cdot x2) - (xy \cdot x - x2 \cdot y)(wy \cdot x - w \cdot xy)}{(n \cdot y2 - xy \cdot y)(x^2 - n \cdot x2) - (xy \cdot x - x2 \cdot y)(x \cdot y - n \cdot xy)}$$

WHERE wx $= \Sigma wx$
wy $= \Sigma wy$
w $= \Sigma w$

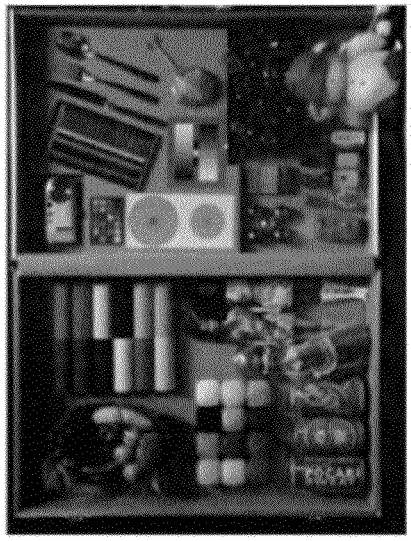
FIG. 74A
FIG. 74B
FIG. 74C

IMAGE PROCESSING APPARATUS AND IMAGE PROCESSING METHOD

CROSS REFERENCES TO RELATED APPLICATIONS

The present application claims priority to Japanese Priority Patent Application JP 2008-144157 filed in the Japan Patent Office on Jun. 2, 2008, the entire content of which is hereby incorporated by reference.

BACKGROUND

The present application relates to an image processing apparatus and method wherein, for example, upon sensorless camera shake correction or upon low illuminance image pickup, images are superposed to obtain an image from which noise is removed or reduced.

A block matching technique which determines a motion vector between two screen images from image information itself is a technique of an old history.

The block matching technique is a method of calculating a motion vector between two screen images including a reference screen image which is a noticed screen image and an original image (hereinafter referred to as target screen image) from which a motion of the reference screen image originates. According to the block matching technique, the motion vector is calculated by calculating a correlation between the reference screen image and the target screen image with regard to blocks of a rectangular region of a predetermined size, that is, a target block and a reference block.

The block matching technique includes two cases including a case wherein the target screen image precedes in time to the reference screen image and another case wherein the reference screen image precedes in time to the target screen image. An example of the former case is motion detection by the MPEG (Moving Picture Experts Group) system, and an example of the latter case is noise reduction by superposition of image frames hereinafter described.

It is to be noted that, in the present specification, the term screen image signifies an image formed from image data of one frame or one field. However, for the convenience of description, in the following description of the present specification, it is assumed that one screen image is formed from one frame. Therefore, one screen image is hereinafter referred to as frame. Accordingly, a reference screen image is hereinafter referred to as reference frame and a target screen image is hereinafter referred to as target frame.

A motion vector detection technique by the block matching has been developed particularly in regard to pan-tilt detection and image pickup object tracking of a television camera, moving picture coding of the MPEG system and so forth. In the nineties, application over a wide range including sensorless camera shake correction by superposition of images, noise reduction upon image pickup in low illuminance and so forth has been promoted.

Incidentally, a motion vector, that is, a local motion vector, of each of a large number of target blocks set in a screen image is detected, and a global motion representative of deformation applied to the entire image between the two screen images is calculated using a large number of local motion vectors detected in this manner. The global motion normally indicates a motion and an amount of the motion of the background as a still picture portion of the image.

As a related art, a distortion correction method is disclosed in Japanese Patent Laid-Open No. 2007-221631 (hereinafter referred to as Patent Document 1) wherein one screen image is divided into a large number of blocks and a vector is determined for each of the blocks. Then, the motion vectors determined in this manner are directly used to calculate a global motion. The technique of Patent Document 1 had been used as a camera shake correction technique principally for moving pictures till several years ago within which the number of pixels was small.

With the technique disclosed in Patent Document 1, it is possible to detect a global motion with a hardware scale of a low cost and implement good sensorless or gyroless camera shake correction and noise reduction for moving pictures and still pictures of high picture quality.

Meanwhile, as a method of determining a global motion, a method of applying affine transformation to a plurality of detected local motion vectors has been proposed.

FIG. 69 illustrates a general formula of the affine transformation as (expression 1). Referring to FIG. 69, in the (expression 1), v represents a horizontal component of a motion vector of a target block, w a vertical component of the motion vector of the target block, and a, b, c, d, e and f represent affine parameters. In ordinary affine transformation, the affine parameters a, b, c, d, e and f are fixed values. Further, x and y represent a horizontal component and a vertical component of the coordinate of the center of the target block, respectively.

From the affine parameters determined by a convergence mathematical operation process of a global motion and the coordinate of the center of each target block, a motion vector corresponding to the global motion is obtained. Such a motion vector as just mentioned is hereinafter referred to as ideal motion vector. The sum total of errors between the ideal vectors and observed motion vectors detected by block matching is represented like an (expression 2) of FIG. 70.

The proposition that a global motion is derived is estimation of the affine parameters a to f which minimize the sum total of the errors described above and can be solved, for example, by the least squares method. An (expression 3), another (expression 4) and a further (expression 5) of FIGS. 71, 72 and 73, respectively, illustrate a deriving process of the affine parameters a to f and results of the deriving process.

While the parameters of the affine transformation are calculated comparatively easily in this manner, the effect of this is high. Since the affine transformation is ready not only for parallel movement, rotation and expansion or contraction of an image but also for some degree of deformation, most camera shake, that is, fine correction of the camera work, is covered.

Such affine transformation as described above is disclosed, for example, in Japanese Patent Laid-Open No. 2005-321902 (hereinafter referred to as Patent Document 2).

SUMMARY

If the global motion described above is determined once, then since the coordinate is given in the (expression 1) mentioned hereinabove, a global motion vector for each target block can be determined. If this global motion vector is used to carry out superposition of images in a unit of a target block, then sensorless camera shake correction, noise reduction upon image pickup in low illuminance, that is, production of a reduced noise image, and so forth can be achieved.

However, it must be taken into consideration that a picked up image may include a moving image pickup object. This is because, if images of target blocks which include a moving image pickup object different from a background still picture portion are superposed with each other using a global motion vector produced from a global motion, then an image state similar to that by multiple exposure is produced.

For example, if the target image is such as shown in FIG. 74A and the reference image is such as shown in FIG. 74B, then such an image as shown in FIG. 74C wherein a moving image pickup object portion at a right lower portion indicates a multiple exposure state is obtained.

Therefore, also a method has been proposed wherein a screen image is divided into small blocks and a local motion vector is detected for each of the blocks and used as represented by an ME (Motion Estimation) technique used, for example, in the MPEG system.

However, where this method is used, it cannot be avoided to make the addition ratio of an image of a motion compensation block to an image of a target block moderate in order to prevent wrong addition of a moving image pickup object image portion, which is transparency, variations of an edge portion and so forth caused by deformation, occlusion or the like. This gives like to a problem that an intended noise reduction effect cannot be achieved.

Therefore, it is demanded to provide an image processing apparatus and method wherein an intended noise reduction effect can be achieved through superposition of images.

According to an embodiment of the present application there is provided an image processing apparatus, including:

a local motion vector detection section configured to divide a target screen image into a plurality of target blocks, set, for each of the target blocks, a plurality of reference blocks having a size equal to that of the target blocks in a search range set on a reference screen image different from the target screen image, determine a correlation value between the target block and the reference blocks and detect a local motion vector of the target block as a displacement of that one of the reference blocks with regard to which the highest value of the correlation value is calculated from the target block;

a global motion vector acquisition section configured to acquire a global motion vector for each of the target blocks determined from a global motion representative of deformation applied to the entire target screen image;

an index value calculation section configured to calculate, for each of the target blocks, an index value representative of a coincidence degree of the local motion vector detected by the local motion vector detection section and the global motion vector acquired by the global motion vector acquisition section;

a motion compensation section configured to produce a motion compensation image wherein the reference blocks are motion-compensated using the local motion vectors detected by the local motion vector detection section;

an addition ratio calculation section configured to calculate an addition ratio between the image of each of the target blocks and the corresponding motion compensation image in response to the corresponding index value calculated by the index value calculation section; and an addition section configured to add the images of the target blocks and the corresponding motion compensation images with the respective addition ratios calculated by the addition ratio calculation section.

According to another embodiment there is provided an image processing method, including the steps of:

dividing a target screen image into a plurality of target blocks, setting, for each of the target blocks, a plurality of reference blocks having a size equal to that of the target blocks in a search range set on a reference screen image different from the target screen image, determining a correlation value between the target block and the reference blocks and detecting a local motion vector of the target block as a displacement of that one of the reference blocks with regard to which the highest value of the correlation value is calculated from the target block;

acquiring a global motion vector for each of the target blocks determined from a global motion representative of deformation applied to the entire target screen image;

calculating, for each of the target blocks, an index value representative of a coincidence degree of the local motion vector detected at the local motion vector detection step and the global motion vector acquired by at the global motion vector acquisition step;

producing a motion compensation image wherein the reference blocks are motion-compensated using the local motion vectors detected at the local motion vector detection step;

calculating an addition ratio between the image of each of the target blocks and the corresponding motion compensation image in response to the corresponding index value calculated at the index value calculation step; and adding the images of the target blocks and the corresponding motion compensation images with the respective addition ratios calculated at the addition ratio calculation step.

In the image processing apparatus, the local motion vector detection section detects a local motion vector for each of target blocks obtained by dividing a target screen image. The global motion vector acquisition section acquires a global motion vector for each of the target blocks determined from a global motion representative of deformation applied to the entire target screen image.

The index value calculation section calculates, for each of the target blocks, an index value representative of a coincidence degree of the local motion vector and the global motion vector. This index value indicates a degree of whether or not the target block coincides with a background still picture, and if the coincidence degree is high, then the target block may be regarded as a background still picture portion.

The addition ratio calculation section calculates an addition ratio between the image of each of the target blocks and the corresponding motion compensation image in response to the corresponding index value calculated by the index value calculation section. In short, if the index value of the coincidence degree is high, then since the target block can be regarded as a background still picture portion, the addition ratio is set to a high value.

The addition section adds the images of the target blocks and the corresponding motion compensation images with the respective addition ratios. In this instance, in a background still picture portion, addition is carried out with a high addition ratio, but in a moving image portion, addition is carried out with a low addition ratio. Accordingly, image addition in a unit of a block is carried out with an appropriate addition ratio depending upon whether the target block is a background still picture portion or a moving image portion.

With the image processing apparatus, an index value representative of a degree of whether or not a target block coincides with a background still picture is calculated, and an addition ratio between an image of the target block and a motion compensation image is calculated in response to the index value. Accordingly, image addition in a unit of a block is carried out with an appropriate addition ratio depending upon whether the target block is a background still picture portion or a moving image portion, and an addition result image with which an intended noise reduction effect is achieved can be obtained.

Additional features and advantages are described in, and will be apparent from, the following Detailed Description and the figures.

BRIEF DESCRIPTION OF THE FIGURES

FIG. 1 is a block diagram showing an example of a configuration of an image pickup apparatus to which an image processing apparatus according to a first embodiment of the present application;

FIGS. 21A and 21B are schematic views illustrating a problem of hitherto known affine transformation;

FIG. 22 is a view illustrating an expression used for a process of determining a global motion from local motion vectors using orthogonal projection transformation;

FIGS. 24 to 30 are views illustrating examples of a process for calculation of a global motion from local motion vectors carried out by the image processing apparatus;

FIGS. 31 and 32 are flow charts illustrating an example of the process for calculation of a global motion from local motion vectors carried out by the image processing apparatus;

FIGS. 46 to 52 are diagrammatic view illustrating a configuration of the addition ratio calculation section;

FIGS. 59 and 60 are diagrammatic view illustrating a first example of a process in a second embodiment;

FIGS. 61 and 62 are diagrammatic view illustrating a second example of a process in the second embodiment;

FIGS. 69 to 73 are views illustrating expressions used in an example of a process for determining a global motion from local motion vectors; and FIGS. 74A to 74C are schematic views illustrating multiple exposure at a moving image pickup object portion on an image formed by superposition of images.

DETAILED DESCRIPTION

Figure 2A:
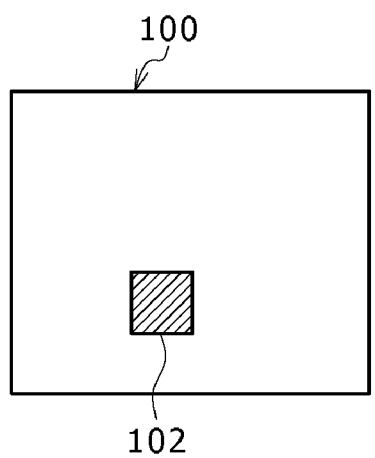
FIGS. 2A, 2B and 3 to 10 are schematic diagrammatic views illustrating a block matching process by the image processing apparatus.

The present application is described in greater detail below referring to the accompanying drawings according to an embodiment.

First Embodiment

The image pickup apparatus according to the first embodiment is generally configured such that a plurality of still images picked up by an image pickup device or imager are positioned and superposed with each other to reduce noise of the images.

In an environment in which a user holds an image pickup apparatus by hand to pick up an image, camera shake is likely to occur. Where still pictures are picked up by consecutive shooting with an image pickup apparatus held by a hand of a user in this manner, for example, the first still picture is used as a target frame and the second and succeeding still pictures are used as reference frames.

Where a reference frame can be positioned at the position of the target frame by applying a transformation process including parallel translation, rotation and expansion or contraction to the entire reference frame, the transformation process applied to the entire reference frame is a global motion.

The global motion normally indicates a movement and an amount of movement of a background still picture of the image. Such a background still picture as just mentioned is hereinafter referred to merely as background.

Camera shake signifies that a global motion occurs with respect the target frame by an amount by which image transformation including parallel translation, rotation and expansion or contraction is carried out with respect to the reference frame with respect to the target frame.

In the description of the present embodiment, the first one of picked up still pictures is used as a reference, that is, as a target frame for the simplified description. However, this is not essential. A global motion may be re-defined using an arbitrary nth still picture as a target frame and using an arbitrary mth (n≠m) still picture as a reference frame. Or, a global motion may be defined for two frame images which are different in time in moving pictures. Or else, a global motion process may be applied not for the entire effective picture frame from within one frame of a picked up image but only for part of an image of one frame.

If a global motion is determined, then it is possible to calculate a motion vector representing a motion applied to the entire screen image between the target frame and the reference frame for each coordinate position on the image from the determined global motion. Such a motion vector as just mentioned is hereinafter referred to as global motion vector. The global motion vector can be determined with regard to each of a large number of target blocks set on the screen image. Further, the global motion vector can be determined for each pixel.

Then, if the global motion vector can be determined accurately based on the global motion, then camera shake can be corrected favorably. Or, it is possible to superpose the frame images with each other while the global motion vector is corrected against the camera shake.

In the following description, to superpose a plurality of images to reduce noise using motion vector detection and motion compensation, wherein two images of different frames are positioned using a motion vector, is referred to as noise reduction (NR). Further, an image whose noise is reduced by such noise reduction is referred to as reduced noise image.

In the present embodiment, one screen image is divided into a large number of blocks (target blocks hereinafter described), and a motion vector in a unit of a block is detected by the block matching method described hereinabove. A motion vector detected for each block by the block matching method is hereinafter referred to as local motion vector.

Further, in the present embodiment, an index to reliability of a local motion vector is detected in such a manner as hereinafter described using a correlation value in the block matching method. Then, a global motion is calculated only from those of such detected local motion vectors which have high reliability, and a global motion vector of each of the blocks is detected from the calculated global motion.

Outline of Block Matching

FIGS. 2A to 7 illustrate an outline of the block matching method. In the block matching method described here, a block, that is, a target block 102, of a rectangular region of a predetermined size including a plurality of pixels in a horizontal direction and a plurality of lines in a vertical direction is assumed in the target frame 100 as seen in FIG. 2A. Also in the reference frame 101, block, that is, reference blocks, of a size same as the target block 102 are set.

In the block matching, a reference block having a high correlation to the target block 102 is searched out from within a reference frame 101. A reference block 103 shown in FIG. 2B detected as a block having the highest correlation with the target block 102 from within the reference frame 101 is hereinafter referred to as motion compensation block. Further, the positional displacement amount between the target block 102 and the motion compensation block 103 which has the highest correction with the target block 102 is hereinafter referred to as motion vector (refer to reference numeral 104 of FIG. 2B).

The motion vector 104 corresponding to the positional displacement, which includes a positional displacement amount and a positional displacement direction, between the target block 102 and the motion compensation block 103 corresponds to the positional displacement between the position of a projection image block 109 of the target block 102 in the reference frame 101 and the position of the motion compensation block 103. For the position of the projection image block 109 and the position of the motion compensation block 109, for example, the center positions of them are used.

The projection image block 109 of the target block 102 is assumed at a position of the reference frame 101 same as the position of the target block 102 of the target frame 100.

An outline of the block matching process is described.

Figure 3:
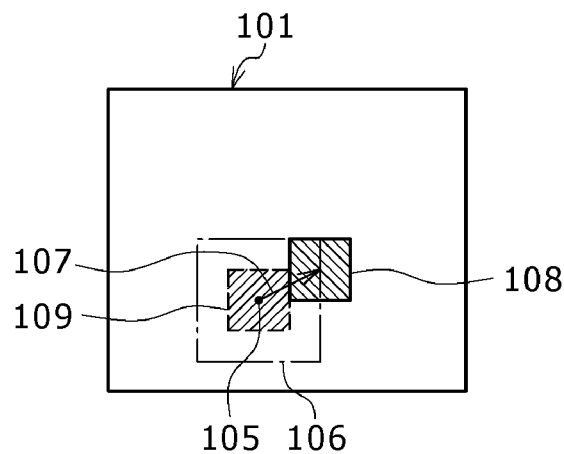

Referring to FIG. 3, the projection image block 109 of the target block 102 of the target frame 100 is assumed at a position of the reference frame 101 which is same as the position of the target block 102 of the target frame 100 as indicated by a broken line in FIG. 3. Then, the coordinate of the center of the projection image block 109 of the target block 102 is determined as the origin 105 for motion detection. Then, it is assumed that the motion vector 104 exists within a certain range from the origin 105 for motion detection, and a predetermined range centered at the origin 105 for motion detection is set as a search range 106 indicated by an alternate long and short dash line in FIG. 3.

Then, a block, that is, a reference block 108, of the same size as that of the target block 102 is set on the reference screen image. Then, the position of the reference block 108 is moved in a unit of one pixel or a plurality of pixels, for example, in the horizontal direction and the vertical direction within the search range 106. Accordingly, a plurality of reference blocks 108 are set in the search range 106.

Here, that the reference block 108 is moved within the search range 106 signifies that, since the origin 105 for motion detection is the position of the center of the target block, the position of the center of the reference block 108 is moved within the search range 106. Accordingly, pixels which compose the reference block 108 may protrude from the search range 106.

Then, with regard to each reference block 108 set in the search range 106, a vector, that is, a reference vector 107 (refer to FIG. 3), representative of a positional displacement amount and a positional displacement direction of the reference block 108 and the target block 102 is set. Then, a correlation between the image contents of the reference block 108 at the position indicated by each of such reference vectors 107 and the image contents of the target block 102 is evaluated.

Figure 4:
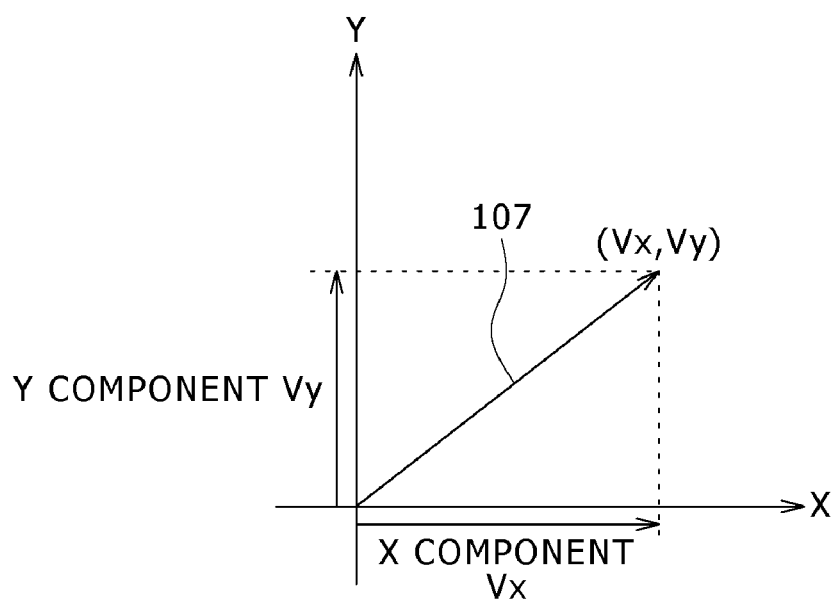

Referring to FIG. 4, the reference vector 107 can be represented as vector (Vx, Vy) where Vx is the positional displacement amount of the reference block 108 in the horizontal direction, that is, in the X direction, and Vy is the positional displacement amount of the reference block 108 in the vertical direction, that is, in the Y direction. If the coordinate of the position, for example, the coordinate of the position of the center, of the reference block 108 and the coordinate of the position, for example, the coordinate of the position of the center, of the target block 102 are same, then the reference vector 107 is represented as vector (0, 0).

For example, if the reference block 108 is at a position displaced by a one-pixel distance in the X direction from the position of the target block 102, then the reference vector 107 is represented as vector (1, 0). Meanwhile, if the reference block 108 is at a position displaced by a three-pixel distance in the X direction and a two-pixel distance in the Y direction from the position of the target block 102, then the reference vector 107 is vector (3, 2).

Figure 5:
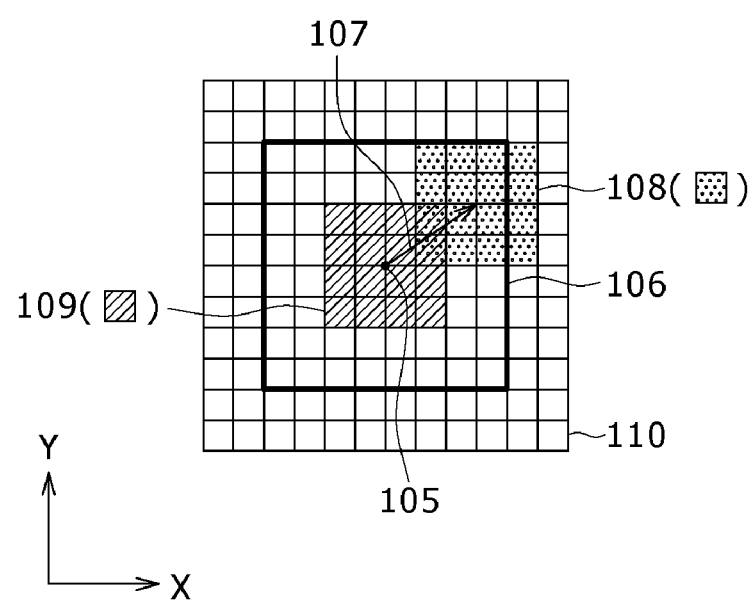

In short, as seen in FIG. 5, the reference vector 107 signifies a positional displacement, which is a vector including a positional displacement amount and a direction of the positional displacement, between each reference block 108 and the target block 102 corresponding to each other. It is to be noted that, in FIG. 5, the positions of the target block 102 and the reference block 108 are individually represented by the positions of the centers of the blocks.

The reference block 108 moves within the search range 106, and in this instance, the position of the center of the reference block 108 moves within the search range 106. Since the reference block 108 includes a plurality of pixels in the horizontal direction and the vertical direction, the maximum range of the movement of the reference block 108 which is an object of the block matching process with the target block 102 is given as a matching processing range 110 which is wider than the search range 106 as seen in FIG. 5.

Figure 2B:
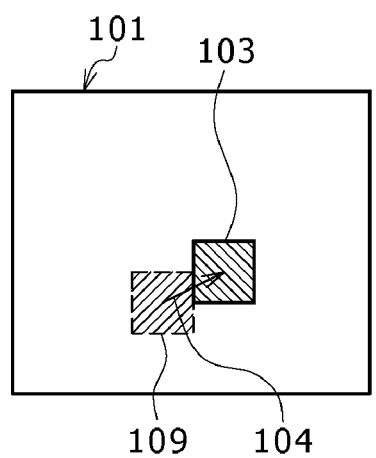

Then, the position of the reference block 108 detected as a block having the highest correlation with the image contents of the target block 102 is detected as the position of the target block 102 of the target frame 100 on the reference frame 101, that is, as the position after the movement. Then, the detected reference block is determined as the motion compensation block 103 described hereinabove. Then, the positional displacement amount between the position of the detected motion compensation block 103 and the position of the target block 102 is detected as the motion vector 104 including a directional component as seen in FIG. 2B.

The correlation value representative of the degree of correlation between the target block 102 and the reference block 108 which moves within the search range 106 is calculated basically using corresponding pixel values of the target block 102 and the reference block 108. Various calculation methods including a method which uses the root mean square are available for the calculation of the correlation value.

Figure 6:
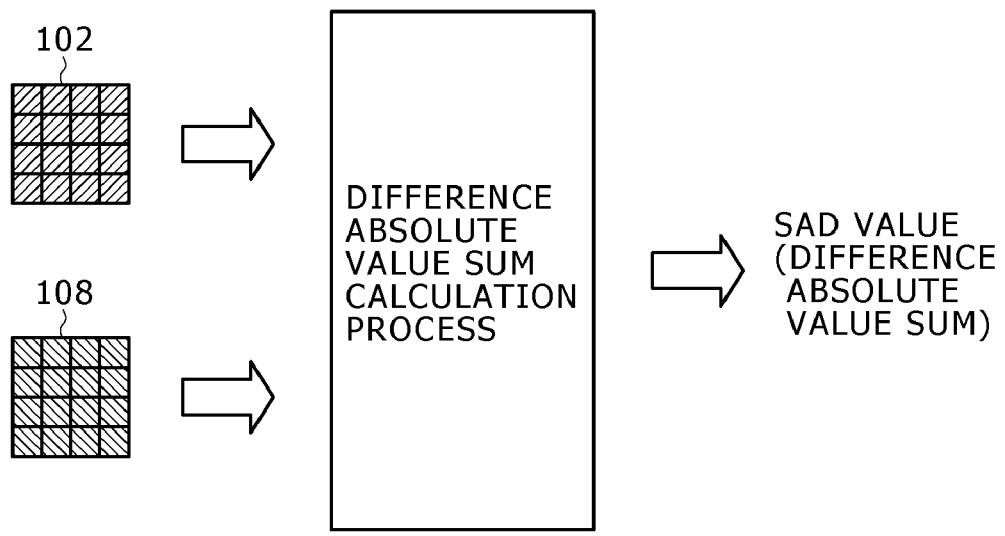

One of correlation values which are used popularly upon calculation of a motion vector is, for example, the sum total of the absolute values of the difference between the luminance value of each pixel in the target block 102 and the luminance value of the corresponding pixel in the search range 106 with regard to all pixels in the blocks as seen in FIG. 6. The sum total of absolute values of the differences is called difference absolute value sum and hereinafter referred to as SAD (Sum of Absolute Difference) value.

Where the SAD value is used as the correlation mathematical operation result, as the SAD value decreases, the correlation increases. Accordingly, from among the reference blocks 108 moving within the search range 106, the reference block 108 at a position at which the SAD value is lowest is the highest correlation reference block which has the highest correlation. This highest correlation reference block is detected as the motion compensation block 103, and the positional displacement amount of the position of the detected motion compensation block 103 from that of the target block 102 is detected as the motion vector.

It is to be noted that generally the correlation increases as the correlation value increases. However, it can be considered that, where the SAD value is used as the correlation mathematical operation result, as the SAD value decreases, the correlation increases.

As described hereinabove, in the block matching, the positional displacement amount of each of a plurality of reference blocks 108 set within the search range 106 from the position of the target block 102 is represented by the reference vector 107 as an amount which includes a directional component. The reference vector 107 of each reference block 108 has a value corresponding to the position of the reference block 108 on the target block 102. As described hereinabove, in the block matching, the reference vector of the reference block 108 whose SAD value as a correlation value is the lowest is detected as the motion vector 104.

Thus, in the block matching, the SAD value between each of a plurality of reference blocks 108 set within the search range 106 and the target block 102 (such SAD value is hereinafter referred to as SAD value of the reference block 108 for simplified description) is determined first.

Then, the SAD values determined in this manner are stored into a memory in a corresponding relationship to the reference vectors 107 corresponding to the positions of the reference blocks 108. Then, the reference block 108 having the lowest one of the SAD values of all of the reference blocks 108 stored in the memory is detected to detect the motion vector 104. It is to be noted that, in the following description, the reference vector 107 corresponding to the position of the reference block 108 is hereinafter referred to as reference vector 107 of the reference block 108 for simplified description.

The correlation values, in the example described, the SAD values, of a plurality of reference blocks 108, which are set in the search range 106, stored corresponding to the reference vectors 107 corresponding to the positions of the reference blocks 108 are referred to as correlation value table. In the example described, since a SAD value which is a difference absolute value sum is used as a correlation value, the correlation value table is referred to as difference absolute value sum table or SAD table.

Figure 7:
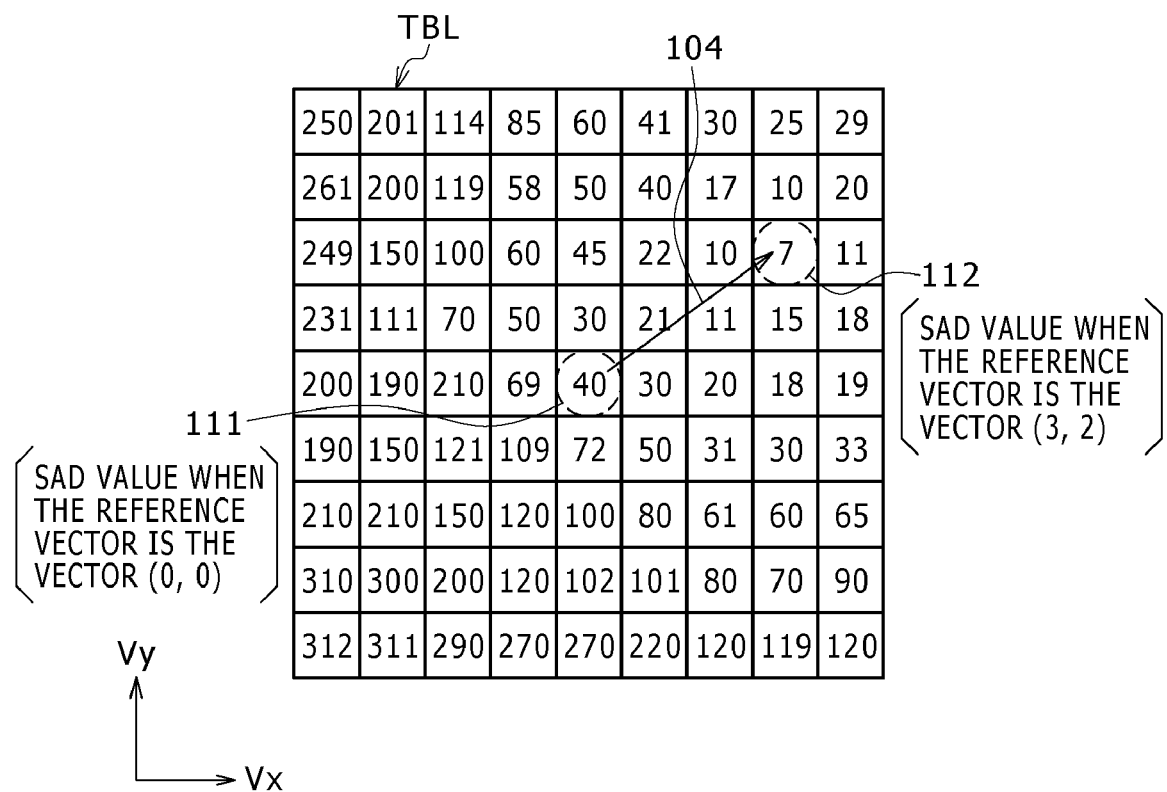

This is indicated as SAD table TBL in FIG. 7. Referring to FIG. 7, in the SAD table TBL shown, a correlation value, in the example illustrated, a SAD value, of each reference block 108 is referred to as correlation value table element. In the example of FIG. 7, the SAD value indicated by reference numeral 111 is a SAD value when the reference vector is the vector (0, 0). Further, in the example of FIG. 7, since the lowest value of the SAD value is "7" when the reference vector is a vector (3, 2), the determined motion vector 104 is the vector (3, 2).

It is to be noted that the positions of the target block 102 and a reference block 108 signify arbitrary particular positions such as, for example, the positions of the centers, of the blocks. Further, a reference vector 107 indicates the displacement amount (including the direction) between the position of the projection image block 109 of the target block 102 of the reference frame 101 and the position of the reference block 108.

The reference vector 107 corresponding to each reference block 108 is a positional displacement of the reference block 108 from the position of the projection image block 109 corresponding to the target block 102 on the reference frame 101. Accordingly, if the position of the reference block 108 is specified, then also the value of the reference vector is specified corresponding to the position. Consequently, the address of a correlation value table element of the reference block in the memory of the SAD table TBL is specified, then a corresponding reference vector is specified.

It is to be noted that such SAD values may be calculated in parallel with regard to two or more target blocks. If the number of target blocks to be processed simultaneously increases, then the processing speed increases. However, since the scale of the hardware for calculating the SAD values increases, the increase of the speed of the processing and the increase of the circuit scale have a trade-off relationship.

Block Matching in the Embodiment

The foregoing description of the block matching relates to calculation of a motion vector regarding one target block. Since the ratio of the target block occupying in the entire target frame is usually low, it is generally difficult to determine a motion of the target frame, that is, a global motion, based on one target block.

Figure 8:
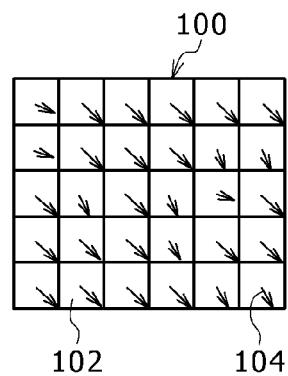

In the present embodiment, as shown in FIG. 8, the target frame 100 is divided into a plurality of target blocks 102 of a smaller size of, for example, 64 pixels×64 lines. Then, a motion vector or local motion vector 104B of each of the target blocks is determined. At this time, in the present embodiment, an index representative of the reliability of each of the determined local motion vectors is calculated together.

Then, based on the indexes to the reliability of the local motion vectors, only those of the local motion vectors determined with regard to the target frame which have high reliability are extracted.

Then, the global motion is calculated only from the extracted local motion vectors having high reliability. Then, the calculated global motion is used to calculate a global motion vector in a unit of a target block.

Then, the calculated global motion vector and the local motion vector for each of the target blocks are compared with each other, and it is evaluated and decided based on a result of the comparison whether or not each target block is a background portion or a moving image pickup object portion. In the present embodiment, the calculated global motion vector and the local motion vector for each target block are compared with each other to decide a coincidence degree of the two vectors. Then, as a result of the decision, an index value representative of the degree of coincidence between the local motion vector for each target block and the global motion vector is calculated. This index value is hereinafter referred to as hit ratio.

The reason why such evaluation decision is carried out is that it is intended to take the influence of noise included in an image upon the correlation value calculated by block matching into consideration.

When the global motion vector and the local motion vector regarding the target block coincide with each other, it can be decided that the target block is a background image portion. Accordingly, this coincidence degree indicates a degree by which the image of the target block coincides with a background image portion.

If the target block is a background image portion, then since this is a still image portion, the motion compensation image can be added at a ratio of 100%, that is, at a ratio of 1:1, to the image of the target block. Consequently, the noise reduction (NR) effect can be maximized.

Then, if the background coincidence degree is low, then it is estimated that the target block is a moving image pickup object portion. Therefore, if the addition ratio of the motion compensation image to the image of the data block is lowered in response to the background coincidence degree, then such a state as multiple exposure can be moderated.

Here, if the global motion vector and the local motion vector do not coincide with each other, then it may be decided that the target block fully is a moving image pickup object portion if image noise is not taken into consideration. In this instance, the correlation value regarding the reference block corresponding to the local motion vector is highest, that is, the SAD value is lowest, and the correlation value is higher than the correlation value regarding the reference block corresponding to the global motion vector, that is, the SAD value is lower.

However, generally an image such as a picked up image includes noise. If this image noise is taken into consideration, then even if the global motion vector and the local motion vector do not coincide with each other, there is the possibility that the target block may possibly be a background portion. Then, it is considered that, with regard to such a target block as just described above, the difference between the correlation value regarding the reference block corresponding to the local motion vector and the correction value regarding the reference vector corresponding to the global motion vector is smaller than that provided by the image noise.

Therefore, in the present embodiment, the correlation value regarding the reference block corresponding to the global motion vector is corrected into a value which reflects the difference value provided by the image noise. Then, the corrected correlation value and the correlation value regarding the reference block corresponding to the local motion vector are compared with each other. Then, if the corrected correlation value is higher, that is, if the SAD value is lower, then it is evaluated that the target block is a background image portion. In other words, in the present embodiment, the background coincidence degree is evaluated based on the corrected correlation value. At this time, it is considered that the global motion vector coincides with an original local motion vector regarding the target block.

Then, in the present embodiment, if it is decided as a result of the evaluation of the background coincide degree that the target block is a background image portion, then the global motion vector is outputted as an output motion vector regarding the target block. On the other hand, if it is decided as a result of the evaluation of the background coincidence degree that the target block does not coincide with a background image portion, then the local motion vector is outputted as an output motion vector regarding the target block. In the present embodiment, the output motion vector is a motion vector for processing at a succeeding stage, in the present embodiment, a motion vector for noise reduction processing.

It is to be noted that, if the global motion vector and the local motion vector fully coincide with each other, then any of the global motion vector and the local motion vector may naturally be determined as the output motion vector.

In the present embodiment, the output motion vector in a unit of a target block obtained in such a manner as described above is used to carry out positioning of the reference frame in a unit of a block to produce a motion compensation image, that is, a motion compensation frame. Then, the target frame and the motion compensation frame are superposed on each other to produce a reduced noise image.

Figure 9:
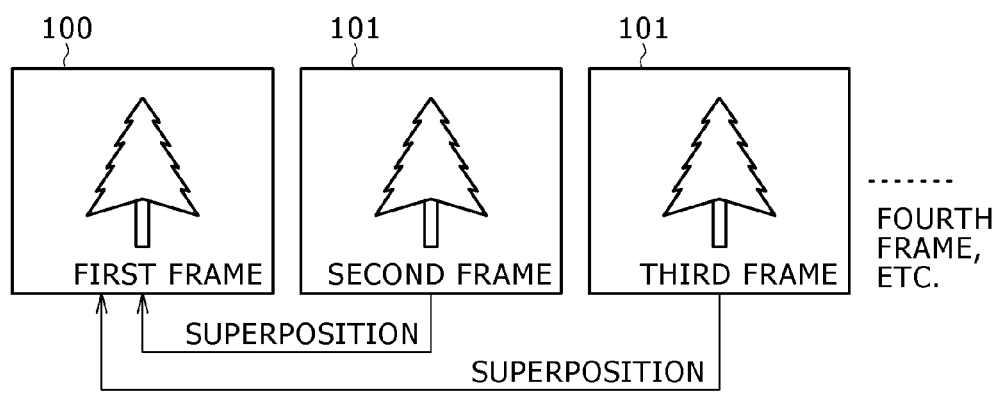

Then, the image pickup apparatus picks up, upon still picture image pickup, a plurality of still images as seen in FIG. 9 at a high speed and determines the first still picture picked up image as a target frame 100. Then, the image pickup apparatus determines a predetermined number of still picture picked up images including the second and succeeding still picture picked up images as reference frames 101 and carries out superposition of the reference frame 101. Then, the image pickup apparatus records a resulting image of the superposition as a still picture picked up image.

In particular, if the image pickup person depresses the shutter button of the image pickup apparatus, then the predetermined number of still images are picked up at a high speed.

Then, on the still image or frame picked up first, a plurality of still images or frames picked up later in time are superposed and recorded.

Figure 10:
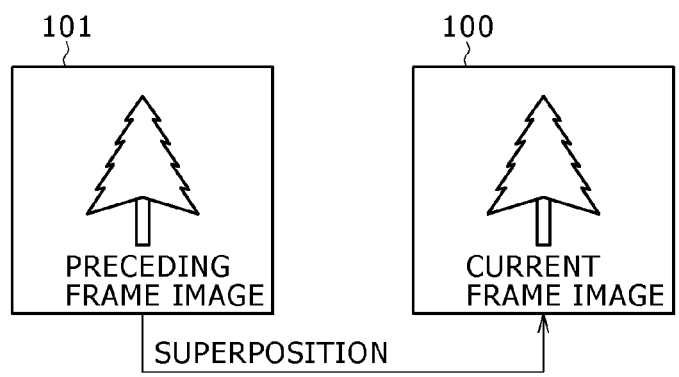

It is to be noted that, though not described in the description of the present embodiment, upon moving picture image pickup, an image of a current frame currently outputted from the image pickup element is determined as an image of the target frame 100, and images in the past of preceding frames are determined as images of the reference frames 101 as seen in FIG. 10. In other words, upon moving picture image pickup, in order to carry out noise reduction of an image of the current frame, images of preceding frames to the current frame are supposed on the current frame.

Example of the Hardware Configuration of the Image Pickup Apparatus

FIG. 1 shows an example of an image pickup apparatus as an image processing apparatus according to an embodiment.

Referring to FIG. 1, the image pickup apparatus shown includes a central processing section (CPU) 1 connected to a system bus 2. The image pickup apparatus further includes a pickup image signal processing system 10, a user operation inputting section 3, an image memory section 4 and a recording and reproduction apparatus section 5 connected to the system bus 2. It is to be noted that, though not shown in FIG. 1, the CPU 1 includes a ROM (Read Only Memory) in which a program for carrying out various software processes is stored, a RAM (Random Access Memory) for a working area and so forth.

The image pickup signal processing system 10 of the image pickup apparatus of FIG. 1 carries out such a recording process of picked up image data as hereinafter described in response to an image pickup recording starting operation through the user operation inputting section 3. Further, the pickup image signal processing system 10 carries out a reproduction process of picked up image data recorded on a recording medium of the recording and reproduction apparatus section 5 in response to a reproduction starting operation of picked up recorded images through the user operation inputting section 3.

As shown in FIG. 1, in the pickup image signal processing system 10, incident light from an image pickup object received through a camera optical system not shown including an image pickup lens 10L is irradiated upon an image pickup element 11 to pick up an image. In the present embodiment, the image pickup element 11 is formed from a CCD (Charge Coupled Device) imager. It is to be noted that the image pickup element 11 may otherwise be formed from a CMOS (Complementary Metal Oxide Semiconductor) imager.

In the image pickup apparatus, if an image pickup recording starting operation is carried out, then an image inputted through the image pickup lens 10L is converted into a pickup image signal by the image pickup element 11. Then, an analog pickup image signal in the form of a raw signal of a bayer array formed from three primary colors of red (R), green (G) and blue (B) is outputted as a signal synchronized with a timing signal from a timing signal generation section 12 from the image pickup element 11. The outputted analog pickup image signal is supplied to a pre-processing section 13, by which pre-processes such as correction of defects and γ correlation are carried out, and a resulting analog image signal is supplied to a data conversion section 14.

The data conversion section 14 converts the analog pickup image signal in the form of a raw signal inputted thereto into a digital pickup image signal or YC data composed of a luminance signal component Y and color difference signal components Cb/Cr. The digital pickup image signal from the data conversion section 14 is written into the image memory section 4 in accordance with an image pickup instruction received through the user operation inputting section 3.

In particular, if the image pickup instruction received through the user operation inputting section 3 is a still picture pickup instruction originating from depression of the shutter button, then the digital pickup image signal from the data conversion section 14 is written into frame memories 41 to 4N. In this instance, a plurality of frames of the digital pickup image signal from the data conversion section 14 to be superposed on each other as described hereinabove are written into the first to Nth frame memories 41 to 4N (N is the number of still pictures to be superposed) of the image memory section 4.

In the present embodiment, image data of the first frame upon depression of the shutter button is written as image data of a target frame into the first frame memory 41. Then, data of the second and succeeding frame images are successively written as image data of reference frames into the second to Nth frame memories 42 to 4N.

After the plural images of different frames are written into the image memory section 4, the image data of the target frame and the image data of the reference frames are read in by a motion vector calculation section 15. Then, the motion vector calculation section 15 carries out such detection of local motion vectors LMV, calculation of the reliability of the local motion vectors LMV, calculation of a global motion and calculation of a global motion vector GMV as hereinafter described. In addition, the motion vector calculation section 15 carries out an evaluation of a background coincidence degree for the target block to produce a hit ratio β.

In the present embodiment, the motion vector calculation section 15 outputs information of image data TGv of the target frame, image data REFv of the reference frames and a hit ratio β. Further, the vector detection section 15 outputs information of a noise reduction motion vector MVnr formed from the global motion vector GMV or the local motion vector LMV.

The information of the noise reduction motion vector MVnr and the image data REFv of the reference frames from the motion vector calculation section 15 are supplied to a motion compensation picture production section 16. The motion compensation picture production section 16 applies processing corresponding to a global motion, that is, a transformation process including parallel movement, rotation and expansion or contraction, based on the noise reduction motion vector MVnr to the image data REFv of the reference frames to produce a motion compensation image.

Then, the image data TGv of the target frame from the motion vector calculation section 15 is supplied to an addition section 17, and image data MCv of the motion compensation image from the motion compensation picture production section 16 is supplied to the addition section 17.

Further, the image data TGv and the hit ratio β of the target frame from the motion vector calculation section 15 are supplied to an addition ratio calculation section 21. The addition ratio calculation section 21 calculates an addition ratio α for each target block of the target frame in accordance with the hit ratio β representative of a background coincidence degree. Then, the addition ratio calculation section 21 supplies the addition ratio α calculated for each target block to the addition section 17.

The addition section 17 adds the pixels at corresponding positions of the image data TGv and MCv to carry out a superposition process of the images, and outputs image data MTXv of a resulting sum image which is a reduced noise image. This image superposition is carried out in a unit of a target block. In particular, to the image data of the target block, the image data of a corresponding block of the image data MCv of the motion compensation image is added at the addition ratio α.

The image data MTXv of the sum image from the addition section 17 is overwritten as image data of the target frame on image data of the preceding target frame into the first frame memory 41 of the image memory section 4.

In particular, the image data of the target frame of the first frame memory 41 first is the image data of the first frame immediately after the shutter button is depressed. Then, if the image data MCv of the motion compensation image of the second reference frame and the target frame are added, then the image data of the target frame of the first frame memory 41 is re-written into the image data MTXv of the sum image of the result of the addition.

Then, the image data MTXv of the sum image is used as image data of the target frame for the image data of the third reference frame. Then, the noise reduction motion vector MVnr is calculated similarly as described above by the motion vector calculation section 15, and an image superposition process is carried out by the addition section 17.

Then, the image data MTXv of the sum image of the result of the addition is overwritten as image data of the target frame on the image data of the preceding target frame into the first frame memory 41 of the image memory section 4. Thereafter, similar processing operation is carried out also for each of the fourth and succeeding frames as a reference image.

Accordingly, after the superposition process of the images up to the Nth image as a reference image is carried out, a reduced noise image wherein all of the N frames to be superposed are superposed is written in the first frame memory 41 of the image memory section 4.

Then, the image data MTXv of the sum image as a reduced noise image of the result of the superposition stored in the first frame memory 41 of the image memory section 4 is supplied to a still picture codec section 18 through the system bus 2 and codec converted by the still picture codec section 18. Output data from the still picture codec section 18 is recorded on the recording medium such as, for example, a DVD (Digital Versatile Disc) or a hard disk of the recording and reproduction apparatus section 5. In the present embodiment, the still picture codec section 18 carries out an image compression coding process for a still picture in accordance with the JPEG (Joint Photographic Experts Group) system.

Further, in the still picture image pickup mode, before the shutter button is depressed, image data from the data conversion section 14 is supplied to a resolution conversion section 19 through the first frame memory 41 of the image memory section 4. Then, the image data is converted into data of a predetermined resolution by the resolution conversion section 19 and then supplied to an NTSC (National Television System Committee) encoder 20. The NTSC encoder 20 converts the image data into a standard color image signal of the NTSC system. Then, the resulting standard color image signal is supplied to a monitor display section 6, and a reproduction image in the state of a still image pickup mode is displayed on the display screen of the monitor display section 6.

The image data of the still pictures recorded on the recording medium of the recording and reproduction apparatus section 5 are read out in response to a reproduction starting operation through the user operation inputting section 3 and supplied to the still picture codec section 18, by which they are decoded for reproduction. Then, the image data of a still picture decoded for reproduction is supplied to the NTSC encoder 20 through a buffer memory not shown of the image memory section 4 and converted into a standard color image signal of the NTSC system by the NTSC encoder 20. Then, the standard color image signal is supplied to the monitor display section 6, and a reproduction image thereof is displayed on the display screen of the monitor display section 6.

It is to be noted that, though not shown in FIG. 1, an output image signal from the NTSC encoder 20 can be derived to the outside through an image output terminal.

It is to be noted that, while, in the present embodiment, image data is recorded in a compressed form by the still picture codec section 18, the still picture codec section 18 may be omitted such that the image data is recorded but not in a compressed form.

Further, it is possible to form the motion vector calculation section 15 and the motion compensation picture production section 16 described above from hardware. Also it is possible to form the motion vector calculation section 15 and the motion compensation picture production section 16 using a DSP (Digital Signal Processor). Further, the motion vector calculation section 15 and the motion compensation picture production section 16 may be replaced by software processing by the CPU 1.

Similarly, it is possible to form also the addition section 17 from hardware or using a DSP. Further, also the addition section 17 may be replaced by software processing by the CPU 1. This similarly applies also to the still picture codec section 18.

Motion Vector Calculation Section 15

In the present embodiment, the motion vector calculation section 15 carries out a block matching process using SAD values described hereinabove with reference to FIGS. 2A to 7 to carry out detection of a local motion vector LMV. It is to be noted, however, that, in the present embodiment, the motion vector calculation section 15 is formed from such hardware as hereinafter described, and a local motion vector LMV is calculated by a layered block matching process.

Further, as described hereinabove, the motion vector calculation section 15 calculates also an index to reliability of each of local motion vectors LMV.

Further, the motion vector calculation section 15 uses only those local motion vectors which have high reliability to calculate a global motion. Then, the motion vector calculation section 15 calculates a global motion vector in a unit of a block from the calculated global motion. Furthermore, the motion vector calculation section 15 carries out decision of whether or not each target block is a background portion or a moving image pickup object portion to calculate a hit ratio β representative of a background coincidence degree.

<Layered Block Matching Process>

In a motion vector detection process in generally known block matching, a reference block is moved in a unit of a pixel, that is, in a unit of one pixel or in a unit of a plurality of pixels, within a search range, and a SAD value of the reference block at each moved position is calculated. Then, a SAD value which indicates the lowest value from among the SAD values calculated in this manner is detected, and a motion vector is detected based on the reference block position which indicates the lowest SAD value.

Further, in the present embodiment, since one frame is divided into a large number of blocks, the block matching process described above is carried out for the entire screen image by successively changing over the target block and the reference block. Calculation of local motion vectors LMV of all target blocks in the target frame is carried out thereby.

However, such a known motion vector detection process as described above has a problem in that, since a reference block is moved in a unit of a pixel within a search range, the number of times of the matching process for calculating the SAD value increases to increase the matching process time in proportion to the search range. Further, the known motion vector detection process has another problem that also the capacity of the SAD table increases.

This problem is significant particularly if it is taken into consideration that increase of the number of pixels of a still image and enhancement of the definition (higher definition) of moving pictures advance and the size of one image becomes very great. The known motion vector detection process further has a problem in that the number of times by which the image memory is accessed through the system bus 2 increases and the bus band must be increased.

Taking the foregoing into consideration, in the present embodiment, the layered block matching is carried out wherein a target image or target frame and a reference image or reference frame are reduced in size first to prepare reduced images and intermediate images and then a motion vector search by block matching is carried out in order of the reduced images, intermediate images and original images while reflecting a result of the block matching at the preceding stage on the search at the next stage.

By carrying out the layered block matching, calculation of local motion vectors is carried out efficiently with a comparatively small amount of calculation and comparatively short processing time. It is to be noted that a reduced image is hereinafter referred to as reduction plane, an intermediate image is hereinafter referred to as intermediate plane, and an original image which is not in a reduced form is hereinafter referred to as base plane.

Figure 11:
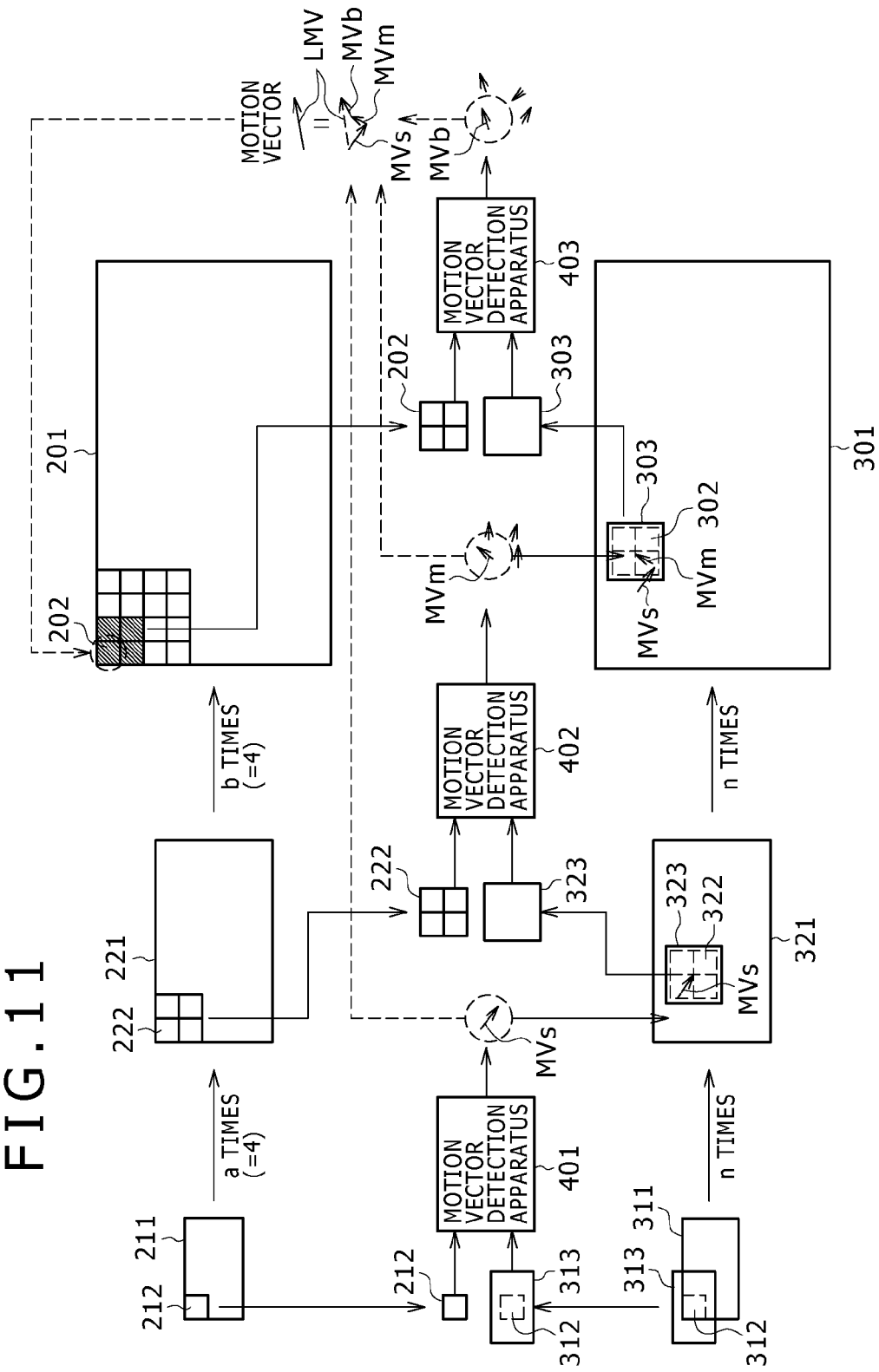
FIG. 11 is a block diagram illustrating the block matching process by the image processing apparatus.

FIG. 11 illustrates the layered block matching. Referring to FIG. 11, in the example illustrated, a base plane target frame 201 and a base plane reference frame 301 are reduced in size to 1/a·1/b (1/a and 1/b are reduction ratios where a>1 and b>1) to produce a reduction plane target frame 211 and a reduction plane reference frame 311, respectively.

Then, the base plane target frame 201 and the base plane reference frame 301 are reduced to 1/b to produce an intermediate plane target frame 221 and an intermediate plane reference frame 321, respectively.

Although arbitrary scales can be used for the reduction plane and the intermediate plane with respect to the base plane, they may be suitably set to 1/2 to 1/8 time, that is, 1/4 to 1/64 time as converted into a pixel number. It is to be noted that, in the example of FIG. 11, the reduction ratio of the reduction plane to the intermediate plane is 1/4, that is, a=4, and the reduction ratio of the intermediate plane to the base plane is 1/4, that is, b=4.

Also for production of the reduction plane and the intermediate plane, an arbitrary method may be applied. However, if a method wherein pixels of an original image are merely sampled out in response to a reduction ratio to produce a reduction plane or an intermediate plane is applied, then reflection components are generated and a motion vector which is detected in the first layer (reduction plane) becomes likely to be displaced from a correct motion vector. Therefore, usually a low-pass filter having a cutoff frequency band suitable for a reduction ratio is applied to an original image first, and then the sampling suitable for the reduction ratio is carried out.

In the present embodiment, a luminance average value is calculated among pixels including those pixels which disappear by sampling in accordance with a scale and is used as a reduction plane pixel or an intermediate plane pixel. In particular, in the case of 1/a reduction, a luminance average value in a square region of a×a pixels is calculated and used as a luminance value of a reduction plane pixel or an intermediate plane pixel. In this instance, even if an intermediate plane is formed first and then a reduction plane is produced from the intermediate plane, a same result as that obtained where a reduction plane is produced immediately from an original screen image is obtained. Therefore, this method is higher in efficiency.

It is to be noted that, when a reduction image is to be produced, the reduction ratio in the horizontal direction and the reduction radio in the vertical direction may be same as in the case described above or may otherwise be different from each other.

After a reduction plane and an intermediate plane are produced in such a manner as described above, a reduction plane target block 212 is set to the reduction plane target frame 211 and a reduction plane search range 313 is set to the reduction plane reference frame 311 first.

Then, the block matching process described hereinabove is carried out for a plurality of reduction plane reference blocks 312 in the reduction plane search range 313 by a reduction plane motion vector detection apparatus 401 to detect a reduction plane reference block position which exhibits the lowest SAD value. Then, a reduction plane motion vector MVs is detected based on the detection of the position of the reproduction plane reference block.

In the present example, the motion vector detection apparatus 401 executes the processing for a block matching processing unit which is a block of a size of the reduction plane target block 212, that is, a block of the pixel number in the horizontal direction×line number in the vertical direction.

After the calculation of the reduction plane motion vector MVs ends, an intermediate plane target block 222 is set on the intermediate plane target frame 221 which is equal in size to the reduction plane target frame 211 multiplied by A.

In the example of FIG. 11, an intermediate plane motion vector detection apparatus 402 carries out the block matching process for an intermediate target block which is a block of a size same as that of the block matching processing unit of the reduction plane motion vector detection apparatus 401. The block of a same size is a block of an equal pixel number and includes an equal number of pixels in the horizontal direction×an equal number of lines in the same vertical direction.

In the case of the present example, since the reduction plane has a size of 1/a of the intermediate plane, the number of intermediate plane target blocks 222 included in a region of the intermediate plane target frame corresponding to the reduction plane target block 212 is A. Accordingly, all of the number of intermediate plane target blocks 222 equal to A are set as a block matching processing object of the intermediate plane motion vector detection apparatus 402.

Then, in the intermediate plane reference frame 321 having a size equal to A times that of the reduction plane reference frame 311, an intermediate plane search range 323 centered at the reduction plane motion vector MVs is set. Then, the block matching process described above is carried out by the motion vector detection apparatus 402 for a plurality of intermediate plane reference blocks 322 within the intermediate plane search range 323 to detect an intermediate plane reference block position which exhibits the lowest SAD value to detect an intermediate plane motion vector MVm.

The intermediate plane motion vector detection apparatus 402 executes the block matching process, for each of the a intermediate plane target blocks, in the search range for each of the intermediate plane target blocks set in the intermediate plane search range 323 thereby to detect a motion vector of each of the intermediate plane target blocks. Then, that one of the plural motion vectors which exhibits the lowest SAD value is detected as the motion vector MVm of the intermediate plane, that is, as the intermediate plane motion vector.

After the calculation of the reduction plane motion vectors MVs ends, a base plane target block 202 is set in the base plane target frame 201 having a size equal to B times that of the intermediate plane target frame 221.

In the example of FIG. 11, also a base plane motion vector detection apparatus 403 carries out the block matching process for a processing unit block which is a block of a size same as those in the motion vector detection apparatus 401 and 402, that is, of an equal pixel number=equal pixel number in the horizontal direction×equal line number in the vertical direction.

Then, the intermediate plane motion vector MVm is obtained in a unit of a processing unit block as described hereinabove. Accordingly, the number of base plane target blocks 202 of the base plane target frame 201 which is an object of the base plane motion vector detection apparatus 403 is set so as to be equal to B times the number of blocks, that is, processing unit blocks, of a size equal to that of the reduction plane as indicated by slanting lines in FIG. 11.

On the other hand, in the base plane reference frame 301 having a size equal to B times that of the intermediate plane reference frame 321, a base plane search range 303 centered at a composite vector of the reduction plane motion vector MVs and the intermediate plane motion vector MVm is set. The block matching process described above is carried out for a plurality of base plane reference blocks 302 in the base plane search range 303 by the base plane motion vector detection apparatus 403 to detect the position of a base plane reference block which exhibits the lowest SAD value to detect a base plane motion vector MVb.

The reduction plane motion vector MVs and the intermediate plane motion vector MVm are obtained in a unit of a processing unit block of the same size. Therefore, the base plane search range 303 set centered at the composite vector of the reduction plane motion vector MVs and the intermediate plane motion vector MVm is a little greater than the region which includes the B base plane target blocks 202.

The base plane motion vector detection apparatus 403 executes the block matching process in a search range in the base plane target blocks set in the base plane search range 303 for the B base plane target blocks 202 thereby to carry out detection of a motion vector of the base plane target blocks. Then, that one of the plural motion vectors which exhibits the lowest SAD value is detected as a base plane motion vector MVb, that is, a base plane motion vector of the base plane.

Then, as a composite vector of the reduction plane motion vector MVs, intermediate plane motion vector MVm and base plane motion vector MVb determined in such a manner as described above, a local motion vector LMV of the base plane target block between the base plane target frame 201 and the base plane reference frame 301 is detected.

Such a layered block matching process as described above is executed for all regions of the target frame and the reference frame while the target block and the reference block are successively changed over. Consequently, all of a plurality of local motion vectors LMV in a unit of a plurality of target blocks set in the target frame are calculated.

In the example of FIG. 11, the motion vector detection apparatus 401, 402 and 403 actually are a substantially one apparatus but are different among them in the target block read out from the image memory section 4 and inputted and the reference block read out from within the search range.

It is to be noted that, where the base plane target frame 201 is configured so as to obtain the local motion vector LMV of all of the base plane target blocks 202, the changeover of the target block should be carried out in the following manner. In particular, the reduction plane target block is set, on the reduction plane, while successively displacing the reduction plane target block, in the horizontal direction, by an amount corresponding to the number of pixels in the horizontal direction in accordance with the scales 1/A and 1/B. Meanwhile, in the vertical direction, the reduction plane target block is set while successively displacing the reduction plane target block by an amount corresponding to the number of lines in the vertical direction in accordance with the scales 1/A and 1/B.

However, from the object that a global motion is determined from a plurality of local motion vectors LMV, the following countermeasure may be taken. In particular, the reduction plane target block is set successively displacing the same in the horizontal direction and the vertical direction such that the local motion vector LMV is obtained regarding the base plane target blocks at skipping positions of the base plane target frame 201.

It is to be noted that the layered block matching described above may otherwise be carried out only with two layered of the reduction plane and the base plane with the intermediate plane omitted, or may include a plurality of intermediate layers for different intermediate planes. However, if the reduction ratio is so high that a moving image pickup object and the background are included in the same section block, then care must be taken. In particular, motion vectors which should originally be detected as different motion vectors are handled as a single motion vector, and since recovery is impossible in later layers, selection of the reduction ratio must be carried out carefully.

Figure 12:
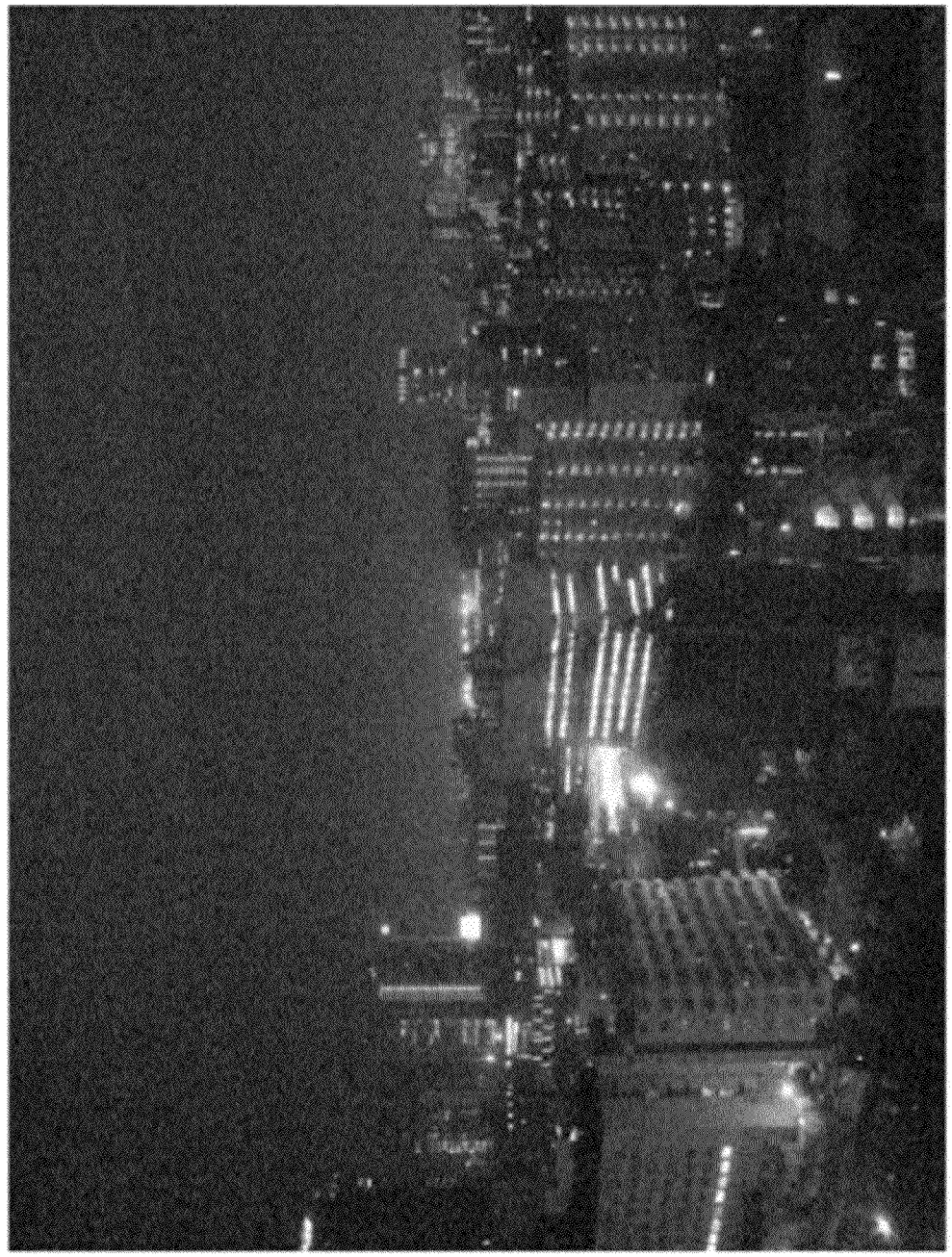
FIG. 12 is a schematic view showing an example of a picked up image by the image processing apparatus.
Figure 13:
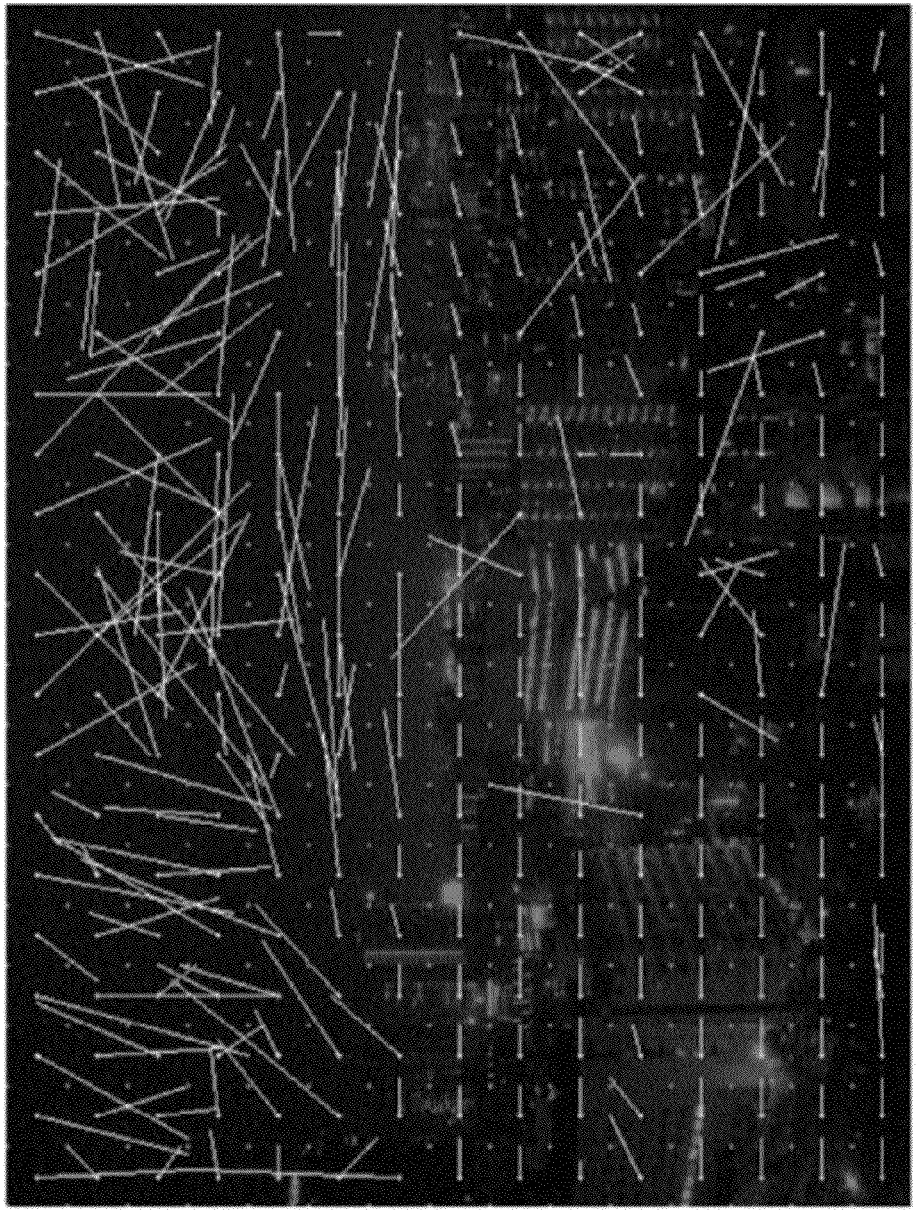
FIG. 13 is a schematic view showing local motion vectors detected by the image processing apparatus in an associated relationship with the picked up image of FIG. 12.

Calculation of Reliability of the Local Motion Vector LMV

Where an image having a comparatively great amount of noise is a target image, frequently a correct vector cannot be obtained because the SAD value is influenced by the noise. FIG. 12 is a photograph of a night view, which includes a comparatively great amount of noise. If motion vectors between the image of FIG. 12 and an image, as a reference image, picked up with camera shake in the leftward direction while a very small amount of rotation is involved are illustrated, then such a result as shown in FIG. 13 is obtained. FIG. 13 is obtained by plotting reduction plane motion vectors of a reduced image obtained by reducing the original picture to 1/8.

As can be seen from FIG. 13, motion vectors of the night sky whose texture is not particularly clear are obtained as quite diverse motions. In the layered block matching, since a low-pass filter is applied upon production of a reduced image, the noise resisting property is comparatively high. However, the reduced image is influenced by noise as seen in FIG. 13.

Since the local motion vector LMV of the base plane is obtained by search around a reduction plane motion vector, if the reduced plane motion vector is displaced from a correct motion vector, then recovery is ineffective and the reduction plane motion vector is influenced directly by noise and is further disordered.

Even if a picked up image having no noise at all is an object image, if the texture of the image is not clear, then the variation of the gradation by a small variation of external light upon consecutive shooting image pickup or by a difference in exposure time is greater, and the detected motion vector is frequently displaced from a correct value. Further, while a large number of trees or artificial structures such as buildings have many repeated patterns of a texture, even with such a repeated pattern of a texture as just described, a detected motion vector is likely to be displaced from a correct value.

Assuming such a case as just described, an attempt of calculating a global motion using only motion vectors having high reliability has been used in related art. For example, it has been proposed to carry out edge detection of a target image and determine a motion vector of a block having a clear edge as a motion vector having high reliability. Also it has been proposed to calculate reliability using a DC component and AC components of a result of IDCT (Inverse Discrete Cosine Transform) of a target image.

Also a method has been proposed wherein characteristic points on a target image are detected using a corner detector which is a kind of filter so that resulting motion vectors have high reliability. Also a technique has been proposed to extract, from an assumption that a positional relationship of a plurality of characteristic points is maintained also on a reference image, a motion vector of high reliability from a combination of a plurality of motion vectors at different points.

However, such known techniques as described above do not assume an image of high noise and apparently fail with an image having noise of a very high level.

In the present embodiment, taking the foregoing situation described above into consideration, a countermeasure is taken to obtain a reliability index value with which the reliability of a motion vector even of an image in a high noise environment can be evaluated effectively.

In the present embodiment, the difference or ratio of a first maximum value and a second maximum value from among correlation values between a target block and a reference block is used as an index value to the reliability of a motion vector. In the present embodiment, since a correlation value between the target block and the reference block is detected as a SAD value, the first maximum value and the second maximum value of the correlation value are a first minimum value and a second minimum value of the SAD value, respectively.

Figure 14:
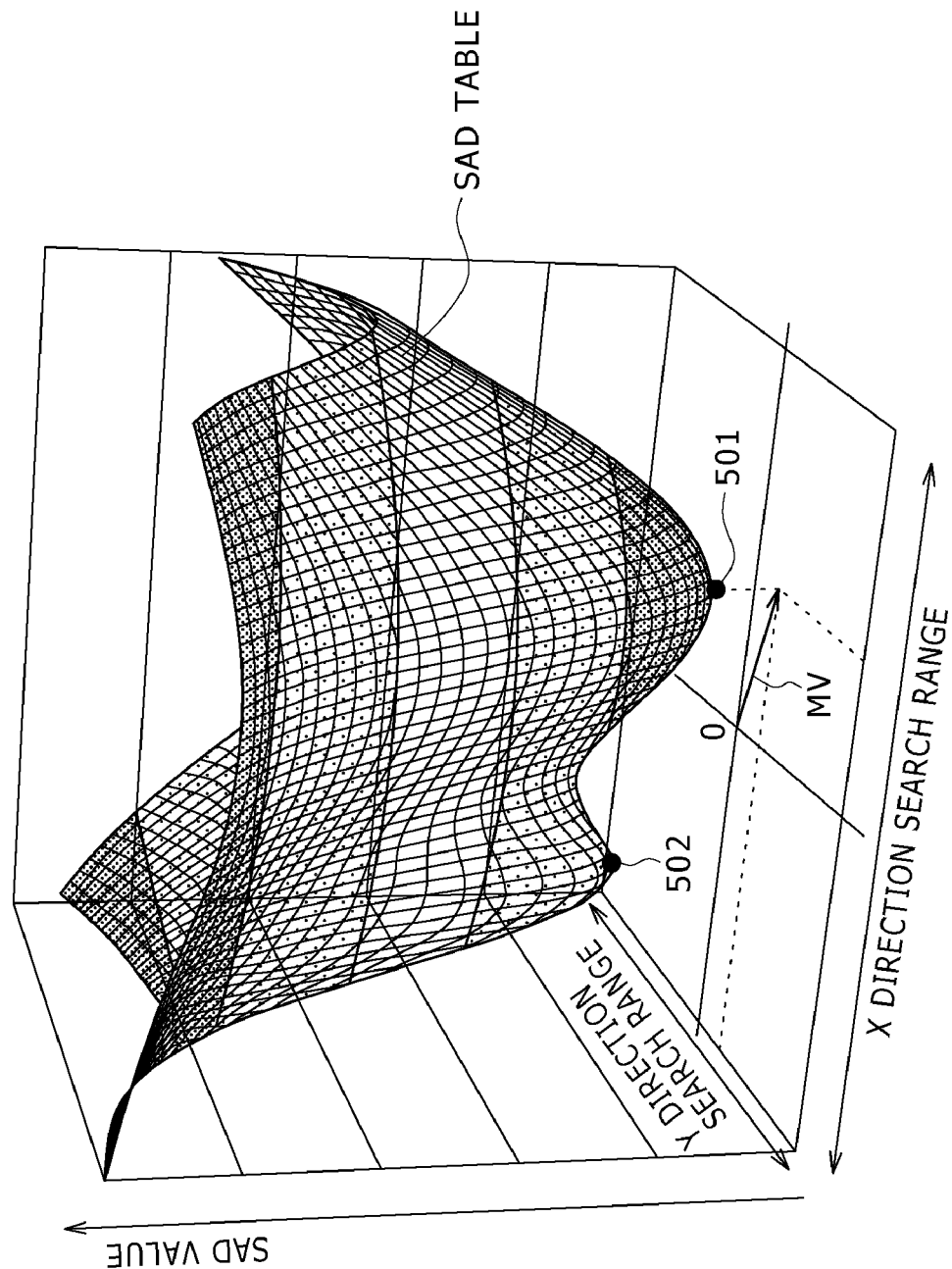
FIG. 14 is a diagrammatic view illustrating a SAD table used by the image processing apparatus.

FIG. 14 schematically illustrates SAD values of a SAD table regarding one target block. In FIG. 14, the search range is represented as a two-dimensional range in the horizontal direction or x direction and the vertical direction or y direction of the image, and the SAD values are taken in the heightwise direction, that is, in a direction perpendicular to the x and y directions. Consequently, the SAD table is represented as a cubic curved face.

In an ordinary block matching process, in order to detect a motion vector, only the lowest value of the SAD value in the SAD table is determined as a detection object. However, this lowest value of the SAD value is the first minimum value of the SAD value in the SAD table, and in FIG. 14, the value assumes the position represented by a point 501. In FIG. 14, a motion vector MV is detected as a vector from the origin of the movement, that is, (x=0, y=0) to the minimum value position of the SAD value indicated by the point 501.

If an ideal state in which no noise exists is considered, then when a correlation value between a plurality of reference blocks and a target block within a search range is determined, the SAD table represented by a cubic curved face exhibits a state wherein the cubic curved face is uniformly downwardly convex and only one minimum value of the SAD value exists. However, in an actual image pickup situation, the SAD table represented by a cubic curved face scarcely indicates a uniformly downwardly convex shape but usually has a plurality of minimum values of the SAD value because not only of an influence of a light amount variation, a motion of a moving body or the like but also of various kinds of noise.

Therefore, in the present embodiment, the motion vector MV is detected based on the position of a reference block which exhibits the first minimum value equal to the lowest value of the SAD value. However, a minimum value from among the SAD values except the first minimum value of the SAD value, that is, the second minimum value of the SAD value, is detected for production of an index to the reliability. In FIG. 14, the position indicated by the point 501 represents the first minimum value, and the position indicated by another point 502 represents the second minimum value.

If the influence of noise and so forth is limited, then the difference between the first minimum value of the SAD value and the second minimum value of the SAD value is great, and the reliability of the motion vector MV detected from the first minimum value of the SAD value, that is, from the lowest value of the SAD value, is high. On the other hand, in another environment which includes much noise and so forth, the difference between the first minimum value of the SAD value and the second minimum value of the SAD value is small, and it cannot be discriminated which one of the first and second minimum values of the SAD value corresponds correctly to the motion vector MV. Therefore, the reliability is low.

Figure 15:
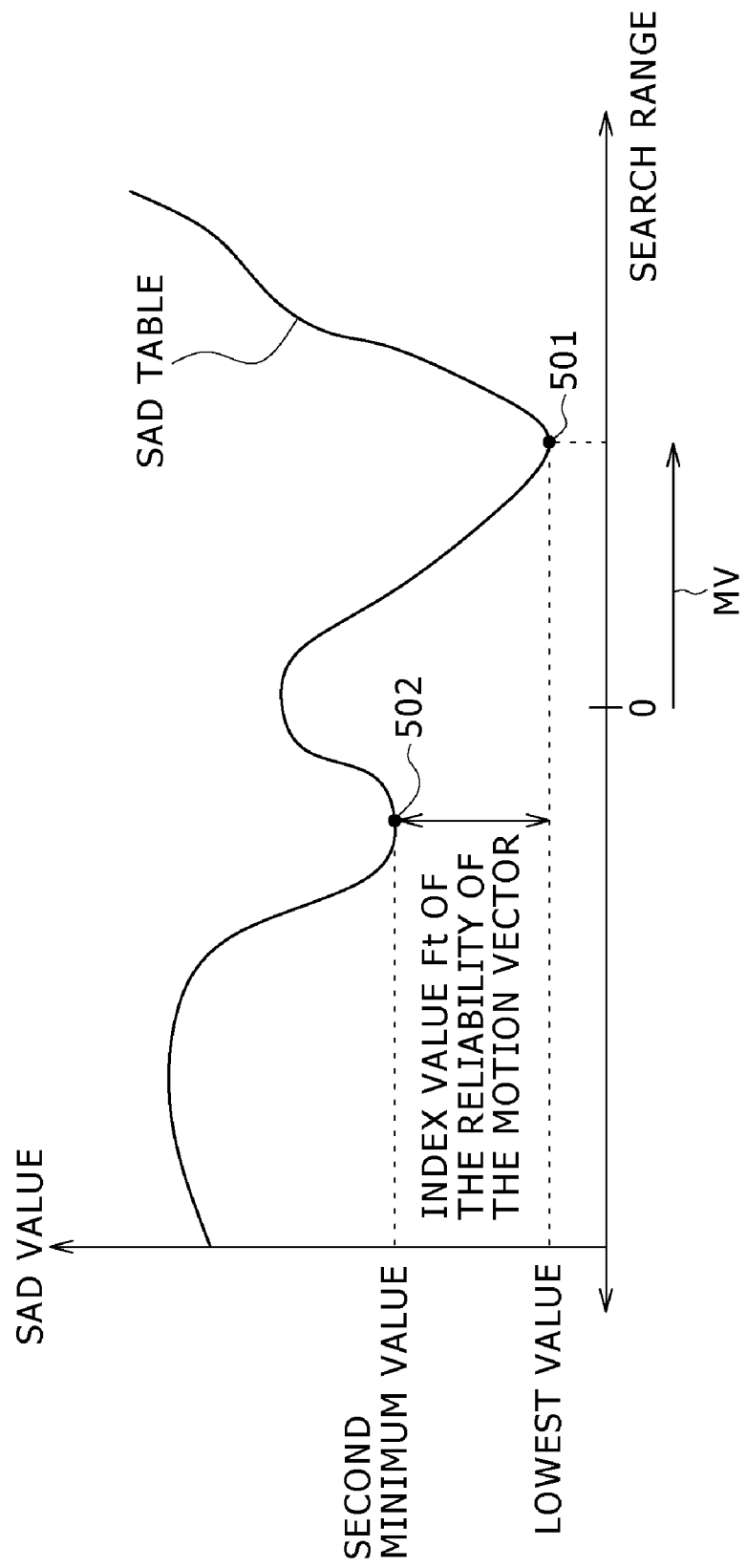
FIG. 15 is a diagrammatic view showing the SAD table of FIG. 14 taken on a one-dimensional axis.

From the foregoing, in the present embodiment, the difference between the first minimum value of the SAD value, that is, the lowest value of the SAD value, and the second minimum value of the SAD value is determined as an index to the reliability of the detected motion vector. A SAD table wherein the search range in FIG. 14 is represented on a one-dimensional axis is illustrated in FIG. 15. In the present embodiment, the value of the difference between the second minimum value and the first minimum value, that is, the lowest value of the SAD value, in FIG. 15 is determined as an index value Ft of the motion vector MV.

It is to be noted that, where only a first minimum value of the SAD value is obtained but a second minimum value is not obtained, in the present embodiment, the theoretically highest value of the SAD value or the highest value of the SAD value in the SAD value table is determined as a reliability index value of the motion vector MV. Accordingly, it is determined that the motion vector of such a block as just described is high. However, since a block of the type described seldom exists, a motion vector of a block from which only the first minimum value of the SAD value is obtained but no second minimum value is obtained may be excluded from evaluation of the reliability.

It is to be noted that, in place of the difference between the first minimum value of the SAD value, that is, the lowest value of the SAD value and the second minimum value of the SAD value, the ratio between the first minimum value of the SAD value, that is, the lowest value of the SAD value and the second minimum value of the SAD value may be used as the index value Ft of the reliability of the motion vector MV. However, in the following description, the difference between the first minimum value of the SAD value, that is, the lowest value of the SAD value and the second minimum value of the SAD value is used as the index value Ft of the reliability of the motion vector.

According to the reliability index of a motion vector in the present embodiment, since not an image component such as an edge or a characteristic of an image as in the related art but only a correlation value between a target frame and a reference frame is used, the robustness against noise is high. In other words, a reliability index of a motion vector having high accuracy is obtained without being influenced by noise of an image.

Further, in the present embodiment, also that the difference or ratio between the first maximum value of the correlation value, that is, the first minimum value of the SAD value and the second maximum value of the correlation value, that is, second minimum value of the SAD value is used makes a reason that the reliability index of the motion vector in the present embodiment has high robustness against noise.

In particular, if the noise level rises, then even if the motion vector is correct, generally the SAD value of the motion vector rises. Therefore, where a threshold value is set for the reliability index value Ft of the motion vector to carry out a comparison process with the threshold value in order to extract a motion vector having high reliability, it is necessary to vary also the threshold value itself in response to the noise level.

In contrast, where the reliability index value Ft of the motion vector in the present embodiment is used, if the noise level rises, then both of the first maximum value of the correlation value, that is, the first minimum value of the SAD value and the second maximum value of the correlation value, that is, the second minimum value of the SAD value rise in response to the noise level. Therefore, the influence of noise on the difference between the first maximum value of the correlation value, that is, the first minimum value of the SAD value and the second maximum value of the correlation value is canceled.

In other words, a threshold value process of a fixed value which does not depend upon the noise level can be achieved. This similarly applies also where the ratio between the first maximum value of the correlation value, that is, the first minimum value of the SAD value and the second maximum value of the correlation value, that is, the second minimum value of the SAD value is used as the reliability index value Ft of the motion vector.

Incidentally, where the contrast of an image of an object block for which block matching is to be carried out is low, the difference between the second minimum value of the SAD value and the lowest value of the SAD value has a tendency to decrease. Therefore, when the same frame includes a region having a high contrast and another region having a low contrast, if the same threshold value is used for evaluation of the evaluation value Ix of the vector reliability, then the region having the high contrast is likely to be selected preferentially.

Although this is a correct result from a point of view of reliability of the motion vector, in order to relieve regions having a low contrast to some degree, in the present embodiment, a term for moderating the influence of the contrast is added to a mathematical operation expression for determining an index value to the reliability of a motion vector. In particular, the difference between the value of the highest luminance and the value of the lowest luminance of an image of a target frame is determined, and the difference in luminance is reflected on the index value to the reliability of the motion vector. It is to be noted that, in order to avoid a bad influence of noise, extraction of the highest luminance and the lowest luminance is carried out after a low-pass filter is applied to image data of the target frame.

Taking the foregoing into consideration, the calculation expression of the reliability index value Ft of the motion vector in the present embodiment is given as:

$$Ft=(Btm2SAD-\text{Min}SAD)-(MaxTAR-\text{Min}TAR)\times Co \quad \text{(expression 6)}$$

where
Ft: reliability index value of the motion vector
Btm2SAD: second minimum value of the SAD value
MinSAD: lowest value (first minimum value) of the SAD value
MaxTAR: highest luminance value of the target block
MinTAR: lowest luminance value of the target block
Co: weight coefficient ($\leqq 1$)

It is to be noted that, also where the ratio between the first maximum value of the correlation value and the second maximum value of the correlation value is used as the motion vector reliability index value, a term for moderating the influence of the contrast may be added to the reliability index value calculation expression quite similarly to the (expression 6) given hereinabove. However, in calculation of the reliability index value Ft of the motion vector, it is not essentially required to add a term for moderating the influence of the contrast, but the term may be omitted.

While, in the foregoing description, only the motion vector reliability index value of the base plane motion vector MVb is determined, naturally the motion vector reliability index value can be determined similarly also with regard to the reduction plane motion vector MVs or the intermediate plane motion vector MVm.

Calculation of the Global Motion and the Global Motion Vector GMV

In the related art, such a reliability index value of a motion vector as described above is not used. Therefore, all of a plurality of local motion vectors LMV determined with regard to a target frame are used with an equal weight to calculate a global motion.

In contrast, in the present embodiment, the reliability index value Ft of each of a plurality of local motion vectors LMV of a target frame can be obtained in such a manner as described above.

Then, the reliability index values Ft of the plural local motion vectors LMV determined in this manner can be normalized to set a weight coefficient, for example, equal to or higher than 0 but equal to or lower than 1 to each of the local motion vectors LMV. Then, the local motion vectors LMV can be used not with an equal weight but with weights determined in accordance with the respective weighting coefficients to calculate the global motion. In particular, when all of the plural local motion vectors LMV determined are used to start a convergence calculation for calculating a global motion, the local motion vectors LMV thereupon are used after they are weighted with weight coefficients corresponding to the respective reliability index values Ft.

However, in order to simplify the mathematic operation process of the global motion to reduce the mathematic operation load, in the present embodiment, the weighting coefficients W of the local motion vectors LMV are binarized to 0 and 1.

Therefore, in the present embodiment, a threshold value th for the reliability index value Ft of the motion vector is set, and the weighting coefficient W of each local motion vector LMV is calculated using the reliability index value Ft of each motion vector in accordance with the mathematical operation expressions:

when Ft>th, W=1, but when Ft$\leqq$th, W=0 \quad (expression 7)

In particular, in the present embodiment, the motion vector reliability index value Ft is used to decide the reliability of each of a plurality of local motion vectors LMV and only those local motion vectors LMV which have high reliability are extracted from among the plural local motion vectors LMV. Then, only the extracted local motion vectors LMV having high reliability are used to calculate the global motion.

In the present embodiment, since the number of target blocks in a target frame is comparatively great, even where a method of extracting only the local motion vectors LMV having high reliability as in the present example is used, a global motion having high accuracy can be calculated.

It is to be noted that a particular processing example of calculating a global motion from a plurality of local motion vectors LMV is hereinafter described.

Figure 16:
FIG. 16 is a view illustrating local motion vectors, which are determined to have high reliability by the image processing method, in an associated relationship the picked up image of FIG. 12.

It is described above that such local motion vectors as illustrated in FIG. 13 are obtained from the image having a great amount of noise described hereinabove with reference to FIG. 12. However, if decision of the reliability is carried out for the local motion vectors indicated on the image of FIG. 13 using the reliability index value of the motion vector according to the present embodiment to extract only those reliability index values which have reliability higher than a threshold value and then the blocks and the motion vectors are plotted, then such an image as seen in FIG. 16 is obtained. It is considered that, as regards the blocks shown in FIG. 16, substantially correct local motion vectors are obtained without being influenced by noise.

Example of the Hardware Configuration of the Motion Vector Calculation Section 15

The motion vector calculation section 15 carries out such processes as detection of a local motion vector LMV for each target block, calculation of a reliability index value to the detected local motion vector LMV, calculation of a global motion GM and a global motion vector GMV and so forth as described hereinabove.

Figure 17:
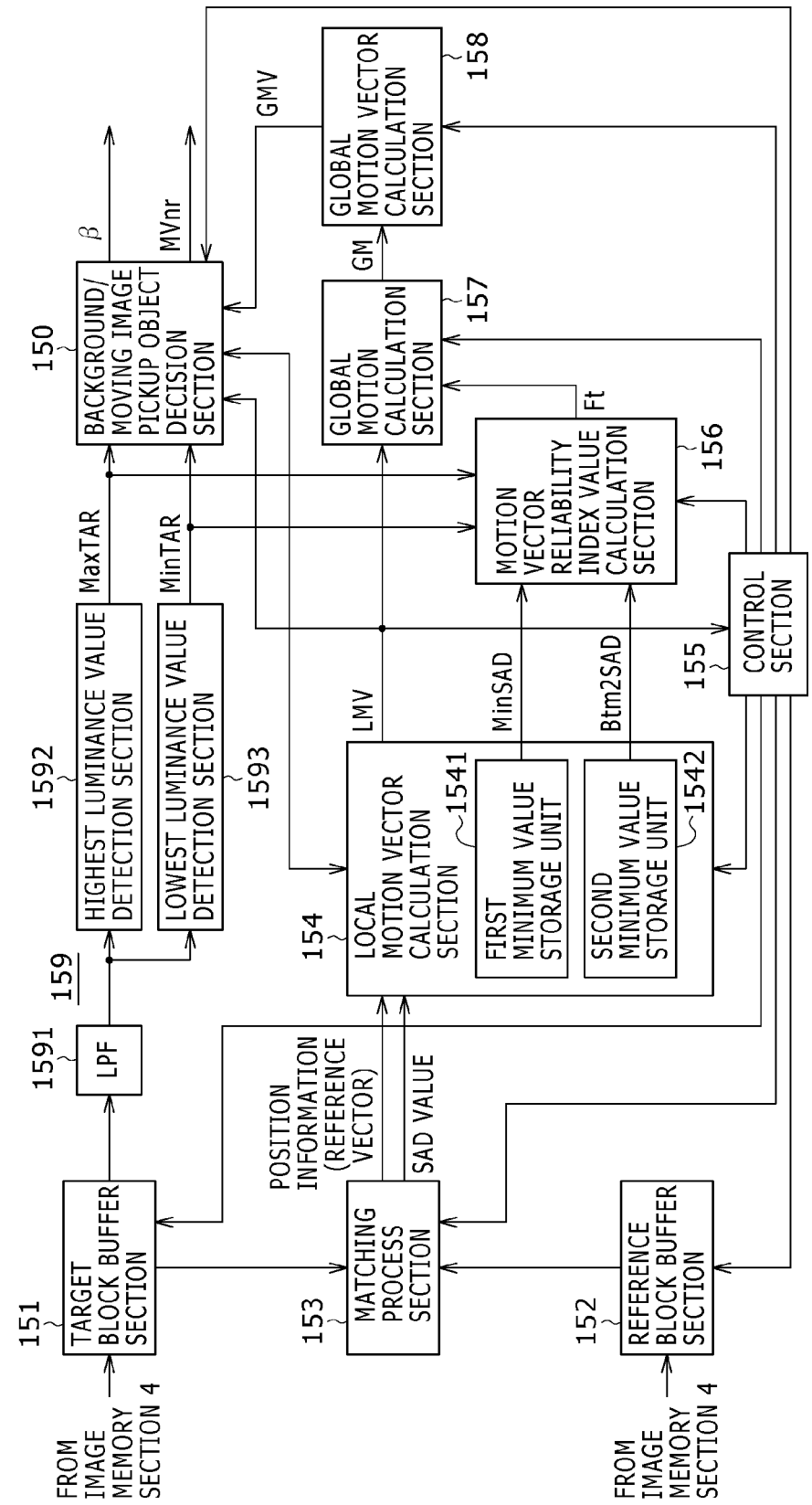
FIG. 17 is a block diagram showing an example of a configuration of a global motion vector calculation section of the image processing apparatus.

An example of the hardware configuration of the motion vector calculation section 15 is shown in FIG. 17. Referring to FIG. 17, the motion vector calculation section 15 includes a target block buffer section 151 for storing pixel data of a target block 102, and a reference block buffer section 152 for storing pixel data of reference blocks 108.

The global motion vector detection section 15 further includes a matching processing section 153 for calculating the SAD value of corresponding pixels of the target block 102 and the reference blocks 108. The motion vector detection section 15 further includes a local motion vector calculation section 154 for calculating local motion vectors from SAD value information outputted from the matching processing section 153. The motion vector detection section 15 further includes a control section 155, a motion vector reliability index value calculation section 156, a global motion calculation section 157, a global motion vector calculation section 158, a contrast calculation section 159, and a background/moving image pickup object decision section 150.

The contrast calculation section 159 includes a low-pass filter 1591, a highest luminance value detection section 1592 and a lowest luminance value detection section 1593.

Further, though not shown, in the present example, image data of the reduction plane and image data of the intermediate plane of a target frame and a reference frame of an original picture produced from image data of the target frame and the reference frame are stored and retained in the image memory section 4.

The control section 155 controls a processing sequence of the motion vector calculation section 15 and supplies control signals to the components of the motion vector calculation section 15 as seen in FIG. 17.

The target block buffer section 151 reads in image data of a designated target block from image data of a target frame of the reduction plane, intermediate plane or base plane of the image memory section 4 and supplies the image data to the matching processing section 153 under the control of the control section 155.

The reference block buffer section 152 reads in image data within a designated matching processing range from among the image data of a reference frame of the reduction plane, intermediate plane or base plane of the image memory section 4 under the control of the control section 155. Then, the reference block buffer section 152 supplies the image data of the reference block successively from among the image data within the matching processing range to the matching processing section 153.

The matching processing section 153 receives the image data of the target block from the target block buffer section 151 and the image data of the reference block from the reference block buffer section 152. Then, the matching processing section 153 carries out the block matching process for the reduction plane, intermediate plane and base plane under the control of the control section 155. Then, the matching processing section 153 supplies a reference vector, that is, position information of the reference block, and a SAD value of a result of the block matching process to the local motion vector calculation section 154.

The local motion vector calculation section 154 includes a first minimum value storage unit 1541 for a SAD value and a second minimum value storage unit 1542 for a SAD value and carries out a process of detecting a first minimum value of the SAD value and a second minimum value of the SAD value from among the SAD values from the matching processing section 153.

Then, the local motion vector calculation section 154 successively updates the first minimum value of the SAD value in the first minimum value storage unit 1541 for a SAD value and position information, that is, a reference vector, of the first minimum value of the SAD value and the second minimum value of the SAD value in the second minimum value storage unit 1542 for a SAD value and position information, that is, a reference vector, of the second minimum value of the SAD value. The local motion vector calculation section 154 carries out this updating process until the block matching process for all reference blocks in the matching processing range ends.

Then, when the block matching process ends, the first minimum value of the SAD value of the target block at the point of time and the position information or reference vector of the first minimum value of the SAD value are stored into the first minimum value storage unit 1541 for a SAD value. Further, the second minimum value of the SAD value and the position information or reference vector of the second minimum value of the SAD value are stored into the second minimum value storage unit 1542 for a SAD value.

Then, when the block matching process for all of the reference blocks within the matching processing range ends, the local motion vector calculation section 154 detects the information of the reference vector, that is, the position information, stored in the first minimum value storage unit 1541 for a SAD value as a motion vector in each of the reduction plane, intermediate plane and base plane. The processing operation of the local motion vector calculation section 154 is hereinafter described in detail.

The local motion vector calculation section 154 in the present embodiment supplies, upon reduction plane matching processing, a reduction plane motion vector MVs as a local motion vector LMV to the control section 155.

When a layered block matching process is to be carried out, the control section 155 determines a search range for the intermediate plane from the information of the reduction plane motion vector MVs. Then, the control section 155 supplies control signals to the target block buffer section 151, reference block buffer section 152 and matching processing section 153 so that they carry out block matching in the intermediate plane.

Then, when the matching process in the intermediate plane ends, the local motion vector calculation section 154 supplies information of a composite vector of the reduction plane motion vector MVs and the intermediate plane motion vector MVm as the local motion vector LMV to the control section 155.

The control section 155 determines a search range for the base planes from the information of the composite vector of the reduction plane motion vector MVs and the intermediate plane motion vector MVm. Then, the control section 155 supplies control signals to the target block buffer section 151, reference block buffer section 152 and matching processing section 153 so that they carry out block matching in the base plane.

As described hereinabove, the controller 155 can control to which layer the layered block matching should be carried out and whether or not a motion vector in the layer should be outputted as the local motion vector LMV.

For example, if it is desired to obtain a local motion vector LMV in short time even if the accuracy is sacrificed, then the local motion vector calculation section 154 may carry out only the reduction plane block matching process. On the other hand, where a local motion vector LMV of high accuracy is required, the local motion vector calculation section 154 may carry out a layered block matching process up to the base plane block matching process. Or, where the accuracy and the time are taken into consideration, the local motion vector calculation section 154 may possibly carry out a layered block matching process up to the intermediate plane block matching process.

When the layered matching process up to the base plane ends, the local motion vector calculation section 154 obtains information of the composite vector of the reduction plane motion vector MVs, intermediate plane motion vector MVm and base plane motion vector MVb as a local motion vector LMV as the local motion vector LMV. The local motion vector LMV is supplied to the global motion calculation section 157.

The global motion calculation section 157 temporarily stores the received local motion vector LMV.

Further, when the matching process of the local motion vector LMV by the local motion vector calculation section 154 ends, the motion vector reliability index value calculation section 156 is enabled by the control section 155. Meanwhile, the lowest value MinSAD of the SAD value of the first minimum value storage unit 1541 and the second minimum value Btm2SAD of the SAD value of the second minimum value storage unit 1542 are supplied from the local motion vector calculation section 154 to the motion vector reliability index value calculation section 156.

Further, at this time, the image data of the target block are supplied from the target block buffer section 151 to the highest luminance value detection section 1592 and the lowest luminance value detection section 1593 through the low-pass filter 1591. Then, the highest luminance value MaxTAR and the lowest luminance value MinTAR detected by the highest luminance value detection section 1592 and the lowest luminance value detection section 1593, respectively, are supplied to the motion vector reliability index value calculation section 156.

The motion vector reliability index value calculation section 156 uses the information supplied thereto to calculate the reliability index value Ft of the motion vector in accordance with the (expression 6) given hereinabove. Then, the motion vector reliability index value calculation section 156 supplies the calculated motion vector reliability index value Ft to the global motion calculation section 157. The global motion calculation section 157 temporarily stores the motion vector reliability index value Ft inputted thereto in an associated relationship with the local motion vector LMV supplied thereto at this time.

After the series of processes described above ends for all of the target blocks in the target frame, the control section 155 supplies a control instruction signal to the global motion calculation section 157 to start a mathematic operation process of the global motion.

In the present embodiment, the global motion calculation section 157 first carries out, in accordance with the control instruction signal from the control section 155, decision of the reliability of a plurality of local motion vectors LMV stored therein using the motion vector reliability index values Ft stored in a corresponding relationship to the local motion vectors LMV. In the present embodiment, the weighting coefficient W of each local motion vector LMV is calculated in accordance with the (expression 7) given hereinabove. Then, the global motion calculation section 157 extracts only those local motion vectors LMV whose weight coefficient W is W=1 and which indicate high reliability.

Then, the global motion calculation section 157 executes a mathematic operation process of calculating a global motion GM using only the extracted local motion vectors LMV which have high reliability. Then, the global motion calculation section 157 supplies the resulting global motion vector GM to the global motion vector calculation section 158.

The global motion vector calculation section 158 applies the global motion GM to the coordinate position, for example, to the center position, of the target block to calculate the global motion vector GMV of the target block.

The global motion vector calculation section 158 supplies the calculated global motion vector GMV to the background/moving image pickup object decision section 150. Also the local motion vector LMV from the local motion vector calculation section 154 is supplied to the background/moving image pickup object decision section 150.

The background/moving image pickup object decision section 150 compares the local motion vector LMV for each target block and the global motion vector GMV with each other to decide the coincidence degree of them, that is, the background coincidence degree, regarding the target block as described hereinabove. In this instance, the background/moving image pickup object decision section 150 compares the correlation values, that is, the SAD values, regarding reference blocks individually corresponding to the local motion vector LMV and the global motion vector GMV to carry out decision of the background and a moving image pickup object.

Incidentally, also it is possible to use the local motion vector LMV and the correlation value, that is, the SAD value, determined for calculation of a global motion by the local motion vector calculation section 154 as those for the comparison described hereinabove by the background/moving image pickup object decision section 150.

In this instance, however, it is necessary for the local motion vector calculation section 154 to retain the local motion vector and the SAD value for a period of time of processing by the global motion calculation section 157 and the global motion vector calculation section 158. In this instance, particularly since it is not known to which reference vector the global motion vector GMV corresponds, it is necessary to retain, as those SAD values which are to be retained, all of the SAD values of the SAD value table regarding the individual target blocks. Therefore, a memory having a very large capacity is required in order to retain the local motion vectors LMV and the SAD values.

Taking this into consideration, in the present embodiment, the local motion vector calculation section 154 carries out re-calculation of the local motion vector LMV and the SAD value for comparison by the background/moving image pickup object decision section 150. By such re-calculation, the local motion vector calculation section 154 need not include a memory for storing the local motion vector LMV and the SAD value, and the problem of the capacity of the memory can be eliminated.

Accordingly, the background/moving image pickup object decision section 150 uses the re-calculated local motion LMV and SAD value to determine the bit ratio β indicative of the background coincidence degree regarding the target block. Upon such re-calculation, the background/moving image pickup object decision section 150 acquires also the SAD value regarding the reference vector, that is, the reference block position, which coincides with the global motion vector GMV. Then, the background/moving image pickup object decision section 150 uses the re-calculated local motion vector LMV and SAD value to decide whether or not the target block is a background portion or a moving image pickup object portion.

The background/moving image pickup object decision section 150 corrects the SAD value regarding a reference block which corresponds to the global motion vector GMV to be compared with the SAD value regarding the reference block corresponding to the local motion vector LMV to a value which reflects the amount of noise of the image.

Noise of an image generally has a value corresponding to the luminance value of the image. Therefore, in the present embodiment, the highest luminance value MaxTAR from the highest luminance value detection section 1592 of the contrast calculation section 159 and the lowest luminance value MinTAR from the lowest luminance value detection section 1593 are supplied to the background/moving image pickup object decision section 150.

The background/moving image pickup object decision section 150 detects a luminance value of the image as the difference between the highest luminance value MaxTAR and the lowest luminance value MinTAR and determines a correction value for the SAD value regarding the reference block corresponding to the global motion vector GMV in response to the detected luminance value.

Then, the background/moving image pickup object decision section 150 compares the corrected correlation value with the correction value regarding the reference block corresponding to the global motion vector GMV. Then, the background/moving image pickup object decision section 150 decides whether or not the corrected value of the SAD value regarding the reference block corresponding to the global motion vector GMV is lower, that is, the correlation value is higher, than that regarding the reference block corresponding to the local motion vector LMV. When the former is lower, the background/moving image pickup object decision section 150 evaluates and decides that the target block is a background portion.

When the hit ratio β has such a value that the target block can be regarded as a background portion, the background/moving image pickup object decision section 150 outputs the global motion vector GMV as noise reduction processing motion vector MVnr. In any other case, the background/moving image pickup object decision section 150 outputs the local motion vector LMV as the noise reduction processing motion vector MVnr with regard to the target block.

As described hereinabove, the noise reduction processing motion vector MVnr from the background/moving image pickup object decision section 150 is supplied to the motion compensation picture production section 16.

The motion compensation picture production section 16 applies a transformation process in accordance with the noise reduction processing motion vector MVnr for the image data REFv of the reference frame sent thereto through the motion vector calculation section 15 to produce data MCv of the motion compensation image. Then, the produced data MCv of the motion compensation image is supplied to the addition section 17.

Further, the background/moving image pickup object decision section 150 supplies the determined hit ratio β to the addition ratio calculation section 21. The addition ratio calculation section 21 calculates the addition ratio α of the motion compensation image corresponding to the target image based on the hit ratio β.

In this instance, the addition ratio α can be calculated in a unit of a block or in a unit of a pixel. Even where the addition ratio α is calculated in a unit of a pixel, since the hit ratio β is calculated in a unit of a block, the hit ratio β participates in the calculation of the addition ratio naturally in a unit of a block.

Where the addition ratio α is calculated in a unit of a block, also it is possible to calculate the addition ratio α only in response to the hit ratio β. Naturally, it is possible to calculate the addition ratio α taking other addition ratio calculation factors than the hit ratio β into account. In the present embodiment, the addition ratio α is calculated taking not only the hit ratio β but also such factors as a difference in a unit of a pixel between the target image and the motion compensation image and noise of the target image into consideration as hereinafter described.

In the present embodiment, the addition ratio calculation section 21 determines the addition ratio α in a unit of a pixel. To this end, data TGv of the target image and data MCv of the motion compensation image are supplied to the addition ratio calculation section 21.

In the present embodiment, the addition ratio calculation section 21 determines the addition ratio α using the absolute values of the difference values between the pixels of the target image and the pixels of the motion compensation image, that is, the pixel difference absolute values, the absolute value of the difference value between the pixel average value of the target image and the pixel average value of the motion compensation image, that is, the average difference absolute value, the variance difference absolute value of the target image and the hit ratio β.

As the pixel average value, for example, an average value of nine pixels in the proximity of a noticed pixel, that is, a self pixel, is determined. As the variance difference absolute value, the absolute value of a variance value of the difference between the noticed pixel, that is, the self pixel, and the neighboring pixels is determined.

The addition ratio α determined by the addition ratio calculation section 21 is supplied to the addition section 17. The addition section 17 adds the data MCv of the motion compensation image at the addition ratio α to the image data TGv of the target image sent thereto.

In the present embodiment, the addition section 17 superposes the target image and the motion compensation image at the addition ratio corresponding to the background coincidence degree, that is, the hit ratio β, of the target block. In other words, at a stationary picture portion, the addition ratio of the motion compensation image to the target image is high, but at a moving image pickup object portion, the addition ratio of the motion compensation image to the target image is low.

In this manner, in the present embodiment, superposition of images can be carried out at a background portion and a moving image pickup object portion thereof with individually appropriate addition ratios. Accordingly, a good reduced noise image is obtained by the image superposition.

Besides, since the global motion and the global motion vector GMV used in the present embodiment are produced from those local motion vectors LMV which have high reliability, they are motion vectors of high accuracy. Also in this regard, a good reduced noise image can be obtained.

Flow of General Processing for Reduced Noise Production

Figure 18:
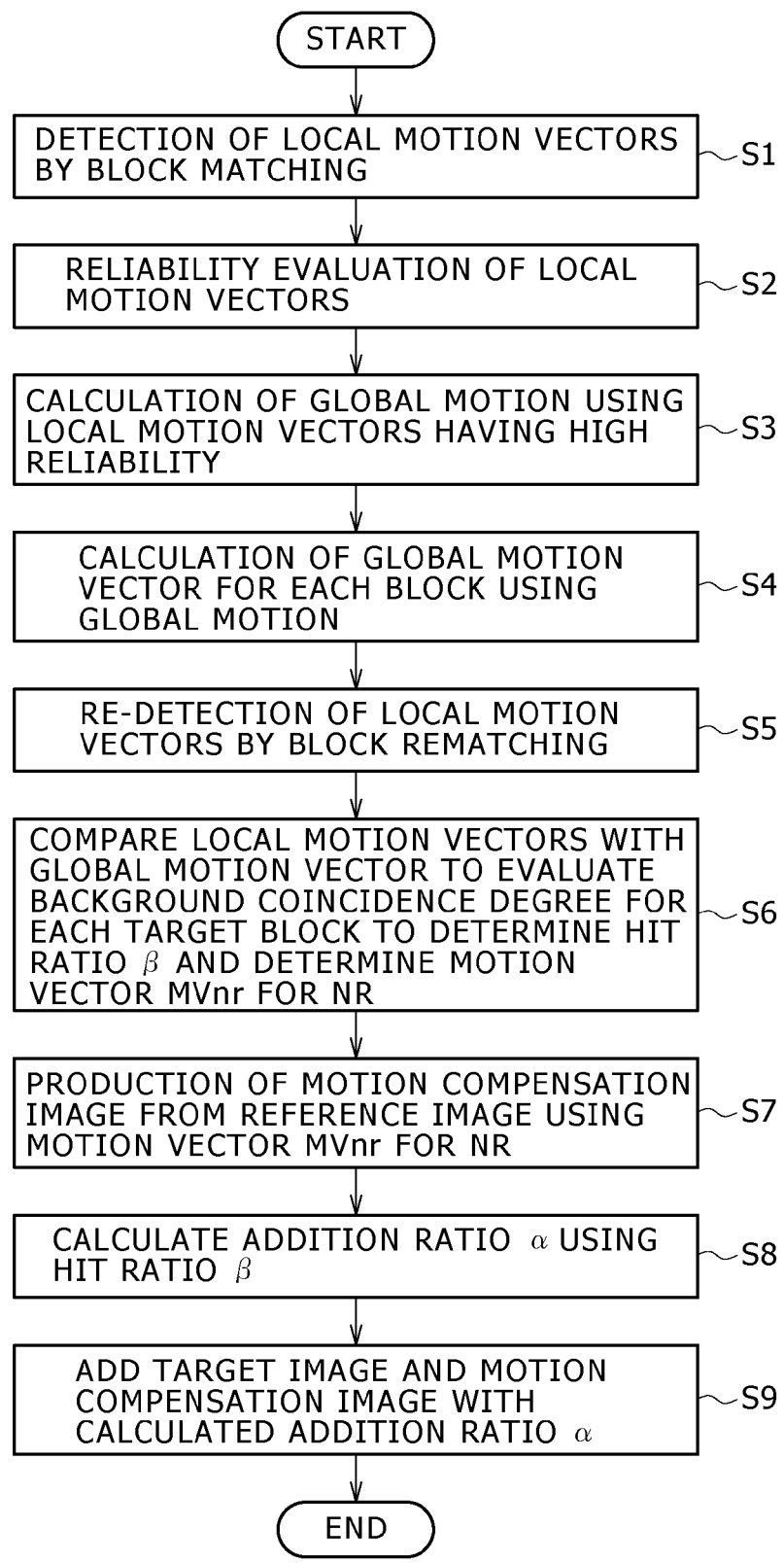
FIG. 18 is a flow chart illustrating principal processing operation of the image processing apparatus.

FIG. 18 illustrates a flow of processes for producing a reduced noise image from picked up images taken in the image memory 4.

In the motion vector calculation section 15, the local motion vector calculation section 154 carries out detection of the local motion vector LMV by block matching first at step S1. Then, the motion vector reliability index value calculation section 156 calculates the index value Ft of the reliability regarding the detected local motion vector LMV using the first minimum value MinSAD and the second minimum value Btm2SAD of the SAD value calculated by the local motion vector calculation section 154 at step S2.

Then at step S3, the global motion calculation section 157 extracts the local motion vectors LMV of high reliability based on the calculated index value Ft of the reliability. Then, the global motion calculation section 157 calculates the global motion GM using only the extracted local motion vectors LMV of high reliability.

Then at step S4, the global motion calculation section 157 calculates the global motion vector GMV for each target block using the global motion GM calculated at step S3.

Then at step S5, the local motion vector calculation section 154 carries out a block re-matching process to re-detect the local motion vector LMV. Then, the local motion vector calculation section 154 stores the SAD value, that is, the first minimum value MinSAD, at the position of the reference block, that is, at the reference vector, from which the local motion vector LMV is detected. Further, the local motion vector calculation section 154 stores also the SAD value regarding the reference block corresponding to the global motion vector GMV calculated at step S4. It is to be noted that, at this time, there is no necessity to calculate the index value Ft of the reliability of the local motion vector LMV.

Then at step S6, the background/moving image pickup object decision section 150 compares the local motion vector LMV calculated at step S5 with the global motion vector GMV determined at step S4 to evaluate the background coincidence degree regarding each target block to evaluate the background coincidence degree regarding each target block to determine the hit ratio β. Then, the background/moving image pickup object decision section 150 determines the noise reduction processing motion vector MVnr regarding each target block and outputs the noise reduction processing motion vectors MVnr to the motion compensation picture production section 16.

In the comparison between the local motion vector LMV and the global motion vector GMV at step S6, the SAD value regarding the reference block corresponding to the local motion vector LMV and the SAD value regarding the reference block corresponding to the global motion vector GMV are compared with each other. Further, to the SAD value regarding the reference block corresponding to the global motion vector GMV, correction is applied based on noise of the image as described hereinabove.

Then at step S7, the motion compensation picture production section 16 uses the noise reduction processing motion vectors MVnr determined at step S6 to produce a motion compensation image for each reference block and outputs the produced motion compensation images to the addition section 17.

Then at step S8, the addition ratio calculation section 21 uses the hit ratio β determined at step S6 to calculate the addition ratio α, in the present embodiment, for each pixel and supplies the calculated addition ratios α to the addition section 17.

Then at step S9, the addition section 17 superposes the motion compensation image produced at step S7 on the target image for the individual pixels with the addition ratios α calculated at step S8 to produce a reduced noise image. The reduced noise process ends therewith.

It is to be noted that FIG. 18 illustrates the processing operation for one certain target frame. Where a plural number of images equal to or greater than three are to be superposed, a produced reduced noise image produced by two images is set as the target frame and an image to be superposed newly is set as the reference frame to repeat the process of FIG. 18.

Now, detailed processing operation of principal components of the motion vector calculation section 15 is further described.

Processing Operation of the Local Motion Vector Calculation Section 154

The local motion vector calculation section 154 in the present embodiment compares, in order to detect a minimum value of the SAD value, the difference value regarding a noticed pixel or self pixel and the difference values regarding pixels around the noticed pixel. In particular, the local motion vector calculation section 154 determines a position Po as a decision object point or pixel and compares the SAD value at the decision object point position Po and eight SAD values in the proximity of and around the decision object point position Po surrounded by a broken line framework in FIG. 19. Then, the local motion vector calculation section 154 decides whether or not the SAD value of the decision object point is the lowest value (hereinafter referred to as local minimum value) from among the nine SAD values in the region surrounded by the broken line framework.

Then, if the SAD value of the decision object point is determined as a local minimum value, then the local motion vector calculation section 154 compares the SAD value of the decision object point with the minimum value of the SAD value stored till then. Then, if the local motion vector calculation section 154 decides that the SAD value of the decision object point is lower than the minimum value of the SAD value stored till then, then it updates the minimum value of the SAD value stored therein with the newly detected local minimum SAD value.

As a configuration for detecting such a local minimum SAD value as described above, the local motion vector calculation section 154 is devised so as to decrease the scale of the buffer memory for the SAD memory for storing SAD values. In particular, when the local motion vector calculation section 154 searches the reference block in a unit of one pixel, a buffer memory which can store SAD values for two lines of the size of the target block in the horizontal direction+three SAD values is prepared as the buffer memory for the SAD table for storing SAD values as seen in FIG. 19.

Figure 19:
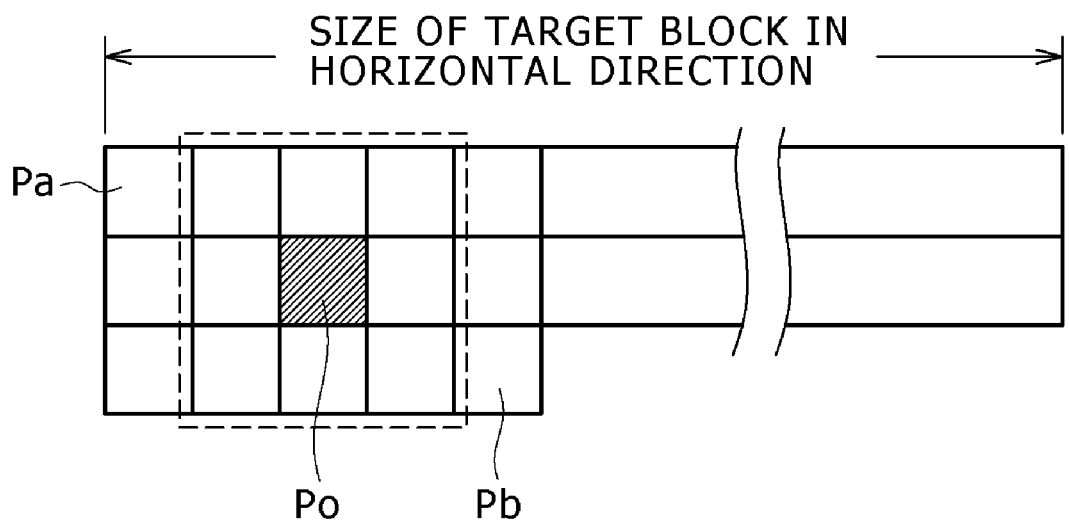
FIG. 19 is a diagrammatic view illustrating operation of the global motion vector calculation section shown in FIG. 17.

As can be seen from FIG. 19, if SAD values for two lines of the size of the target block in the horizontal direction+three SAD values are written into the buffer memory, then it is possible to decide the local minimum value at the decision object point position Po.

In order to minimize the size of the buffer memory, a newly inputted SAD value is overwritten at a memory position Pa at which an old SAD value which is not used for minimum value evaluation or local minimum value detection any more has been stored as seen in FIG. 19. In particular, although the newly inputted SAD value is to be written into a memory position Pb shown in FIG. 19 in accordance with the order, not the memory position Pb but the memory position Pa which is not used any more is re-utilized to suppress increase of the hardware scale of the memory.

It is to be noted that the local motion vector calculation section 154 includes the first minimum value storage unit 1541 and second minimum value storage unit 1542 described hereinabove in addition to the buffer for detecting a local minimum value.

Such a series of processes as described above is a basic process, and this basic process is applied to the first minimum value and the second minimum value to detect the lowest value of the SAD value and the second minimum value of the SAD value.

While, in the present embodiment, the local motion vector calculation section 154 carries out the same operation for the reduction plane, intermediate plane and base plane, it detects the local motion vector LMV and calculates the reliability index value of the local motion vector LMV on the base plane. Accordingly, the second minimum value of the SAD value is required only for the base plane, and the calculation and the storage of the second minimum value of the SAD value on the reduction plane and the intermediate plane may be omitted.

Figure 20:
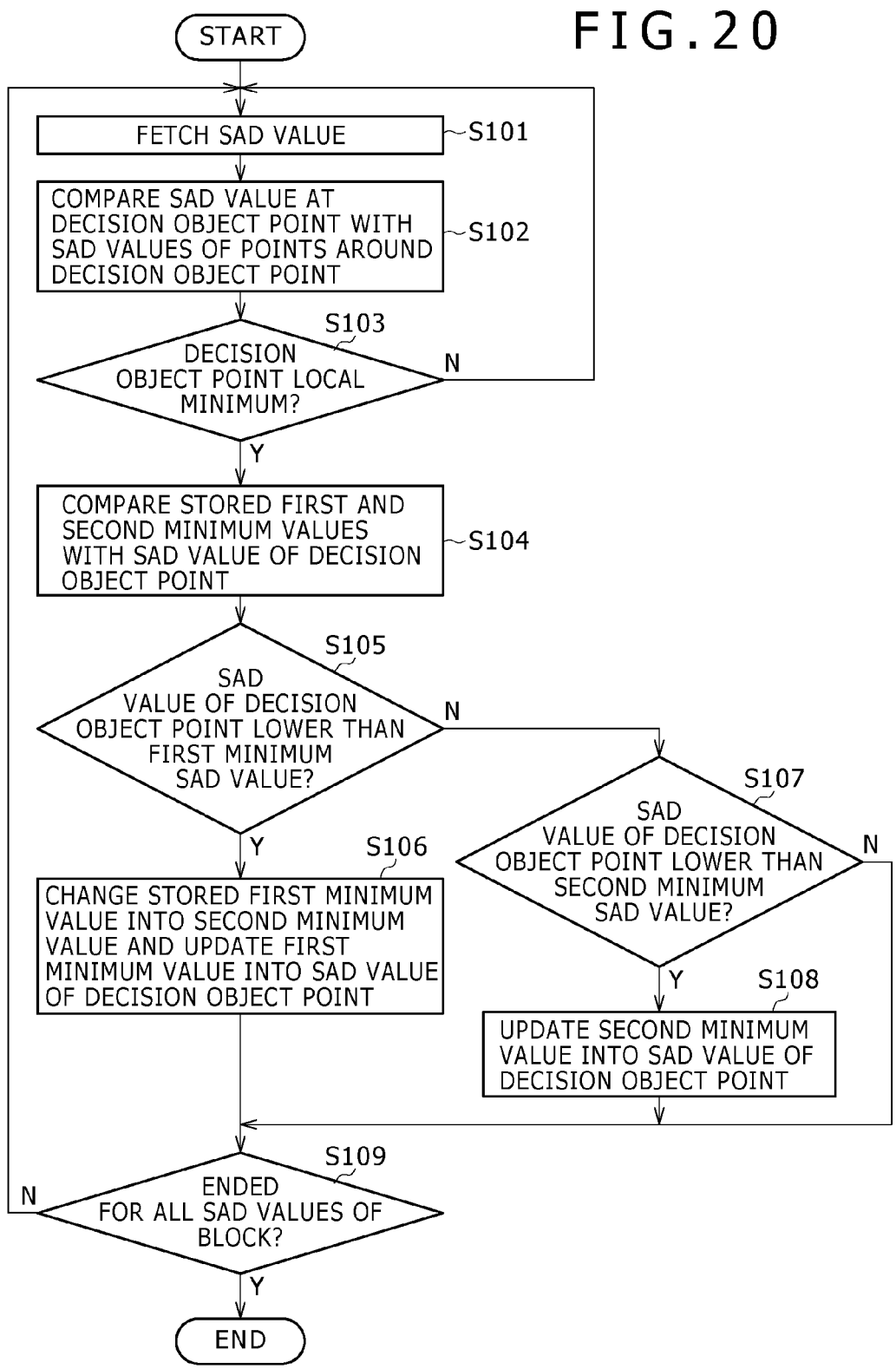
FIG. 20 is a flow chart illustrating an example of detection processing operation by a local motion vector calculation section of the image processing apparatus.

FIG. 20 illustrates a flow chart of a detection processing operation of the first minimum value and the second minimum value by the local motion vector calculation section 154.

Referring to FIG. 20, the local motion vector calculation section 154 first fetches SAD values from the matching processing section 153 at step S101. Then, the local motion vector calculation section 154 compares the SAD value at the decision object point position Po and the eight SAD values at the positions surrounding the decision object point position Po with each other at step S102. Then, the local motion vector calculation section 154 decides based on a result of the comparison whether or not the SAD value at the decision object point position Po is a local minimum value at step S103.

If it is decided at step S103 that the SAD value at the decision object point position Po is not a local minimum value, then the processing returns to step S101 to carry out fetching of next SAD values.

On the other hand, if it is decided at step S103 that the SAD value at the decision object point position Po is a local minimum value, then the local motion vector calculation section 154 compares the first minimum value and the second minimum value of the SAD value stored therein with the SAD value at the decision object point position Po at step S104.

Then, the local motion vector calculation section 154 decides at step S105 whether or not the SAD value at the decision object point position Po is lower than the first minimum value of the SAD value stored therein. Then, if it is decided that the SAD value at the decision object point position Po is lower, then the local motion vector calculation section 154 updates the second minimum value storage unit 1542 with the SAD value stored in the first minimum value storage unit 1541 and stores the SAD value at the decision object point position Po into the first minimum value storage unit 1541 at step S106.

Then, the local motion vector calculation section 154 decides whether or not the calculation process of the SAD value with regard to all of the reference blocks is completed with the target block at step S109. If it is decided that the calculation process is not completed as yet, then the processing returns to step S101, at which next SAD values are fetched. On the other hand, if it is decided at step S109 that the calculation process of the SAD value with regard to all of the reference blocks is completed with the target block, then the local motion vector calculation section 154 ends the processing routine.

On the other hand, if it is decided at step S105 that the SAD value at the decision object point position Po is equal to or higher than the first minimum value of the SAD value stored therein, then the local motion vector calculation section 154 decides whether or not the SAD value at the decision object point position Po is lower than the second minimum value of the SAD value stored therein at step S107. If it is decided that the SAD value at the decision object point position Po is lower, then the local motion vector calculation section 154 updates the SAD value stored in the second minimum value storage unit 1542 with the SAD value at the decision object point position Po at step S108.

The processing advances from step S108 to step S109, at which the local motion vector calculation section 154 decides whether or not the calculation process of the SAD value with regard to all of the reference blocks is completed. If it is decided that the calculation process is not completed as yet, then the processing returns to step S101 to fetch next SAD values. On the other hand, if it is decided at step S109 that the calculation process of the SAD value with regard to all of the reference blocks for the target block is completed, then the processing routine is ended.

On the other hand, if it is decided at step S107 that the SAD value at the decision object point position Po is not lower than the second minimum value of the SAD value stored therein, then the processing advances to step S109. At step S109, the local motion vector calculation section 154 decides whether or not the calculation process of the SAD value with regard to all of the reference blocks for the target block is completed.

If it is decided at step S109 that the calculation process of the SAD value with regard to all of the reference blocks is not completed as yet, then the processing returns to step S101 to fetch next SAD values. On the other hand, if it is decided at step S109 that the calculation process of the SAD value with regard to all of the reference blocks for the target block is completed, then the processing routine is ended.

The processing flow chart illustrated in FIG. 20 can be applied similarly among the reduction plane, intermediate plane and base plane. In this instance, with regard to the reduction plane and the intermediate plane, the SAD value stored finally in the first minimum value storage unit 1541 is detected as the lowest value MinSAD of the SAD value, and corresponding reference vectors are detected as the reduction plane motion vector MVs and the intermediate plane motion vector MVm, respectively. Then, the lowest value MinSAD and the reduction plane motion vector MVs and intermediate plane motion vector MVm are outputted.

On the other hand, with regard to the base plane, the SAD value finally stored in the first minimum value storage unit 1541 is detected as the lowest value MinSAD of the SAD value, and the corresponding reference vector is detected as the base plane motion vector MVb. Then, the lowest value MinSAD of the SAD value and the base plane motion vector MVb are outputted. Further, with regard to the base plane, the SAD value finally stored in the first minimum value storage unit 1541, that is, the lowest value MinSAD, and the SAD value finally stored in the second minimum value storage unit 1542, that is, the second minimum value of the SAD value, are supplied to the motion vector reliability index value calculation section 156.

Processing Operation of the Global Motion Calculation Section 157

<Extended Affine Transformation>

In the preset embodiment, a global motion is calculated or estimated from a large number of local motion vectors LMV. Then, from the calculated global motion, a global motion vector GMV is calculated or a global motion is estimated. In this instance, a method of representing the global motion by affine transformation is used.

However, ordinary affine transformation has a drawback in that it is not ready for "oblique distortion". The "oblique distortion" is a phenomenon brought about by a component of rotation of a pitch axis, that is, an axis in the vertical direction or a yaw axis, that is, an axis in the horizontal direction perpendicular to the vertical direction, of camera shake. By the "oblique distortion", a rectangular plane which is in an exactly facing state is deformed into a trapezoidal shape as seen in FIGS. 21A and 21B, and therefore, is also called trapezoidal distortion or keystone.

In particular, when a camera CAM exactly faces an image pickup object OBJ such that an optical axis Lz of the camera CAM extends perpendicularly to a rectangular plane of the image pickup object OBJ as seen on the lower side in FIG. 21A, a picked up image of the rectangular plane of the image pickup object OBJ directly assumes a rectangular shape as seen on the upper side in FIG. 21A.

On the other hand, for example, if the optical axis Lz of the camera CAM undergoes pitch axis rotation, that is, rotation in a vertical plane, by an angle θ without exactly facing the image pickup object OBJ as seen on the lower side in FIG. 21B, then the picked up image of the rectangular plane of the image pickup object OBJ exhibits a trapezoidal shape wherein the length in the leftward and rightward direction, that is, in the horizontal direction, of the image varies linearly in response to the angle θ as seen on the upper side in FIG. 21B.

It is to be noted that, though not shown, if the optical axis Lz of the camera CAM does not exactly face the image pickup object OBJ but is subject to yaw axis rotation, that is, rotation within a horizontal plane, by an angle θ, then the picked up image of the rectangular plane of the image pickup object OBJ exhibits a trapezoidal shape wherein the length in the upward and downward direction, that is, in the vertical direction of the image, varies linearly in response to the angle θ.

A process for returning an image picked up in such a deformed form as described above by camera shake to an image of an original shape in an exactly facing state is "oblique distortion" correction or trapezoidal correction. However, such correction cannot be represented with the parameters of the affine transformation described above. In particular, if it is intended to carry out such "oblique distortion" correction of returning such an "obliquely distorted" trapezoidal image as shown in FIG. 21B to an image of a rectangular shape, an upper portion of the image along the vertical axis or y axis should be contracted horizontally while a lower portion of the image should be expanded horizontally. However, of the parameters of the affine transformation, the parameter which participates in horizontal expansion or contraction is a, and since the parameter a is a fixed value, the affine transformation cannot be ready for the correction described above.

In order to avoid such a problem as just described, it has been proposed to use orthogonal projection transformation in place of the affine transformation. The orthogonal projection transformation is represented by an (expression 8) illustrated in FIG. 22 and can represent projection transformation from an arbitrary plane to another plane in a three-dimensional space.

However, it is very difficult to apply the orthogonal projection transformation to such a case wherein one global motion is specified from a large number of vectors as is assumed here. This is because it is difficult to use the least squares method from the shape of the (expression 8) of FIG. 22 and, also where some other technique is used, a large amount of mathematical operation is required.

As a realistic problem, since an actual image pickup object is a three-dimensional object, observed local motion vectors include a large number of image pickup portions to which the distance is different from each other. In this instance, application of the orthogonal projection transformation is nothing but mere approximation. Accordingly, it seems a reasonable decision that, if a very high cost required to obtain a general solution to the orthogonal projection transformation is considered, then the orthogonal projection transformation does not match as a countermeasure for cost reduction.

In order to apply the orthogonal projection transformation more simply, it is possible to adopt a method of determining a solution with regard to six vectors. This is because, since 12 parameters must be determined, if coordinates of the six vectors are substituted, then 6×2 first-degree equations with six unknowns are produced and the solutions can be derived comparatively easily by inverse matrix calculation of a 6×6 matrix. Accordingly, only it is necessary that six vectors can be selected appropriately from among a large number of local vectors.

However, if a case is considered wherein a moving image pickup object is included in a picked up image, then since it cannot be expected that each of the local vectors has considerable accuracy, it is difficult to extract only those vectors having high accuracy from among a large number of local motion vectors. Therefore, it is very difficult to appropriately select six vectors from among a large number of local motion vectors.

Taking the foregoing into consideration, the present embodiment uses a technique of making it possible to detect a global motion favorably even if an image suffers from "oblique distortion."

In particular, in the present embodiment, a modified form of the existing ordinary affine transformation described hereinabove with reference to FIG. 69 is used. Such a modified form of the ordinary affine transformation as just described is hereinafter referred to as extended affine transformation.

Figure 23:
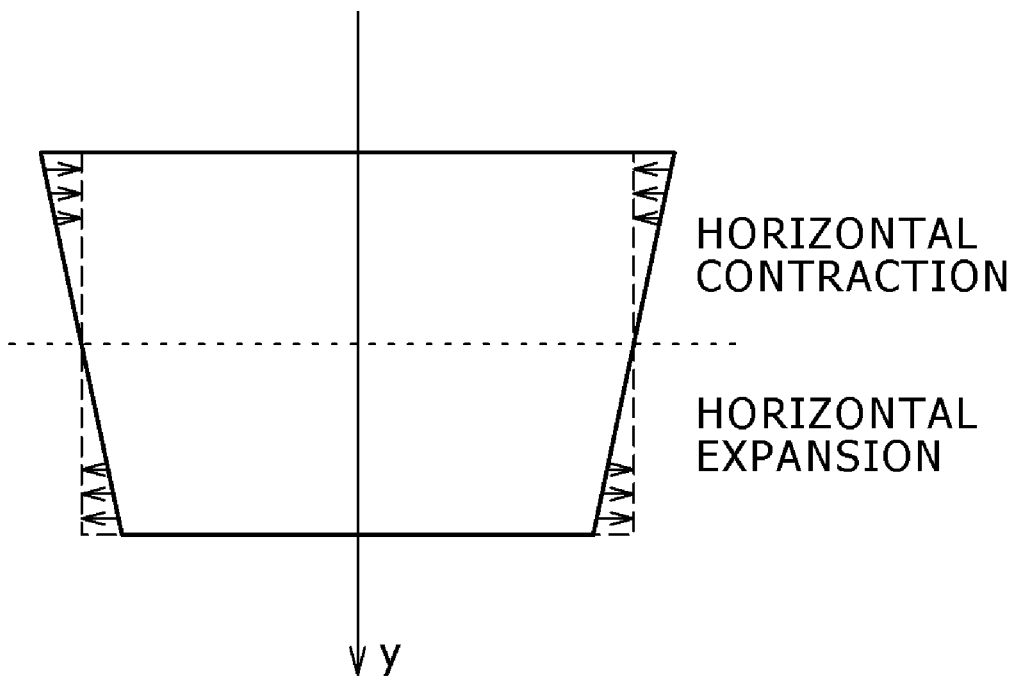
FIG. 23 is a schematic view illustrating ordinary affine transformation.

Now, it is tried to carry out "oblique distortion" correction of returning such an "obliquely distorted" trapezoidal image as indicated by solid lines in FIG. 23 to such a rectangular image as indicated by broken lines in FIG. 23. In this instance, an upper half of the trapezoidal image should be reduced horizontally while a lower half of the trapezoidal image should be expanded horizontally along a vertical axis, that is, a y axis, as indicated by arrow marks.

In ordinary affine transformation, from among parameters a, b, c, d, e and f for affine transformation, the parameter relating to horizontal expansion and contraction is a. Since the parameter a has a fixed value, the ordinary affine transformation cannot be ready for the "oblique distortion" correction.

Therefore, if the parameter a is rewritten into q0·y+r0 so that the value thereof may vary along the y axis as indicated on the lower side in FIG. 23, then the affine transformation becomes such that the expansion or contraction ratio in the horizontal direction varies linearly in response to the vertical axis. In other words, the parameter a is replaced into a function of the variable y of the y axis for "oblique distortion" correction. Here, for the "oblique distortion" correction in FIG. 23, the parameter a may be a linear function, that is, a function q0·y+r0.

Although the affine transformation in FIG. 23 takes correction of "oblique distortion" by rotation of the pitch axis described above into consideration, it is necessary to take also correction of "oblique distortion" by rotation of the yaw axis and correction of "oblique distortion" by synthesized rotation of the pitch axis and the yaw axis into consideration.

Therefore, in the present embodiment, the concept described hereinabove with reference to FIG. 23 is expanded. In particular, in order to cause affine transformation to allow expansion or contraction in a direction perpendicular to an arbitrary axis along the axis, the parameters a, b, d and e are replaced by pn·x+qn·y+rn (n=0, 1, 2, 3) as indicated by an (expression 9) of FIG. 24.

Here, while the affine parameters a, b, d and e participate in transformation of an image, the affine parameters c and f participate in shifting of an image in the leftward or rightward direction and the upward or downward direction, respectively. Therefore, the affine parameters c and f are not replaced into a function.

Where the affine parameters a, b, d and e are represented like the (expression 9), totaling 14 parameters are involved, and it seems that the extended affine transform is high in complicatedness. However, if the (expression 9) is expanded and put in order, then it has a form of an (expression 10) of FIG. 25 using totaling 12 parameters.

If this expression of the extended affine transformation is used, then although the expression is complicated, a solution to a plurality of local motion vectors can be derived uniquely by the least squares method. Since the technique is same as that of affine transformation, only final results are given as an (expression 11) to an (expression 15) in FIGS. 26 to 30, respectively.

It is to be noted that, while, in the present embodiment, all of the affine parameters a, b, d and e which participate in transformation of an image are replaced into a function, if the transformation of an image occurs only in a particular direction, only the parameter which relates to the direction may be replaced into a function. For example, in order to take only the transformation illustrated on the upper side in FIG. 23 into consideration, only the parameter a should be replaced into a function as illustrated on the lower side in FIG. 23.

Further, while, in the example described above, the function for replacement is a linear function because linear deformation is assumed, if curvilinear deformation is assumed, then the function may be a quadratic or higher-order function.

<Calculation of a Global Motion Using Extended Affine Transformation>

Figure 32:
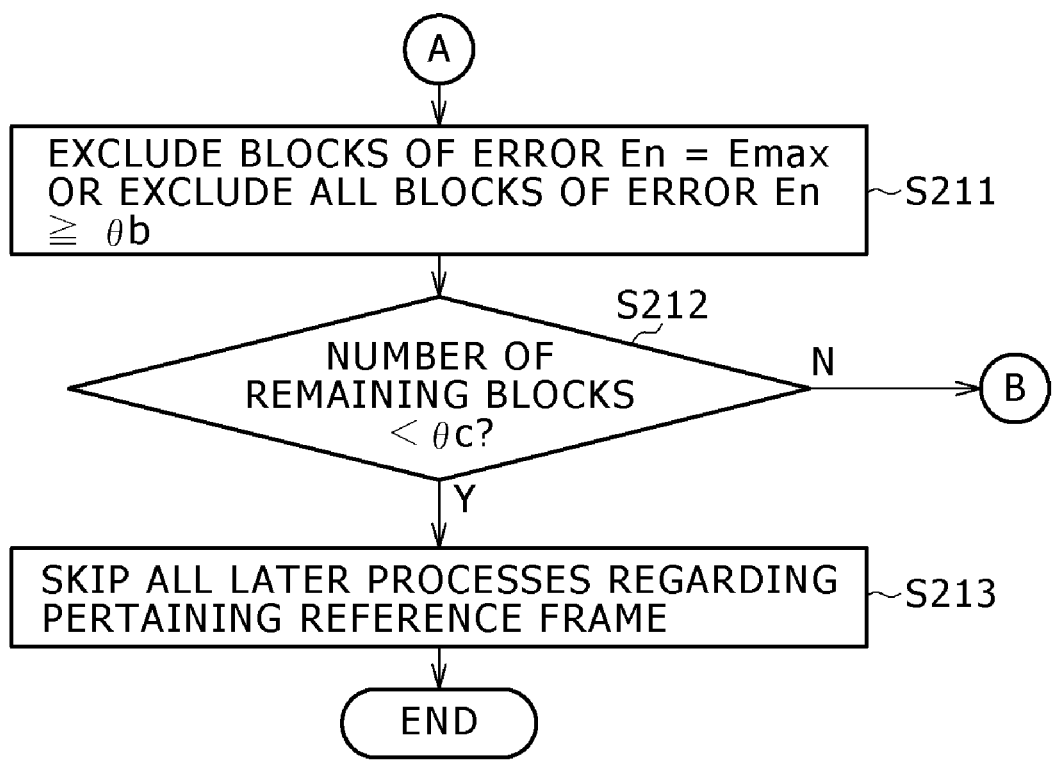

As a technique for deriving the most preferable global motion from among an unspecified large number of vectors, the present embodiment uses a method illustrated in a flow chart of FIGS. 31 and 32. According to the method, while those motion vectors of blocks which are less likely to conform to a global motion such as a moving image pickup object are excluded gradually from among blocks having high reliability, the least squares method is used to cause the parameters of the global motion to converge.

According to the process of FIGS. 31 and 32, the extended affine transformation is adopted to make it possible to exclude error vectors of a moving image pickup object or the like from many local motion vectors of low vector accuracy while deriving an optimum global motion including "oblique distortion" at a practical mathematical operation cost.

Incidentally, since the extended affine transformation in the present embodiment involves many transformation parameters and is flexible, there is the possibility that convergence mathematical operation of a global motion may be ready also for erroneous motion vectors of a moving image pickup object or noise, resulting in failure to exclude such erroneous motion vectors.

Therefore, in the present embodiment, at an initial stage of a convergence mathematical operation loop, exclusion of erroneous motion vectors (hereinafter referred to as error vectors) is carried out using the ordinary affine transformation, and thereafter, convergence mathematical operation using the extended affine transformation is carried out as seen from FIGS. 31 and 32. This is because it is intended to use a technique of attempting high accuracy convergence ready also for oblique distortion factors using the extended affine transformation after vector errors are reduced to such a degree that vectors of such oblique distortion factors may not be excluded by using the ordinary affine transformation.

Further, in the present embodiment, the highest value of the vector error as a difference between a motion vector, that is, a global motion vector, determined from a global motion GM determined in each cycle of convergence mathematical operation and a detected motion vector, that is, a detected local motion vector LMV described hereinabove, is detected.

Then, if the detected highest value of the vector error is higher than a threshold value determined in advance, then the ordinary affine transformation is continued, but if the detected highest value of the vector error becomes equal to or lower than the predetermined threshold value, then convergence mathematical operation using the extended affine transformation is carried out.

Now, the method of FIGS. 31 and 32 is described in detail.

First at step S201, the global motion calculation section 157 compares motion vector reliability index values Ft of a plurality of local motion vectors LMV stored therein with a threshold value determined in advance. Then, from results of the comparison, the global motion calculation section 157 selects only the target blocks whose motion vector LMV reliability index value Ft is higher than the predetermined threshold value. Such target blocks as just mentioned are hereinafter referred to simply as blocks. The process described corresponds to a case wherein the two values of 1 and 0 are used for the weight coefficient W as described hereinabove with reference to the (expression 7) given hereinabove.

Then at step S202, the global motion calculation section 157 decides whether or not the convergence loop of convergence mathematical operation is executed for the first time. If it is decided that the convergence loop is executed for the first time, then the global motion calculation section 157 derives or estimates a global motion GM using only the local motion vectors LMV of the selected blocks and using the ordinary affine transformation at step S203. In other words, the global motion calculation section 157 derives the affine parameters a to f of a global motion GM.

Then, the global motion calculation section 157 calculates theoretical local motion vectors LMVs of the selected blocks used for the mathematical operation based on the derived global motion GM at step S206.

Then at step S207, the global motion calculation section 157 calculates, for each of the selected blocks, an error En between the local motion vector LMV determined by the block matching process and the theoretical local motion vector LMVs determined at step S206.

For the calculation of the error between the motion vector determined by the block matching and the theoretical motion vector, if importance is attached to the accuracy in mathematical operation, then distance calculation should be carried out correctly from the Pythagorean theorem. However, if importance is attached otherwise to the lightness in mathematical operation rather than the accuracy, then the sum of distances determined between the two motion vectors in both of the horizontal and vertical directions may be used as an approximate distance.

Then at step S208, the global motion calculation section 157 uses all of the errors En determined for the selected blocks to calculate an average value Eave and the highest value Emax of the errors En. Then at step S209, the global motion calculation section 157 decides whether or not the average value Eave is lower than a threshold value θa determined in advance therefor and the highest value Emax is lower than a threshold value θb determined in advance therefor.

If it is decided as a result of the decision at step S209 in FIG. 32 that the conditions are not satisfied, then the processing advances to step S211, at which the global motion calculation section 157 excludes that one of the blocks whose error En satisfies En=Emax among the errors En of the blocks determined at step S207 from the blocks to be used to derive a global motion. Or, at step S211, the global motion calculation section 157 detects those blocks whose error En satisfies En≧θb and excludes all of the detected blocks from the blocks to be used to derive a global motion GM.

Then at step S212, the global motion calculation section 157 decides whether or not the number of the remaining blocks as a result of the block exclusion at step S211 is lower than a threshold value θc determined in advance. If it is decided at step S212 that the number of the remaining blocks is not lower than the threshold value θc, then the processing returns to step S202 to repeat the processes at the steps beginning with step S202 setting the remaining blocks as the selected blocks.

If the number of the remaining blocks is smaller than the threshold value θc, then since an appropriate global motion GM cannot be obtained, the image of the object reference frame cannot be used for superposition of images in the present embodiment. Therefore, if it is decided at step S212 that the number of the remaining blocks is smaller than the threshold value θc, then the global motion calculation section 157 skips all later processes for the reference frame as at step S213. The global motion calculation section 157 ends the process of FIGS. 31 and 32 therewith.

On the other hand, if it is decided at step S202 that the convergence loop of the convergence mathematical operation is executed not for the first time, then the global motion calculation section 157 decides at step S204 whether or not the highest value Emax of the errors En of the blocks determined at step S207 is higher than a threshold value θd determined in advance.

The threshold value θd is selected as a value with which, when the ordinary affine transformation is used to carry out mathematical operation of a global motion GM and exclusion of error vectors is carried out in such a manner as at step S211 described hereinabove, vectors of oblique distortion components are not excluded.

If it is decided at step S204 that the highest value Emax of the errors En is higher than the predetermined threshold value θd, then the global motion calculation section 157 advances the processing to step S203, at which it uses the ordinary affine transformation to derive a global motion GM. In other words, the global motion calculation section 157 calculates the parameters for the extended affine transformation. Thereafter, the global motion calculation section 157 repetitively carries out the processes at the steps beginning with step S203 described hereinabove.

If it is decided at step S204 that the highest value Emax of the errors En is equal to or lower than the predetermined threshold value θd, then the global motion calculation section 157 derives a global motion using only the local motion vectors LMV of the selected blocks and using the extended affine transformation at step S205. After the process at step S205, the processes at the steps beginning with step S206 are carried out.

Then, if it is decided at step S209 of FIG. 31 that the average value Eave of the errors En is lower than the threshold value θa and the highest value Emax of the errors En is lower than the threshold value θb, then the global motion calculation section 157 decides that the mathematical operation converges and finally determines the global motion GM to that at the point of time at step S210, whereafter the processing routine is ended.

If it to be noted that whether only that block whose error En is the highest error Emax should be excluded or those blocks whose error En is equal to or higher than the threshold value θb should be excluded at step S211 may be determined based on the balance between the quickness and the accuracy of convergence when a global motion vector GMV is determined. If the priority is given to the accuracy, then the former method should be adopted to exclude error blocks one by one, but if the priority is given to the quickness of convergence, then the latter method may be adopted.

It is to be noted that, at step S204 in the processing routine described above, the highest value Emax of the errors En is used for decision of changeover between the mathematical operation in which the ordinary affine transformation is used and the mathematical operation in which the extended affine transformation is used. However, the changeover decision at step S204 may be carried out taking not only the highest value Emax of the errors En but also the average value Eave of the errors En into consideration.

In this instance, at step S204, it is decided whether or not the average value Eave of the errors En is higher than a threshold value determined in advance, and if the average value Eave is higher than the threshold value, then mathematical operation is carried out using the ordinary affine transformation. However, if the average value Eave is equal to or lower than the threshold value, then mathematical operation is carried out using the extended affine transformation.

Or, it may be decided at step S204 whether or not both of the highest value Emax and the average value Eave of the errors En are higher than respective threshold values determined in advance. In this instance, if it is decided that both of them are higher than the respective threshold values, then mathematical operation may be carried out using the ordinary affine transformation. However, if it is decided that both of them are not higher than the respective threshold values, then mathematical operation may be carried out using the extended affine transformation.

It is to be noted that, since the highest value of an oblique distortion component can be obtained from the greatest camera shake amount similarly to the fact that the range of camera shake correction can be identified from an optical zoom ratio or a set shape, identification of the threshold values is comparatively easy.

The global motion calculation section 157 calculates a global motion vector GMV for each target block based on the global motion GM calculated in such a manner as described above. In particular, the global motion calculation section 157 uses the parameters a to l (refer to FIG. 25) for the extended affine transformation of the calculated global motion GM to determine a motion vector for each target block, which corresponds to a theoretical local motion vector LMVs in accordance with an (expression 1 of FIG. 25. For x and y in the (expression 10) of FIG. 25, the coordinate of the position of the center of each target block is used. The motion vector determined in this manner becomes the global motion vector GMV of each target block.

Then, the global motion vectors GMV of the target blocks determined in such a manner as described above are supplied to the motion compensation picture production section 16.

Then, the motion compensation picture production section 16 uses the global motion vectors GMV of the target blocks to produce motion compensation pictures of the target blocks and supplies the produced motion compensation pictures to the addition section 17.

Figure 33:
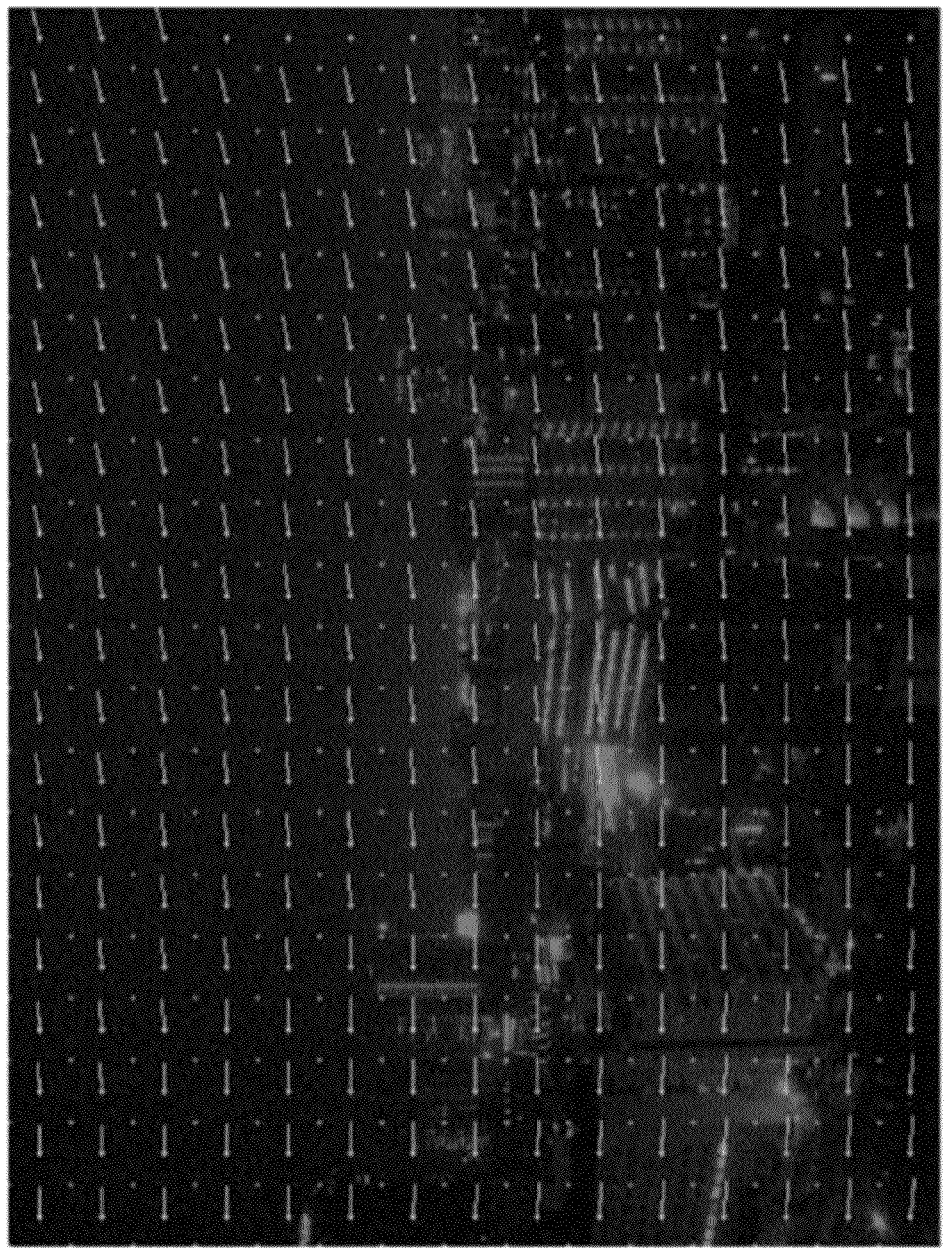
FIG. 33 is a view illustrating motion vectors of block units determined from calculated global motions by the image processing apparatus in an associated relationship on an image.

The global motion vectors of the target blocks determined from the image of FIG. 12 which includes much noise in the present embodiment are illustrated in FIG. 33. In FIG. 33, a global motion vector for each target block is indicated by a blank arrow mark.

Example of a Configuration and Processing Operation of the Background/Moving Image Pickup Object Decision Section 150

The background/moving image pickup object decision section 150 acquires, upon block rematching by the local motion vector calculation section 154, the SAD value regarding a reference block corresponding to the global motion vector GMV calculated by the global motion vector calculation section 158 as described hereinabove. Then, the background/moving image pickup object decision section 150 corrects the acquired SAD value with a correction value in response to noise of the image as described hereinabove. In the following description of the present embodiment, two methods are provided as the method for correction with a correction value.

FIRST EXAMPLE

Correction of a SAD Value by Addition of an Offset

Figure 34:
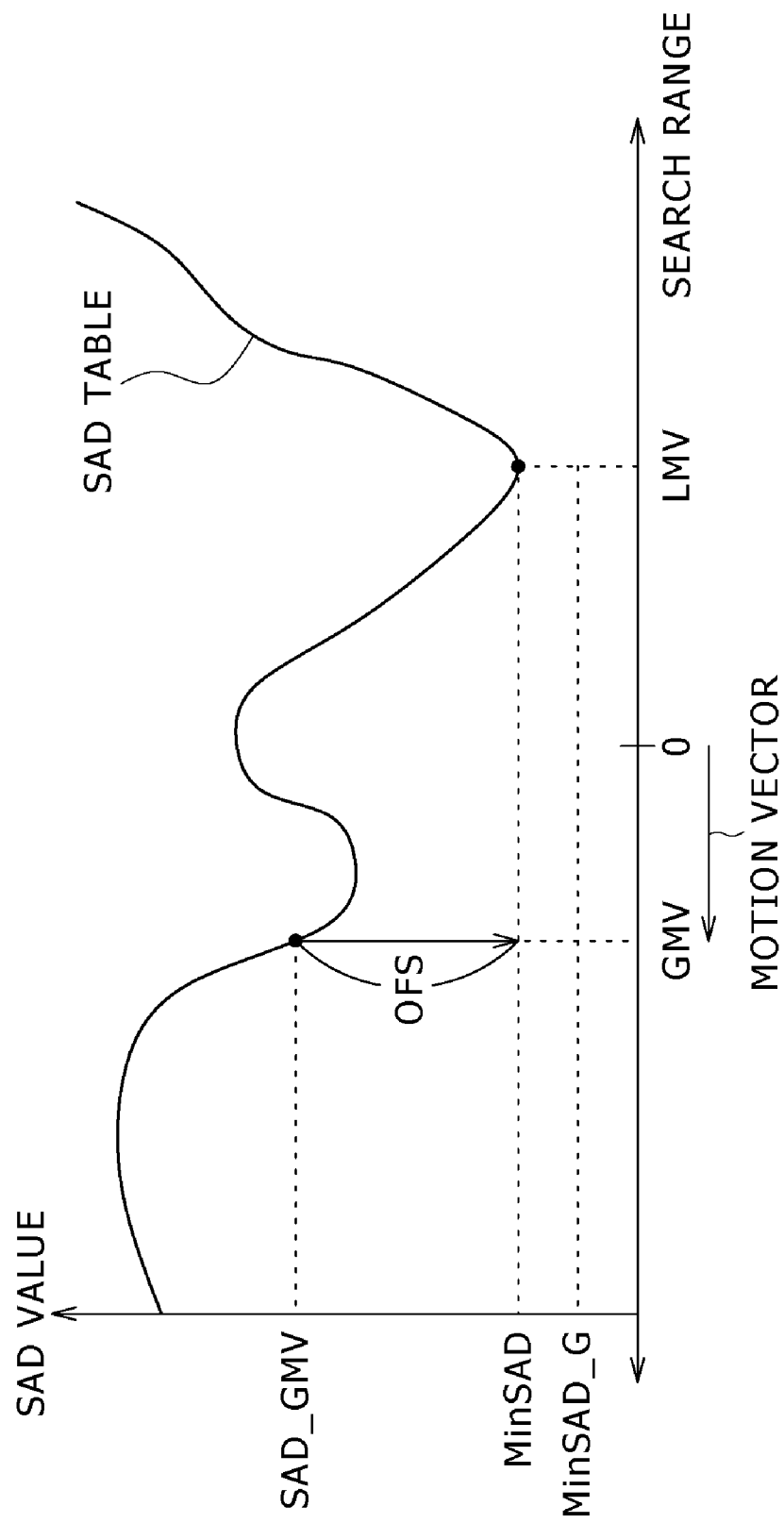
FIG. 34 is a diagram illustrating a process of evaluating a background coincidence degree of a target block using a global motion vector by the image processing apparatus.

FIG. 34 illustrates a concept of the first example. In FIG. 34, the axis of abscissa indicates the search range and the axis of ordinate indicates the SAD value, and FIG. 34 illustrates the contents, that is, SAD values, of a SAD table regarding one target block. Each value on the axis of abscissa indicates a reference block position, that is, a reference vector, and a solid line curve represents the contents of the SAD table quite similarly to that shown in FIG. 15.

Referring to FIG. 34, the position or reference vector 501 of a reference block which exhibits the lowest SAD value is detected as a local motion vector LMV by block matching similarly as in FIG. 15. Meanwhile, the position of another reference block which exhibits the global motion vector GMV is a position 503 in FIG. 34.

At this time, if the SAD value regarding the local motion vector LMV and the SAD value regarding the global motion vector GMV remain within a range of the difference corresponding to an amount provided by noise of the image, then there is the possibility that the global motion vector GMV may be the reference vector which indicates the lowest SAD value.

In particular, it is considered that, although the SAD value regarding the global motion vector GMV which is the position of the reference block must originally be the lowest SAD value, the SAD value at the position of a different reference block, that is, the SAD value of the local motion vector LMV, is determined in error as the lowest SAD value due to noise.

Therefore, in the present embodiment, an offset value OFS corresponding to an amount of noise of the image is added to the SAD value at the global motion vector GMV to correct the global motion vector GMV. In the present example, the offset value OFS is subtracted from the SAD value (represented by SAD_GMV) at the global motion vector GMV to correct the SAD value. In particular, where the SAD value after the correction is represented as MinSAD_G, then this is represented by $$\text{Min}SAD\_G = SAD\_GMV - OFS \quad \text{(expression 16)}$$

Here, if the offset value OFS is set to an excessively high value, then also a motion vector of a moving image pickup object comes to be decided as the lowest SAD value. Therefore, in the present embodiment, the offset value OFS is set to a value lower than a threshold value th (refer to the expression 7) for the reliability index value Ft to the local motion vector.

Then, the background/moving image pickup object decision section 150 compares the corrected SAD value MinSAD_G with the SAD value MinSAD at the local motion vector LMV. If a result of the comparison indicates MinSAD_G<MinSAD, then it is evaluated that the lowest value of the SAD value regarding the target block is the correction value MinSAD_G of the SAD value regarding the reference block corresponding to the global motion vector GMV. FIG. 34 illustrates the SAD table where MinSAD_G<MinSAD is satisfied.

In particular, where the SAD table satisfies MinSAD_G<MinSAD as illustrated in FIG. 34, it is decided that the true local motion vector regarding the target block coincides with the global motion vector GMV. Then, in this instance, it is evaluated that the background coincidence degree with the target block is high while the hit ratio $\beta$ regarding the target block has a high value. Then, the noise reduction processing motion vector regarding the target block is the global motion vector GMV.

Here, in the present embodiment, the hit ratio $\beta$ assumes a value within the range of $0 \leq \beta \leq 1$. If the local motion vector LMV and the global motion vector GMV coincide fully with each other, then the hit ratio $\beta$ can be determined as $\beta=1$. However, in the present example, the evaluation of whether or not the local motion vector LMV and the global motion vector GMV coincide fully with each other is not carried out, but the corrected SAD value MinSAD_G and the SAD value (MinSAD) at the local motion vector LMV are compared with each other for evaluation. Accordingly, the evaluation result includes not only a case wherein the local motion vector LMV and the global motion vector GMV coincide fully with each other but also another case wherein they do not coincide with each other.

Then, as hereinafter described, it is assumed that, in the present embodiment, if MinSAD_G<MinSAD is satisfied, then the hit ratio $\beta$ is, for example, $\beta=0.75$. Here, the reason why $\beta=1$ is not used is that the comparison result described above includes the case wherein the local motion vector LMV and the global motion vector GMV do not coincide with each other as described hereinabove.

Figure 35:
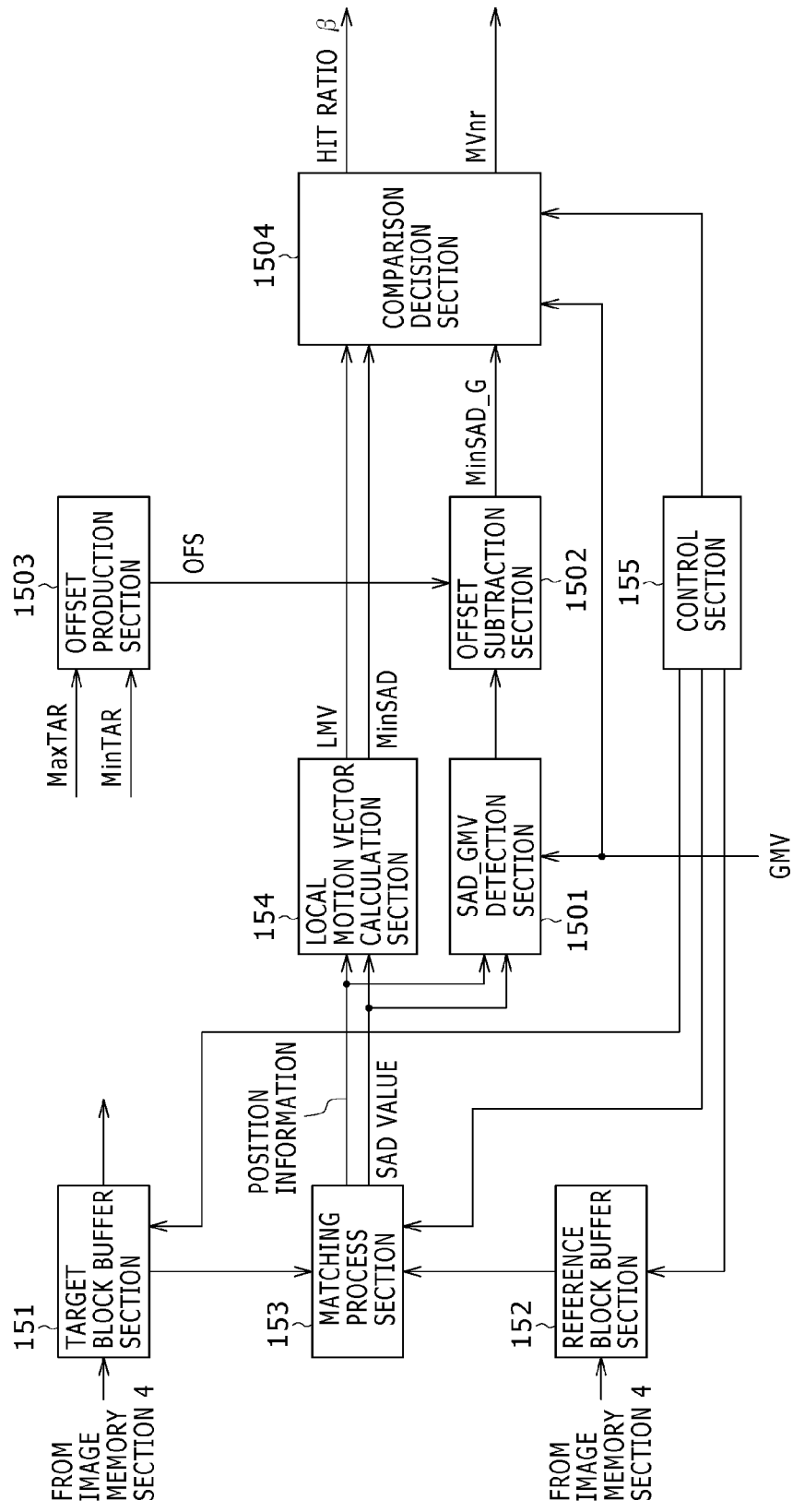
FIG. 35 is a block diagram showing an example of a configuration of a background/moving image pickup object decision section of the image processing apparatus.

FIG. 35 shows an example of a configuration of the background/moving image pickup object decision section 150 in the case of the first example together with associated elements.

Referring to FIG. 35, the background/moving image pickup object decision section 150 of the example shown includes a SAD_GMV detection section 1501, an offset subtraction section 1502, an offset production section 1503 and a comparison decision section 1504.

In the present example, SAD values and position information of reference blocks, that is, information of reference vectors, calculated upon block rematching from the matching processing section 153 are supplied to the local motion vector calculation section 154. The local motion vector calculation section 154 detects the lowest SAD value MinSAD upon block rematching and calculates a local motion vector LMV, that is, position information of the reference block or information of the reference vector. Then, the local motion vector calculation section 154 supplies the local motion vector LMV and the lowest SAD value MinSAD obtained by the block rematching process to the comparison decision section 1504.

The SAD values and position information of reference blocks, that is, information of reference vectors, calculated upon block rematching from the matching processing section 153 are supplied also to the SAD_GMV detection section 1501. The SAD_GMV detection section 1501 detects the SAD value SAD_GMV regarding the reference block of the reference vector coincident with the global motion vector GMV and supplies the detected SAD value SAD_GMV to the offset subtraction section 1502.

The offset subtraction section 1502 subtracts the offset value OFS from the offset production section 1503 from the SAD value SAD_GMV from the SAD_GMV detection section 1501 to produce a corrected SAD value MinSAD_G. Then, the offset subtraction section 1502 supplies the produced corrected SAD value MinSAD_G to the comparison decision section 1504.

The offset production section 1503 produces and supplies an offset value OFS corresponding to noise of the image to the offset subtraction section 1502. Since the noise of the image exhibits a value corresponding to the luminance value of the image, in the present embodiment, information of a correspondence table between various luminance values and offset values OFS is stored in the offset production section 1503.

The offset production section 1503 calculates a luminance value of the target block as the difference between the highest luminance value MaxTAR from the highest luminance value detection section 1592 and the lowest luminance value MinTAR from the lowest luminance value detection section 1593. Then, the offset production section 1503 searches the correspondence table described hereinabove using the calculated luminance value of the target block as an argument to acquire an offset value OFS corresponding to the luminance value of the argument.

The comparison decision section 1504 compares the lowest SAD value MinSAD corresponding to the local motion vector LMV and the corrected SAD value MinSAD_G from the offset subtraction section 1502 with each other and produces and outputs a hit ratio β in response to a result of the comparison.

Supplied also to the comparison decision section 1504 are the re-calculated local motion vector LMV from the local motion vector calculation section 154 and the global motion vector GMV from the global motion vector calculation section 158.

Then, if MinSAD_G<MinSAD is satisfied, then since the background coincidence degree is high, the comparison decision section 1504 outputs the global motion vector GMV as the noise reduction processing motion vector MVnr to the motion compensation picture production section 16. On the other hand, if MinSAD_G<MinSAD is not satisfied, then since the background coincidence degree is low, the comparison decision section 1504 outputs the local motion vector LMV as the noise reduction processing motion vector MVnr to the motion compensation picture production section 16.

It is to be noted that the SAD_GMV detection section 1501 and the offset subtraction section 1502 for the global motion vector GMV may be configured so as to be included in the local motion vector calculation section 154. In this instance, the local motion vector calculation section 154 carries out block rematching to detect the SAD value SAD_GMV regarding the reference block corresponding to the global motion vector GMV and carries out subtraction mathematical operation of the offset value OFS.

<Flow of the Background/Moving Image Pickup Object Decision Process>

Figure 36:
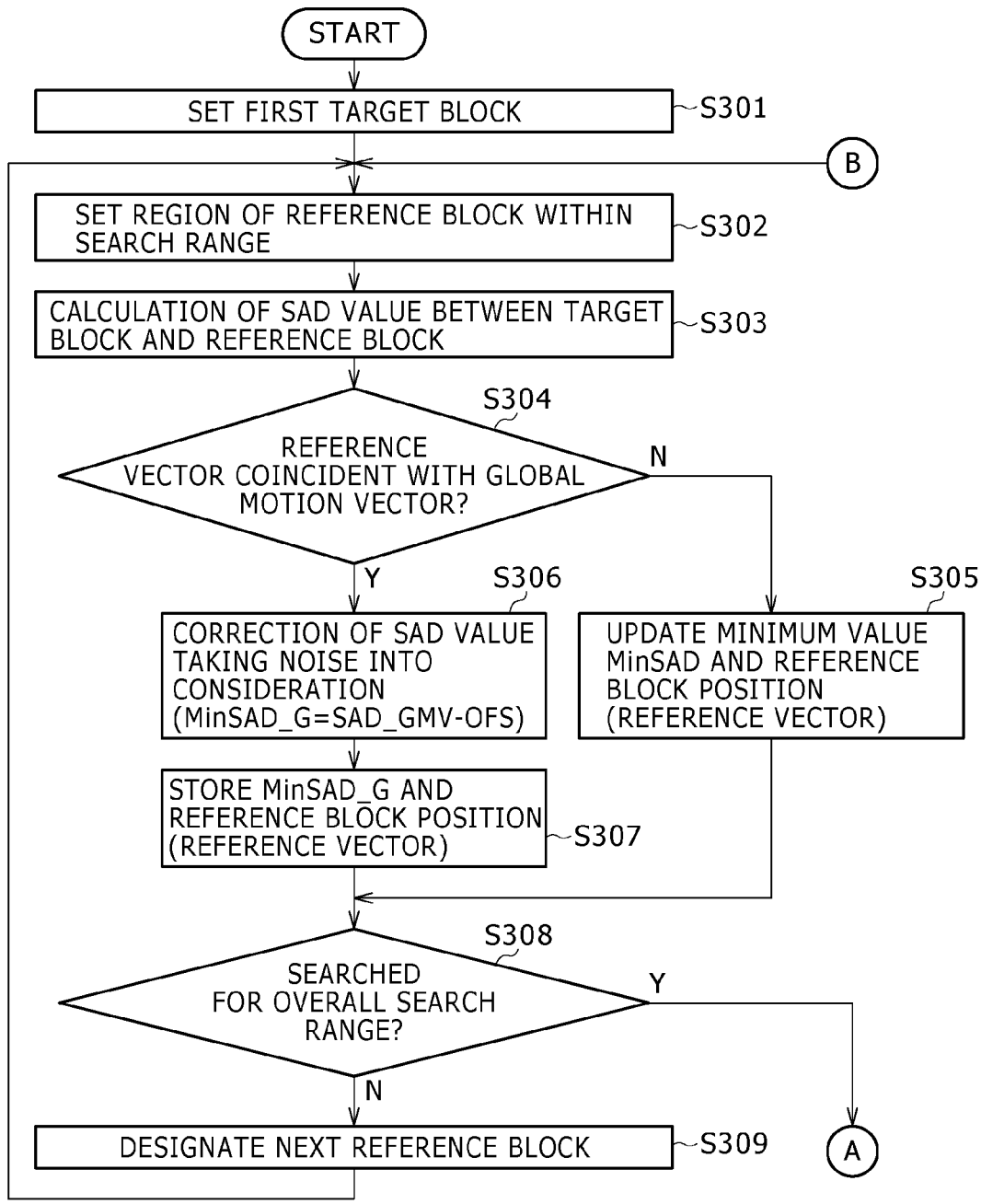
FIGS. 36 and 37 are flow charts illustrating processing operation by the background/moving image pickup object decision section of FIG. 35.
Figure 37:
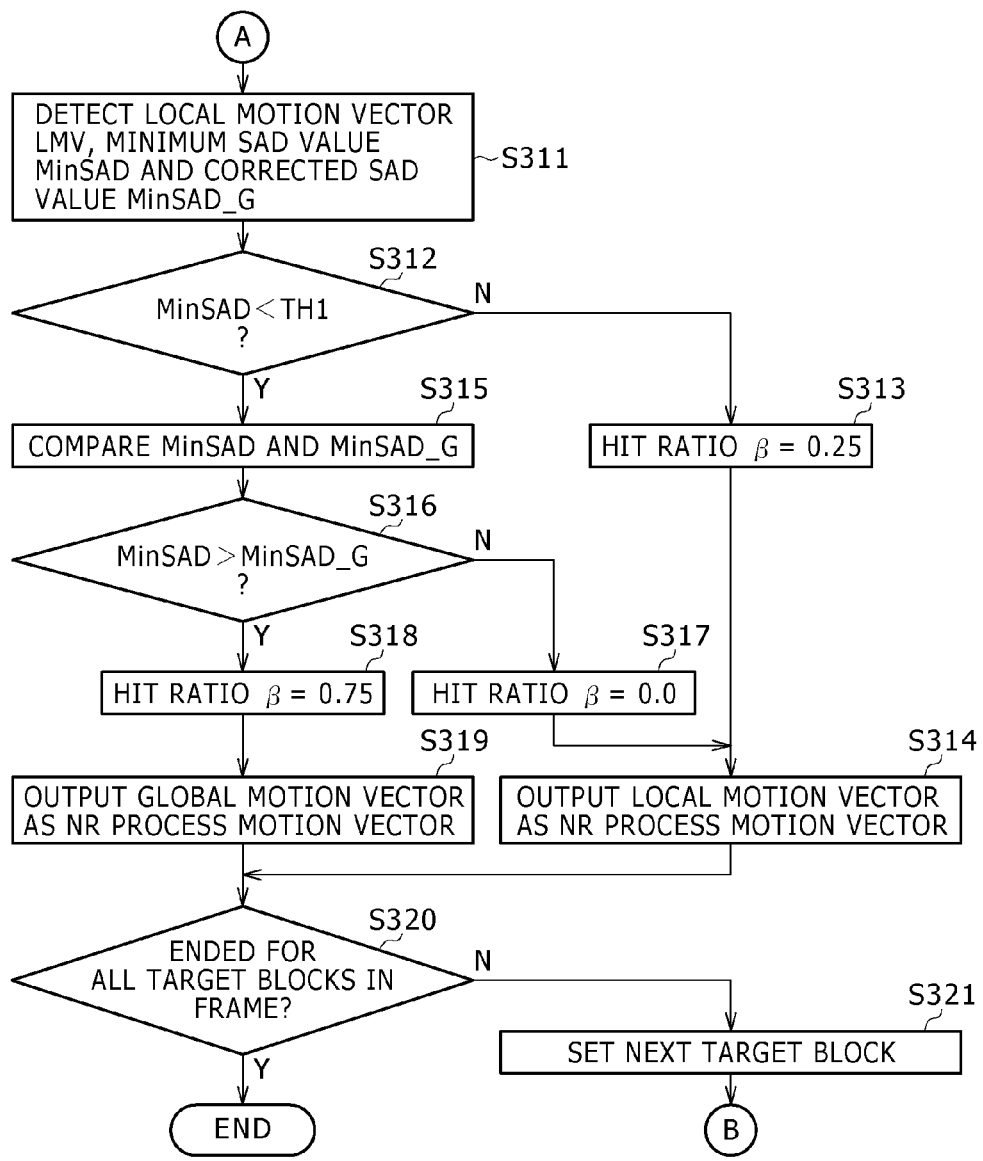

A flow of the block rematching process by the local motion vector calculation section 154 and the background coincidence degree evaluation process by the background/moving image pickup object decision section 150 having the configuration of FIG. 35 is described more particularly with reference to FIGS. 36 and 37. The process of FIGS. 36 and 37 is executed by the components under the control of the control section 155. It is to be noted that the process of FIGS. 36 and 37 is for a case wherein the SAD_GMV detection section 1501 and the offset subtraction section 1502 are configured so as to be included in the local motion vector calculation section 154.

First at step S301, block rematching is started under the control of the control section 155 to set a first target block in the target block buffer section 151. Then at step S302, a reference block to be processed for block matching is set from among image data of the reference frame within a matching processing range buffered in the reference block buffer 152 under the control of the control section 155.

Then at step S303, the matching processing section 153 carries out a block matching process for the set target block and the set reference block to calculate the SAD value. Then, the matching processing section 153 supplies the determined SAD values to the local motion vector calculation section 154 together with the position information or reference vector of the reference block.

Then at step S304, the local motion vector calculation section 154 decides whether or not the reference vector coincides with the global motion vector GMV. This corresponds to processing operation of the SAD_GMV detection section 1501.

If it is decided at step S304 that the reference vector does not coincide with the global motion vector GMV, then the local motion vector calculation section 154 carries out an updating process of the lowest SAD value MinSAD and the reference block position or reference vector at step S305. In particular, the local motion vector calculation section 154 compares the lowest SAD value MinSAD stored till then and the newly calculated SAD value with each other and stores the lower value as the lowest SAD value MinSAD. Further, the local motion vector calculation section 154 updates also the reference block position or reference vector with that which indicates the lowest SAD value.

Then at step S308, the control section 155 decides whether or not the block matching of all of the reference blocks in the search range is completed.

Then, if it is decided at step S308 that the process for all of the reference blocks in the search range is not completed as yet, then the control section 155 sets a next reference block at step S309. Then, the processing returns to step S302 to repeat the processes at the steps beginning with step S302 described hereinabove.

On the other hand, if it is decided at step S304 that the reference vector coincides with the global motion vector GMV, then the local motion vector calculation section 154 subtracts the offset value OFS from the SAD value SAD_GMV at step S306. Then at step S307, the local motion vector calculation section 154 stores a result of the subtraction as the corrected SAD value MinSAD_G together with the corresponding reference block position, that is, corresponding reference vector=global motion vector GMV.

Then, the processing advances to step S308, at which the control section 155 decides whether or not the processing for all of the reference blocks in the search range is completed.

Then, if it is decided at step S308 that the processing for all of the reference blocks in the search range is completed, then the local motion vector calculation section 154 detects the local motion vector LMV and the lowest SAD value MinSAD and supplies them to the comparison decision section 1504.

The comparison decision section 1504 supplies also the corrected SAD value MinSAD_G to the comparison decision section 1504 at step S311 of FIG. 37.

Then at step S312, the comparison decision section 1504 of the background/moving image pickup object decision section 150 decides whether or not the lowest SAD value MinSAD is lower than a threshold value TH1 determined in advance. The process at step S312 is provided in order to cope with such a problem as described above.

In particular, for example, if a block corresponding to a moving image pickup object portion on a target image disappears due to movement on a reference image or undergoes significant deformation, then a situation wherein matching of any one of the reference blocks in the search range with the target block is not detected occurs.

In such a case as just described, the SAD values of the SAD table are high values similar to each other, and the lowest SAD value MinSAD is proximate to the other SAD values. In such a situation as just described, the corrected SAD value MinSAD_G obtained by subtracting the offset value OFS from the SAD value of the reference vector coincident with the global motion vector GMV is lower than the lowest SAD value MinSAD without fail, and there is the possibility that the corresponding portion may be detected in error as a background portion.

Therefore, in order to eliminate this problem, in the present embodiment, the SAD value at the reference vector coincident with the global motion vector GMV is corrected so that, where the lowest SAD value MinSAD is higher than the threshold value TH1, the process of deciding the background coincidence degree is not carried out.

Accordingly, if it is decided at step S312 that the lowest SAD value MinSAD is higher than the threshold value TH1, then the comparison decision section 1504 does not carry out the decision of the background coincidence degree using the global motion vector GMV but sets the hit ratio β to β=0.25 at step S313. The reason why the hit ratio β is not set to β=0 is that it is taken into consideration that a block which coincides with the background may exist among those target blocks which exhibit a SAD value higher than the threshold value TH1.

Then at step S314, the comparison decision section 1504 outputs the re-calculated local motion vector LMV as the noise reduction processing motion vector of the target block to the motion compensation picture production section 16.

Thereafter, the control section 155 decides at step S320 whether or not the process for all of the target blocks in the target frame is completed. If the process is not completed as yet, then the control section 155 sets a next target block at step S321. Then, the processing returns to step S302 so that the processes at the steps beginning with step S302 described hereinabove are repeated under the control of the control section 155.

On the other hand, if it is decided at step S312 that the lowest SAD value MinSAD is lower than the threshold value TH1, then the comparison decision section 1504 compares the lowest SAD value MinSAD with the corrected SAD value MinSAD_G at step S315. Then, the comparison decision section 1504 decides whether or not MinSAD>MinSAD_G is satisfied at step S316. If it is decided that MinSAD>MinSAD_G is not satisfied, then it is decided that the target block does not coincide with the background and sets the hit ratio β to β=0 at step S317.

From step S317, the processing advances to step S314, at which the comparison decision section 1504 outputs the re-calculated local motion vector LMV as the noise reduction processing motion vector of the target block to the motion compensation picture production section 16. Then, the processing advances to step S320 to repeat the processes at the steps beginning with step S320 described hereinabove.

On the other hand, if it is decided at step S316 that MinSAD>MinSAD_G is satisfied, then it is decided that the degree with which the target block coincides with the background is high and sets the hit ratio β to β=0.75 at step S318. Then, the comparison decision section 1504 outputs the global motion vector GMV as the noise reduction processing motion vector of the target block to the motion compensation picture production section 16 at step S319.

From step S319, the processing advances to step S320, at which the control section 155 decides whether or not the processing for all of the target blocks in the target frame is completed. If it is decided at step S320 that the processing for all of the target blocks in the target frame is not completed as yet, then the control section 155 sets a next target block at steps S321. Thereafter, the processing returns to step S302.

On the other hand, if it is decided at step S320 that the processing for all of the target blocks in the target frame is completed, then the control section 155 ends the background/moving image pickup object decision processing operation.

It is to be noted that, in the embodiment described above, the offset value OFS is subtracted from the SAD value SAD_GMV of the global motion vector GMV to obtain the corrected SAD value MinSAD_G and then the corrected SAD value MinSAD_G and the lowest SAD value MinSAD are compared with each other. However, it is quite equivalent if a value obtained by adding the offset value OFS to the lowest SAD value MinSAD of the local motion vector LMV (MinSAD+OFS) and the SAD value SAD_GMV of the global motion vector GMV are compared with each other.

SECOND EXAMPLE

Correction of the SAD Value by Gain Multiplication

In the first example described above, the offset value OFS is applied to correct the SAD value SAD_GMV regarding the reference block at the position of the reference vector coincident with the global motion vector GMV. A similar way of thinking may be applied such that, in place of the addition of the offset value OFS, a gain g determined taking noise of the image into consideration can be multiplied to correct the SAD value SAD_GMV. In the case of this example, since the SAD value SAD_GMV is multiplied by the gain g in a decreasing direction, the gain g is g<1. It is to be noted that, where the correlation value otherwise has a characteristic that it increases in response to increase of the correlation, then g>1 is satisfied naturally.

The corrected SAD value MinSAD_G of the SAD value SAD_GMV at the global motion vector GMV in the present second example is given by $$\text{Min}SAD\_G = SAD\_GMV \times g \qquad \text{(expression 17)}$$

Figure 38:
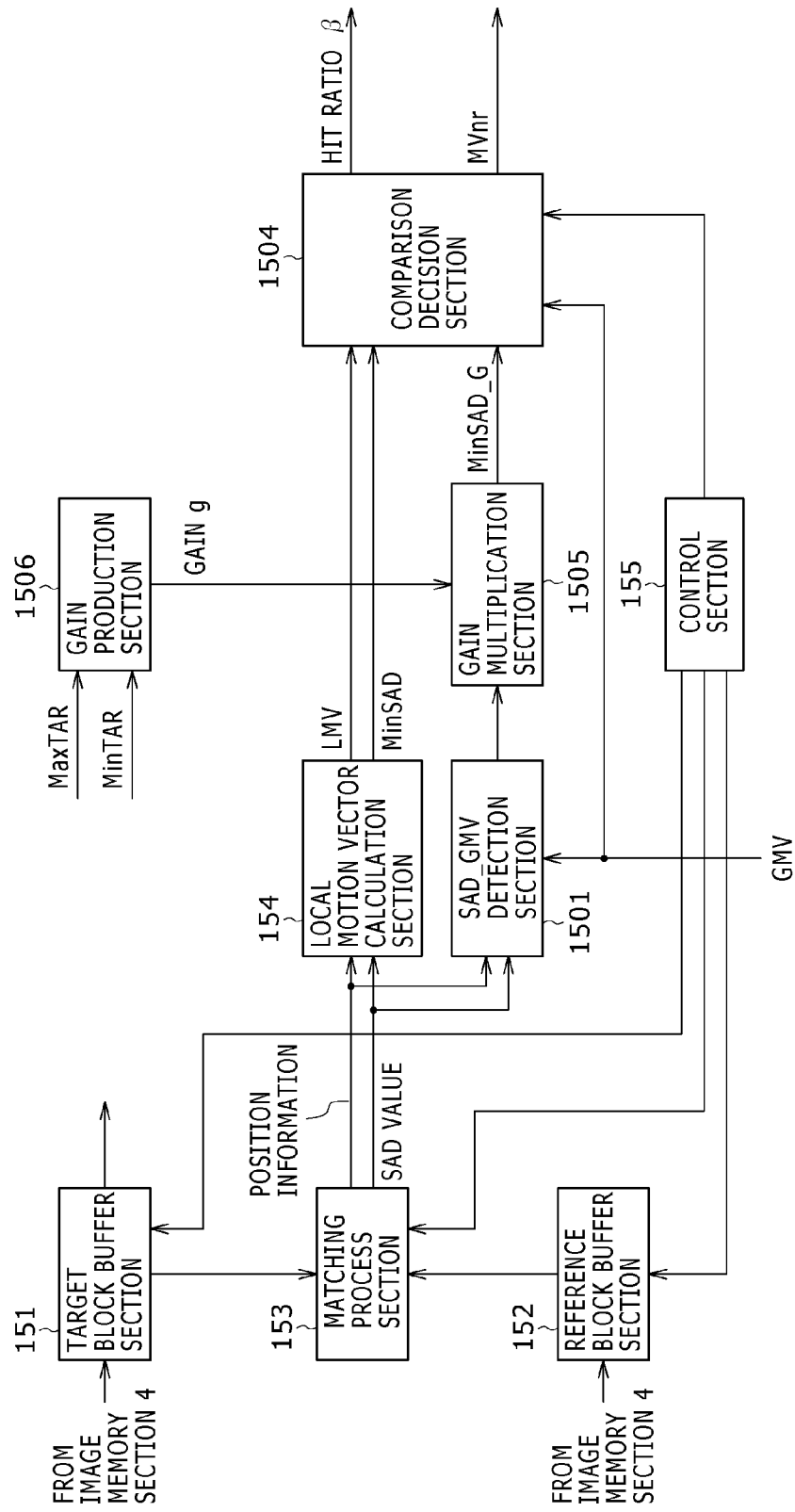
FIG. 38 is a block diagram showing another example of a configuration of the background/moving image pickup object decision section of the image processing apparatus.

FIG. 38 is a functional block diagram showing an example of a configuration of the background/moving image pickup object decision section 150 in the case of the second example.

Referring to FIG. 38, the background/moving image pickup object decision section 150 shown is a modification to and is similar in configuration and processing operation to the background/moving image pickup object decision section 150 of the configuration described hereinabove with reference to FIG. 35 except that it includes a gain multiplication section 1505 in place of the offset subtraction section 1502 and includes a gain production section 1506 in place of the offset production section 1503.

The gain production section 1506 stores, since noise of an image corresponds to the luminance value of the image, information of a correspondence table between various luminance values and gains g (g<1) and uses a luminance value of the target block as an argument to output a corresponding gain g.

The gain multiplication section 1505 multiplies the SAD value SAD_GMV from the SAD_GMV detection section 1501 by the gain g from the gain production section 1506 to produce a corrected SAD value MinSAD_G. Then, the gain multiplication section 1505 supplies the produced corrected SAD value MinSAD_G to the comparison decision section 1504. The other configuration and processing operation is the same as that of the first example described above.

In the background/moving image pickup object decision process according to the second example, the correction process for the SAD value SAD_GMV at step S306 illustrated in FIG. 36 is replaced by a mathematical operation process of the expression 17 given hereinabove. The processes at the other steps may be quite similar to those in the first example.

It is to be noted that, in the example described above, the SAD value SAD_GMV of the global motion vector GMV is multiplied by the gain g (g<1) to obtain the corrected SAD value MinSAD_G, and the corrected SAD value MinSAD_G and the lowest SAD value MinSAD are compared with each other. However, it is quite equivalent if a value obtained by multiplying the lowest SAD value MinSAD of the local motion vector LMV by a reciprocal number to the gain g (MinSAD×1/g) and the SAD value SAD_GMV of the global motion vector GMV are compared with each other.

It is to be noted that also the gain g in the present second example has a value with which a motion vector of a moving image pickup object is prevented from being decided as the lowest SAD value similarly to the offset value OFS in the first example. In other words, in the present example, also the gain g is set to a value taking the threshold value th (refer to the expression 7) for the reliability index value Ft of the reliability of the local motion vector similarly to the offset value OFS into consideration.

Other Examples of the Configuration and Processing Operation of the Background/Moving Image Pickup Object Decision Section 150

Incidentally, while the global motion vector GMV calculated based on the global motion GM can be represented with a degree of accuracy higher than the pixel pitch, in the embodiment described above, the block matching is carried out with accuracy of the pixel pitch. Therefore, an error sometimes occurs with the position of the reference block of the reference vector coincident with the global motion vector GMV.

Further, even if the expanded affine transformation is used as in the embodiment described above, an error may possibly exist between the determined global motion GM and the true global motion. Further, if, in the layered block matching in the embodiment described above, a miss occurs in block matching in a shallow layer, then the miss cannot be recovered in any later layer. Taking the foregoing into consideration, it is considered that it is better to provide a certain margin to the position of the global motion vector GMV.

This is taken into consideration in an example described below. In the present example, not only the SAD value of the position Pgmv of the global motion vector GMV but also the SAD values in the proximity of and around the position Pgmv are subjected to such correction as described hereinabove and then compared with the lowest SAD value MinSAD.

Figure 39:
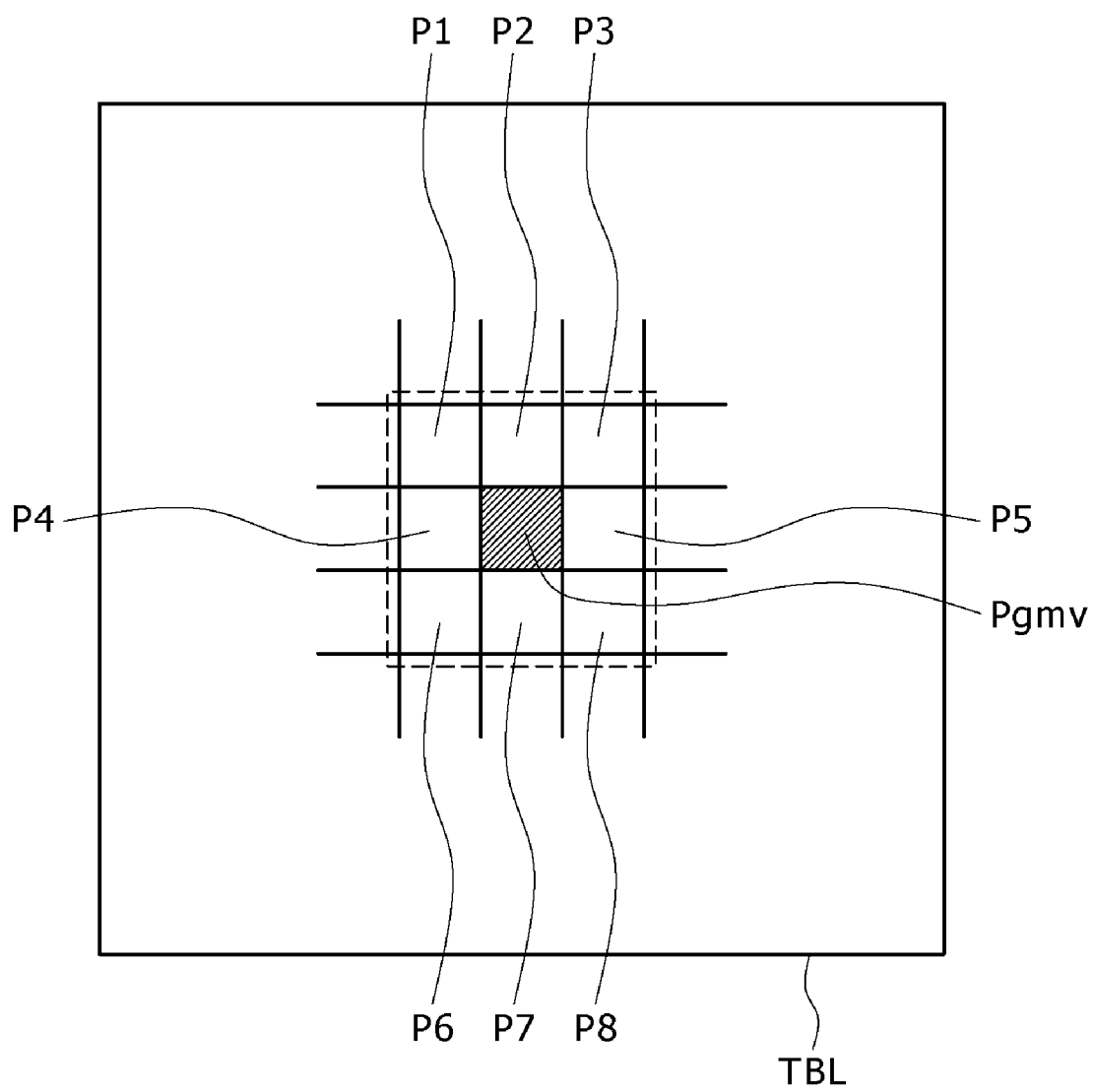
FIG. 39 is a diagrammatic view illustrating affine transformation where a margin is provided to the position of a global motion vector.

For example, it is assumed that it is decided that the position of the global motion vector GMV in the SAD table TBL regarding the target block is the position Pgmv as seen in FIG. 39. At this time, not only the SAD value of the position Pgmv but also the eight SAD values of surrounding neighboring positions P1 to P8 directly neighboring with the position Pgmv are subjected to such correction as described above and are determined as an object of decision of the background coincidence degree.

Further, in the case of the present example, nine corrected SAD values MinSAD_G_0 to MinSAD_G_8 of the SAD value at the position Pgmv and the positions P1 to P8 are compared with the re-calculated lowest SAD value MinSAD. Then, if any of the nine corrected SAD values is lower than the lowest SAD value MinSAD, then it is evaluated that the motion vector of the target block has a high coincidence degree with the global motion vector GMV and is further evaluated that the background coincidence degree is high.

Figure 40:
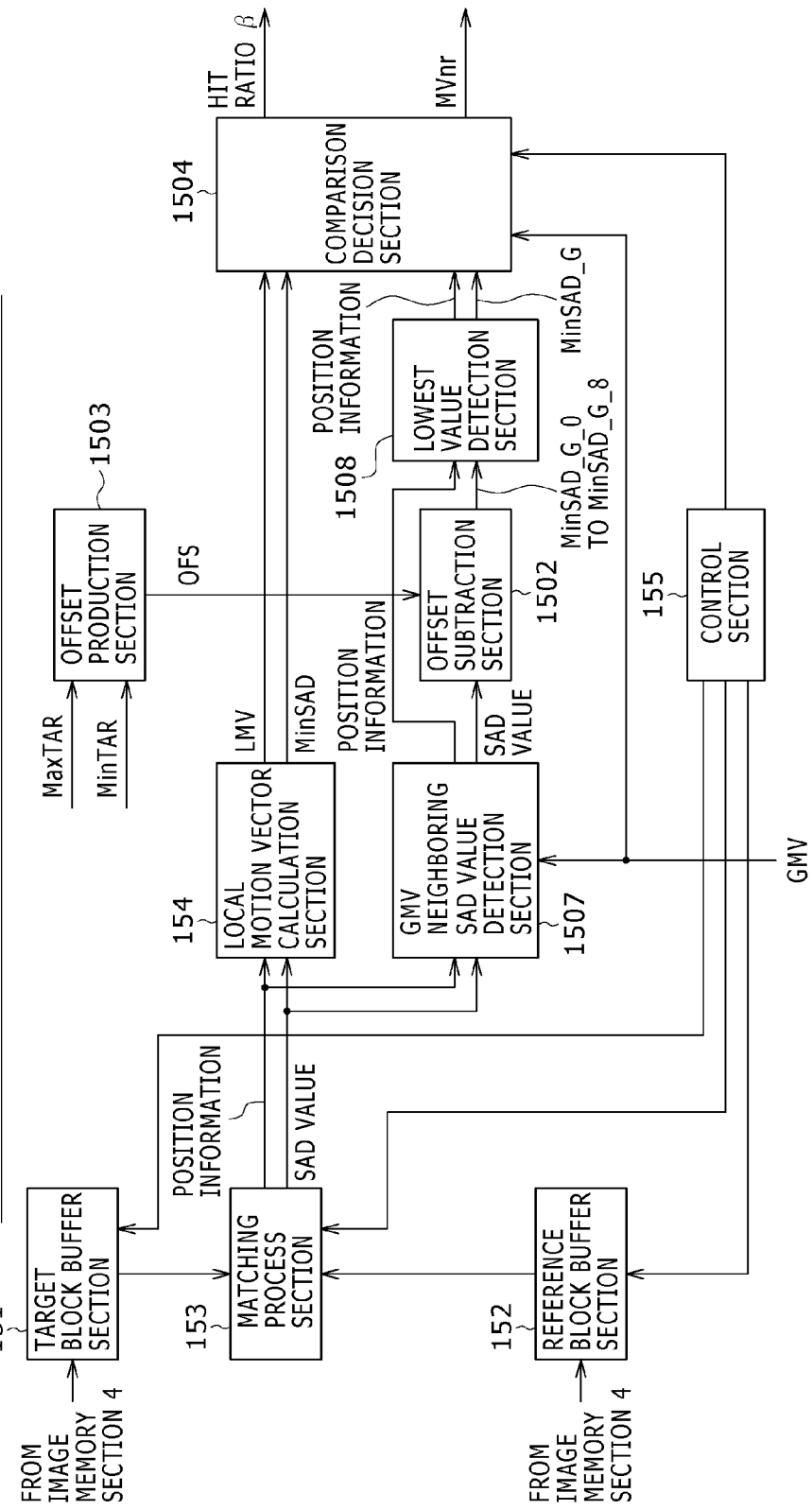
FIG. 40 is a block diagram showing a further example of a configuration of the background/moving image pickup object decision section of the image processing apparatus.

In the present example, the background/moving image pickup object decision section 150 and several elements around the background/moving image pickup object decision section 150 where the first example described hereinabove is used as the correction method for the SAD value are shown in FIG. 40.

Referring to FIG. 40, the background/moving image pickup object decision section 150 shown is a modification to but is different from that shown in FIG. 35 in that it includes a GMV neighboring SAD value detection section 1507 in place of the SAD_GMV detection section 1501 and additionally includes a lowest value detection section 1508 interposed between the offset subtraction section 1502 and the comparison decision section 1504.

The GMV neighboring SAD value detection section 1507 detects, from among position information and SAD values from the matching processing section 153, the position Pgmv of the global motion vector GMV and the SAD value of the position Pgmv as well as the eight positions P1 to P8 in the proximity of and around the position Pgmv and SAD values of the positions P1 to P8.

Then, the GMV neighboring SAD value detection section 1507 supplies the detected SAD values to the offset subtraction section 1502. The offset subtraction section 1502 subtracts the offset value OFS from the offset production section 1503 from the nine SAD values of the positions Pgmv and P1 to P8 to produce corrected SAD values MinSAD_G_0 to MinSAD_G_8. Then, the offset subtraction section 1502 supplies the corrected SAD values MinSAD_G_0 to MinSAD_G_8 to the lowest value detection section 1508.

Further, the GMV neighboring SAD value detection section 1507 supplies also the detected positions Pgmv and P1 to P8 to the lowest value detection section 1508 in such a manner as to individually correspond to the SAD values at the positions.

The lowest value detection section 1508 detects the lowest value from among the nine corrected SAD values Min-SAD_G_0 to MinSAD_G_8 at the positions Pgmv and P1 to P8 and supplies the lowest value of a result of the detection as the corrected SAD value MinSAD_G to the comparison decision section 1504 together with the position information of the corrected SAD value MinSAD_G.

The comparison decision section 1504 compares the lowest SAD value MinSAD obtained as a result of the block rematching from the local motion vector calculation section 154 with the corrected SAD value MinSAD_G from the lowest value detection section 1580 to carry out evaluation decision of the background coincidence degree in a similar manner as described above.

When MinSAD>MinSAD_G is not satisfied, the comparison decision section 1504 sets the hit ratio β to β=0.0 and supplies the local motion vector LMV as the noise reduction processing motion vector. This operation is the same as that in the above described example.

On the other hand, when MinSAD>MinSAD_G is satisfied, the comparison decision section 1504 decides whether or not the position information corresponding to the corrected SAD value MinSAD_G coincides with the global motion vector GMV and changes the hit ratio β in accordance with a result of the decision. For example, if the position information corresponding to the corrected SAD value MinSAD_G coincides with the global motion vector GMV, then the hit ratio β is set to β=0.75. On the other hand, if the position information corresponding to the corrected SAD value MinSAD_G does not coincide with the global motion vector GMV, then the hit ratio β is set to β=0.5.

Also in the case of the present example, when MinSAD>MinSAD_G is satisfied, the global motion vector GMV is outputted as the noise reduction processing motion vector.

However, in the present example, when MinSAD>MinSAD_G is satisfied, the comparison decision section 1504 may otherwise output the local motion vector LMV corresponding to the position information from the lowest value detection section 1508 as the noise reduction processing motion vector.

It is to be noted that the lowest value detection section 1508 may be included in the comparison decision section 1504. In this instance, the lowest value may be detected from among the nine corrected SAD values and then compared with the lowest SAD value MinSAD, or the nine corrected SAD values may be compared one by one with the lowest SAD value MinSAD.

<Flow of the Background/Moving Image Pickup Object Decision Process>

Figure 41:
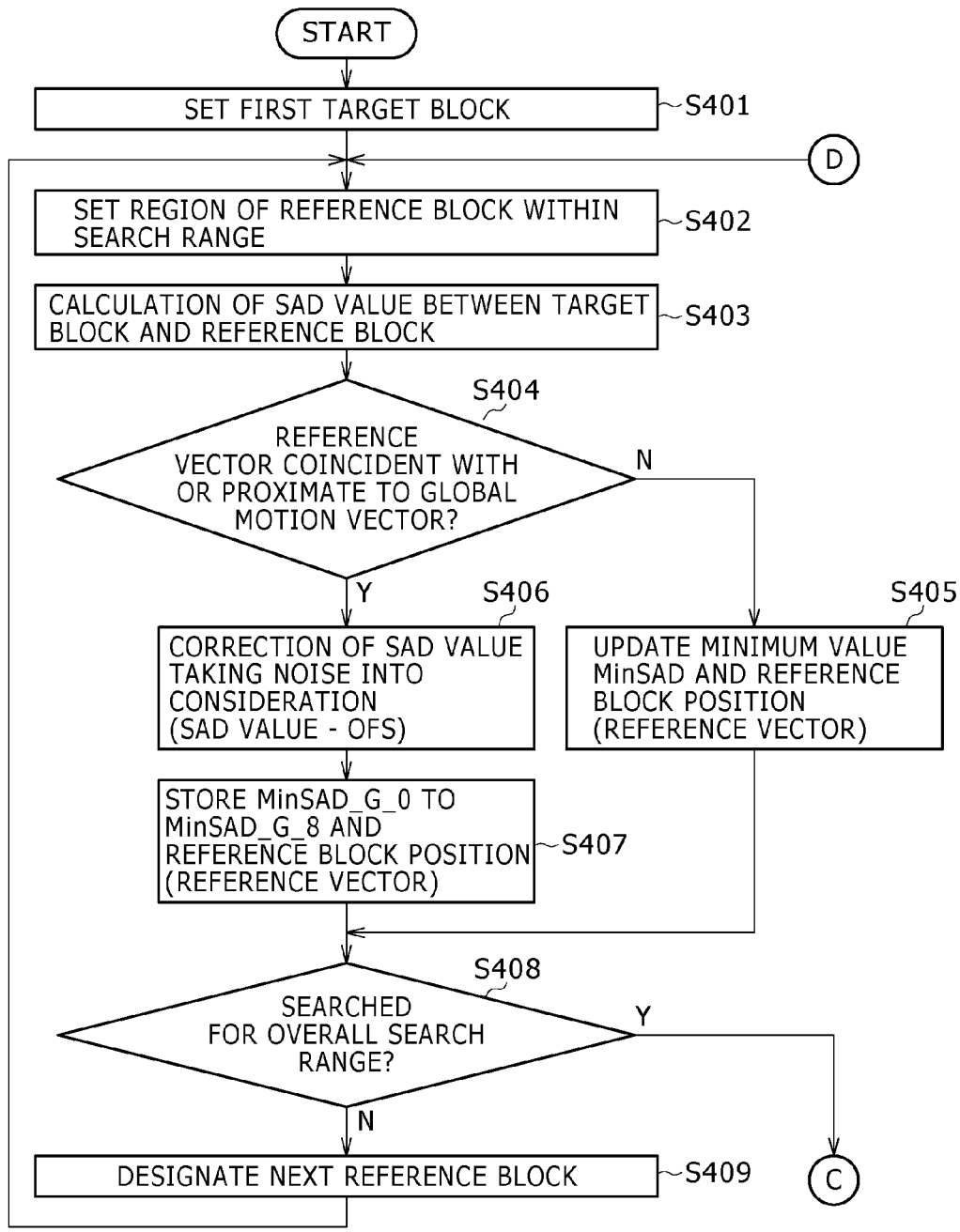
FIGS. 41 and 42 are flow charts illustrating processing operation by the background/moving image pickup object decision section of FIG. 40.
Figure 42:
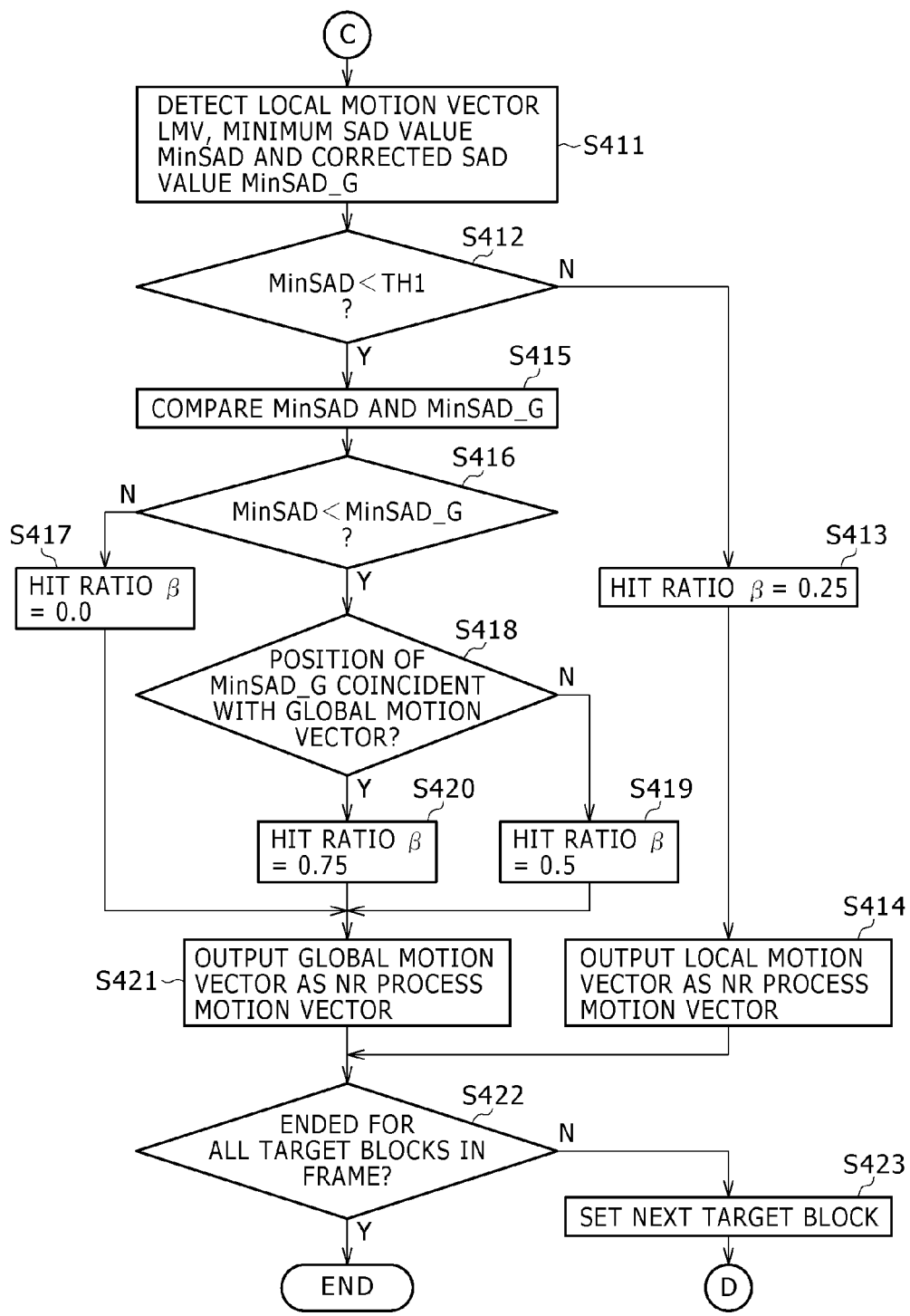

The flow of the block rematching process by the local motion vector calculation section 154 and the background coincidence degree evaluation process by the background/moving image pickup object decision section 150 having the configuration described above with reference to FIG. 40 is further described with reference to FIGS. 41 and 42. The processes in FIGS. 41 and 42 are executed by the components under the control of the control section 155. It is to be noted that the process of FIGS. 41 and 42 is executed by the local motion vector calculation section 154 and the background/moving image pickup object decision section 150 where the SAD_GMV detection section 1501 and the offset subtraction section 1502 are included in the local motion vector calculation section 154. Further, the lowest value detection section 1508 is included in the comparison decision section 1504.

First at step S401, the block rematching process is started and a first target block is set into the target block buffer section 151 under the control of the control section 155. Then at step S402, a reference block to be subjected to the block matching process is set from among the image data of reference frames within the matching processing range buffered in the reference block buffer 152 under the control of the control section 155.

Then at step S403, the matching processing section 153 carries out the block matching process between the set target block and the set reference block to calculate a SAD value. The matching processing section 153 supplies the calculated SAD value to the local motion vector calculation section 154 together with position information or a reference vector of the reference block.

Then at step S404, the local motion vector calculation section 154 decides whether or not the reference vector coincides with the global motion vector GMV and whether or not the reference vector coincides with any of the eight positions P1 to P8 in the proximity of and around the global motion vector GMV.

If it is decided at step S404 that the reference vector does not coincide any of the global motion vector GMV and the eight positions P1 to P8, then the local motion vector calculation section 154 carries out an updating process of the lowest SAD value MinSAD and the reference block position or reference vector of the lowest SAD value MinSAD at step S405.

Then, the control section 155 decides at step S408 whether or not the block matching of all of the reference blocks in the search range with the target block is completed.

If it is decided at step S408 that the processing for all of the reference blocks in the search range is not completed as yet, then the control section 155 sets a next reference block at step S409. Then, the processing returns to step S402 to repeat the processes at the steps beginning with step S402 described hereinabove.

On the other hand, if it is decided at step S404 that the reference vector coincides with one of the global motion vector GMV and the surrounding neighboring positions P1 to P8, then the local motion vector calculation section 154 subtracts the offset value OFS from the SAD value at step S406. Then, the local motion vector calculation section 154 stores a result of the subtraction as a corresponding one of the corrected SAD values MinSAD_G_0 to MinSAD_G_8 and stores the reference block position or reference vector of the corrected SAD value at step S407.

Then, the processing advances to step S408, at which it is decided whether or not the processing for all of the reference blocks in the search range is completed.

Then, if it is decided at step S408 that the processing for all of the reference blocks in the search range is completed, then the local motion vector calculation section 154 detects the local motion vector LMV and the lowest SAD value MinSAD and supplies them to the comparison decision section 1504. Further, the local motion vector calculation section 154 detects the corrected SAD value MinSAD_G as the lowest value from among the nine corrected SAD values MinSAD_G_0 to MinSAD_G_8 and supplies the corrected SAD value MinSAD_G to the comparison decision section 1504 at step S411 of FIG. 42.

Referring to FIG. 42, the comparison decision section 1504 of the background/moving image pickup object decision section 150 decides at step S412 whether or not the lowest SAD value MinSAD is lower than the threshold value TH1 determined in advance.

If it is decided at step S412 that the lowest SAD value MinSAD is higher than the threshold value TH1, then the comparison decision section 1504 does not carry out decision of the background coincidence degree using the global motion vector GMV but sets the hit ratio β to β=0.25 at step S413. Then, the comparison decision section 1504 outputs the re-calculated local motion vector LMV as the noise reduction processing motion vector of the target block to the motion compensation picture production section 16 at step S414.

Then, the processing advances from step S414 to step S422, at which the control section 155 decides whether or not the processing for all of the target blocks in the target block is completed. If the processing is not completed as yet, then the control section 155 sets a next target block at step S423. Then, the processing returns to step S402 to repeat the above-described processes at the steps beginning with the step S402 under the control of the control section 155.

If it is decided at step S412 that the lowest SAD value MinSAD is lower than the threshold value TH1, then the comparison decision section 1504 compares the lowest SAD value MinSAD and the corrected SAD value MinSAD_G with each other at step S415. Then at step S416, the comparison decision section 1504 decides whether or not MinSAD>MinSAD_G is satisfied. Then, if it is decided that MinSAD>MinSAD_G is not satisfied, then the comparison decision section 1504 decides that the target block does not coincide with the background and sets the hit ratio β to β=0 at step S417.

Then, the processing advances from step S417 to step S414, at which the comparison decision section 1504 outputs the re-calculated local motion vector LMV as the noise reduction processing motion vector of the target block to the motion compensation picture production section 16. Then, the processing advances to step S422 to repeat the processes at the steps beginning with step S422.

On the other hand, if it is decided at step S416 that MinSAD>MinSAD_G is satisfied, then it is decided at step S418 whether or not the position or reference vector of the lowest SAD value MinSAD coincides with the global motion vector GMV. If it is decided at step S418 that the position or reference vector of the lowest SAD value MinSAD does not coincide with the global motion vector GMV, then the comparison decision section 1504 sets the hit ratio β to β=0.5 at step S419.

On the other hand, if it is decided at step S418 that the position or reference vector of the lowest SAD value MinSAD coincides with the global motion vector GMV, then the comparison decision section 1504 sets the hit ratio β to β=0.75 at step S420.

Then, the comparison decision section 1504 outputs, next to step S419 or S420, the global motion vector GMV as the noise reduction processing motion vector of the target block to the motion compensation picture production section 16 at step S421.

Next to step S421, the processing advances to step S422, at which the control section 155 decides whether or not the processing for all of the target blocks in the target frame is completed. If it is decided at step S422 that the processing for all of the target blocks in the target frame is not completed as yet, then the control section 155 sets a next target block at step S423. Thereafter, the processing returns to step S402.

On the other hand, if it is decided at step S422 that the processing for all of the target blocks in the target frame is completed, then the control section 155 ends the background/moving image pickup object decision process operation.

This method of carrying out background/moving image pickup object decision taking the SAD values not only at the position of the global motion vector GMV but also at the positions in the proximity of and around the position of the global motion vector GMV into consideration can be applied also to the second example of the SAD value correction method described hereinabove.

Figure 43:
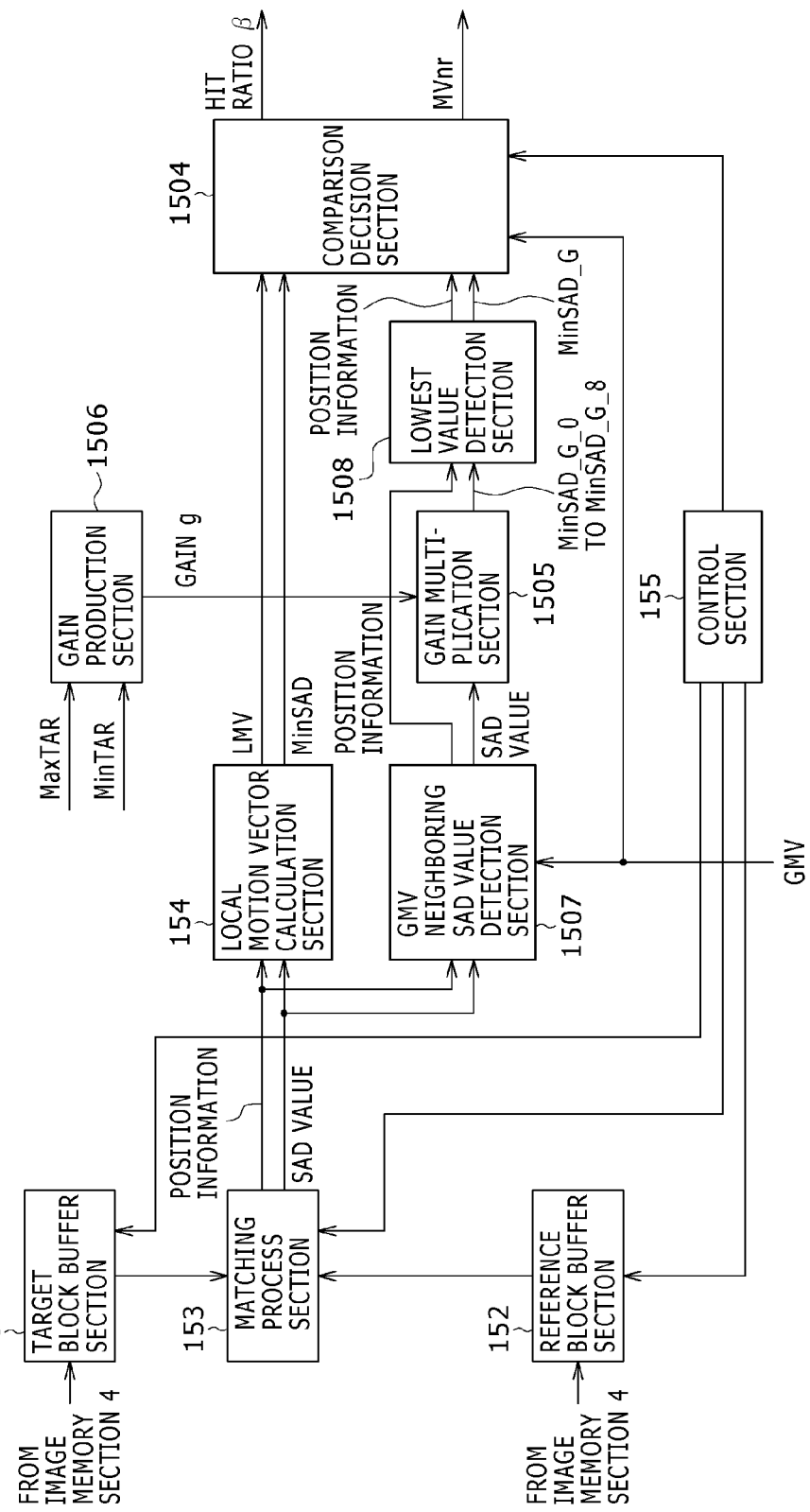
FIG. 43 is a block diagram showing a still further example of a configuration of the background/moving image pickup object decision section of the image processing apparatus.

FIG. 43 shows an example of a configuration of the background/moving image pickup object decision section and associated peripheral components where the second example is applied. The background/moving image pickup object decision section shown in FIG. 43 is a modification to and has a similar configuration to the background/moving image pickup object decision section 150 described hereinabove with reference to FIG. 40 except that it includes a GMV neighboring SAD value detection section 1507 in place of the SAD_GMV detection section 1501 and additionally includes a lowest value detection section 1508 interposed between the gain multiplication section 1505 and the comparison decision section 1504.

The background/moving image pickup object decision section 150 of FIG. 43 carries out processing operation which is quite similar to that of the background/moving image pickup object decision section 150 of FIG. 38 except that the second example described hereinabove is used as the SAD value correction method. Therefore, detailed description of the processing operation of the background/moving image pickup object decision section 150 of FIG. 43 is omitted herein to avoid redundancy.

<Example of a Configuration of the Addition Ratio Calculation Section 21>

In the present embodiment, the addition ratio calculation section 21 determines the addition ratio α ($0 \leq \alpha \leq 1$) in a unit of a pixel. Then, as described hereinabove, the addition ratio α is calculated basically in response to a difference in a unit of a pixel between the target image and the motion compensation image and the hit ratio β. To this end, the hit ratio β, data TGv of the target image and data MCv of the motion compensation image are supplied to the addition ratio calculation section 21.

Here, if the difference between the target image and the motion compensation image in a unit of a pixel is great, then since the image portion is considered a moving portion, the addition ratio α should be set to a low value. On the other hand, if there is no difference or little difference in a unit of a pixel, then the addition ratio α may be set to a high value. However, if it is unknown whether the target block is a background still picture portion or a moving image pickup object portion, it is necessary to set the addition ratio α to a comparatively low value in order to make multiple exposure at a moving portion less conspicuous as described above.

However, in the present embodiment, since the coincidence degree with a background still picture portion is determined by the hit ratio β, the addition ratio α is set to an increasing value as the hit ratio β increases and hence the background coincidence degree increases.

Further, in the preset embodiment, since noise of the image increases in response to the brightness of the image, the addition ratio calculation section 21 takes noise corresponding to the brightness of the image into consideration of the difference between the target image and the motion compensation image in a unit of a pixel. In particular, if the difference between the target image and the motion compensation image in a unit of a pixel is within the range of noise, then it is decided that the actual difference between the images is small. On the other hand, if the difference in a unit of a pixel is greater than the range of noise, then it is decided that the actual difference is actually great.

In order to take the noise into consideration, the highest luminance value MaxTAR and the lowest luminance value MinTAR are supplied from the motion vector calculation section 15 to the addition ratio calculation section 21. The addition ratio calculation section 21 calculates the brightness, that is, the illuminance Lx, of each target block from the highest luminance value MaxTAR and the lowest luminance value MinTAR.

Further, in order to make it possible to control the addition degree from the outside of the addition ratio calculation section 21, an addition adjusting gain GA is supplied to the addition ratio calculation section 21. The value of the addition adjusting gain GA may be set by a user selecting one of gain values prepared in advance. Or, the value of the addition adjusting gain GA may be determined in response to the ISO sensitivity of the picked up image. In the latter case, the brightness of the image may be decided based on the exposure value, shutter speed and so forth upon image pickup to determine the value of the addition adjusting gain GA. In particular, where the image is bright, since noise stands out, the gain is set to a comparatively low value so that the addition ratio may have a low value, but where the image is dark conversely, the gain is set to a comparatively high value so that the addition ratio may have a high value.

Figure 44:
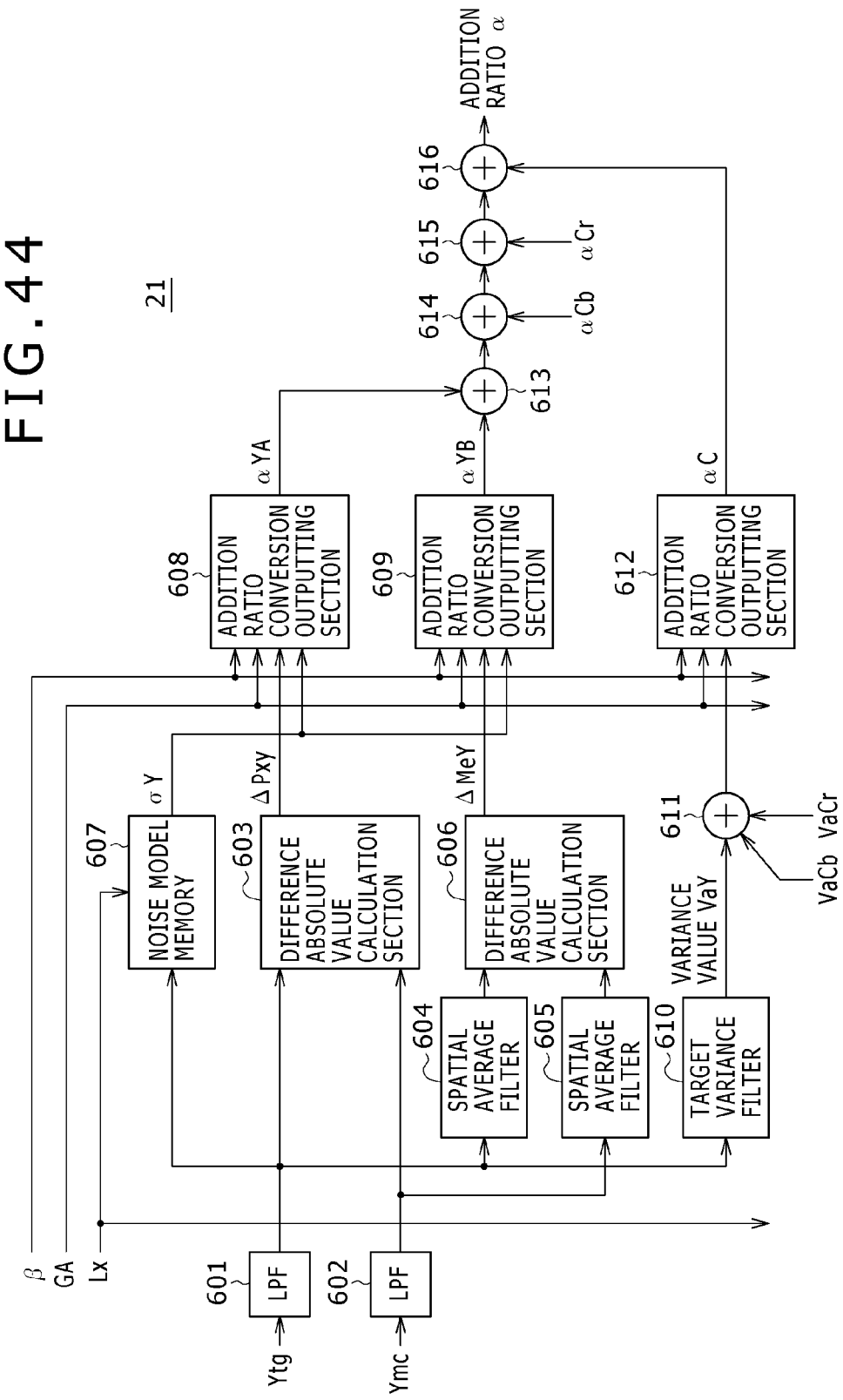
FIGS. 44 and 45 are block diagrams showing an example of a part of a configuration of the addition ratio calculation section.
Figure 45:
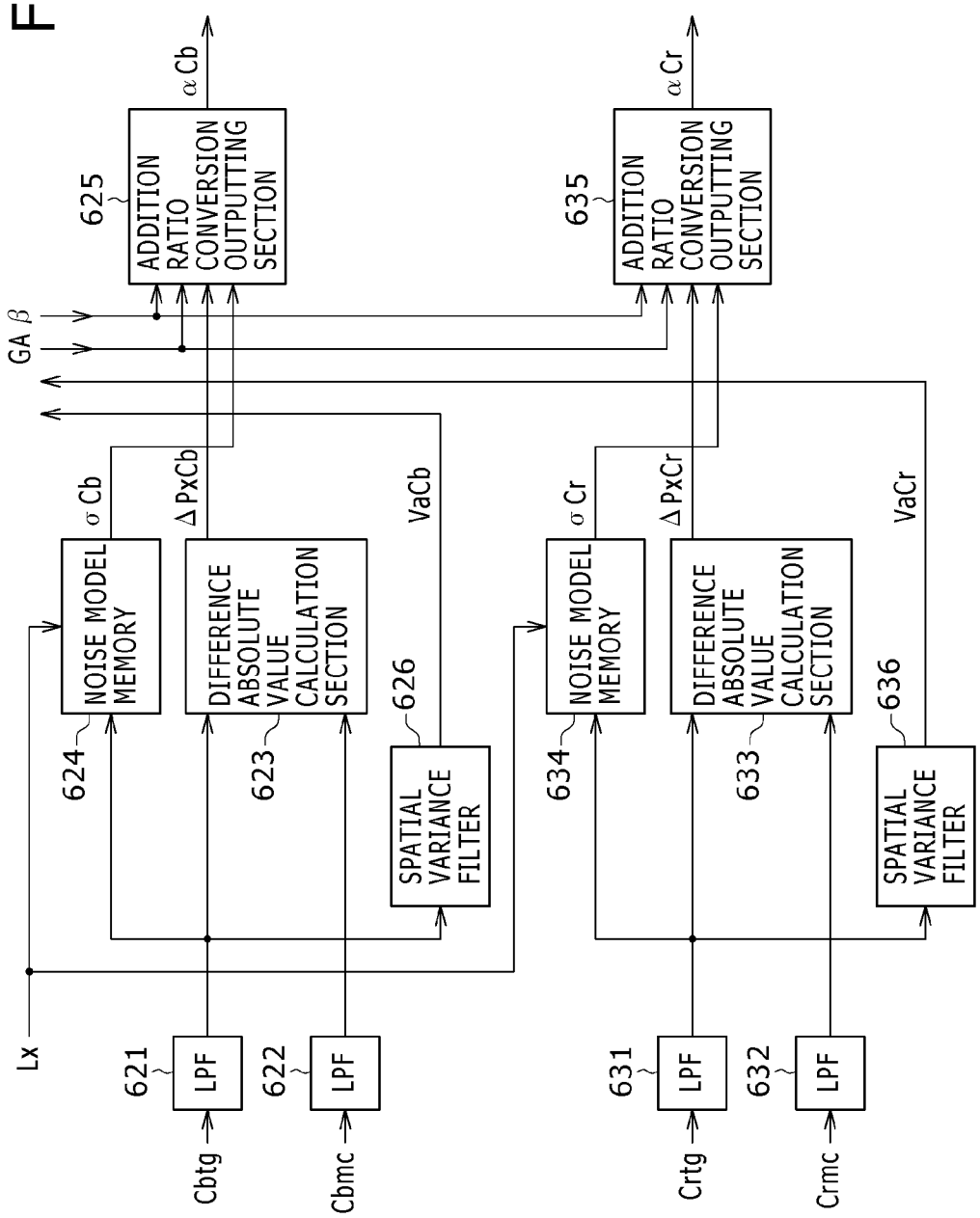

An example of a hardware configuration of the addition ratio calculation section 21 is shown in FIGS. 44 and 45. In the example of FIGS. 44 and 45, the data TGv of the target image and the data MCv of the motion compensation image are subject to processing separately from each other in regard to the luminance component and the color difference component.

FIG. 44 shows an example of a hardware configuration of the addition ratio calculation section 21 for the brightness component. An addition ratio calculation process is described first with reference to FIG. 44.

In particular, the luminance data Ytg from within the data TGv of the target image is supplied to a difference absolute value calculation section 603 through a low-pass filter 601. Meanwhile, the luminance data Ymc from within the data MCv of the motion compensation image is supplied to the difference absolute value calculation section 603 through another low-pass filter 602. The difference absolute value calculation section 603 calculates, for each pixel, the pixel difference absolute value ΔPxY between the luminance data Ytg and the luminance data Ymc and supplies the calculated pixel difference absolute value ΔPxY to an addition ratio conversion outputting sections 608.

The luminance data Ytg passing through the low-pass filter 601 is supplied to a spatial average filter 604. Meanwhile, the luminance data Ymc passing through the low-pass filter 602 is supplied to another spatial average filter 605.

The spatial average filters 604 and 605 individually determine average values Mtg and Mmc among nine pixels including a pixel with regard to which the pixel difference is to be determined by the difference absolute value calculation section 603 (the pixel is hereinafter referred to as noticed pixel) and eight pixels around the noticed pixel, respectively. Then, the spatial average filters 604 and 605 supply the determined average values Mtg and Mmc to a difference absolute value calculation section 606.

The difference absolute value calculation section 606 calculates an average difference absolute value ΔMeY between the average value Mtg and the average value Mmc and supplies the calculated average difference absolute value ΔMeY to an addition ratio conversion outputting section 609.

Figure 46:
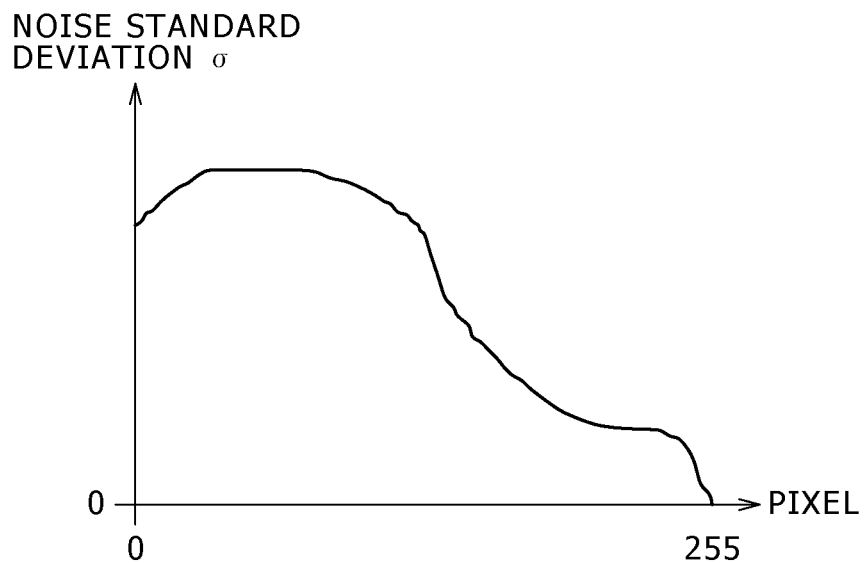

In the addition ratio calculation section 21 shown in FIG. 44, a noise model memory 607 for the luminance component is provided. A noise standard deviation σ of the pixel value with respect to the luminance value is calculated and stored in advance in the noise model memory 607. In particular, where the axis of abscissa indicates the luminance value of the pixel value and the axis of ordinate indicates the noise standard deviation σ, the noise standard deviation σ has, for example, such a value as represented by a curve shown in FIG. 46. As seen in FIG. 46, the noise standard deviation σ is low with regard to a bright pixel but is high with regard to a dark pixel.

Since the noise differs depending upon the brightness of the image, a plurality of noise models according to the illuminance Lx of the image are stored in the noise model memory 607.

Then, the illuminance Lx for each target block determined from the highest luminance value MaxTAR and the lowest luminance value MinTAR is supplied for selection of a noise model corresponding to the illuminance to the noise model memory 607. Consequently, it is determined based on the illuminance Lx which one of the noise models should be used.

The luminance data Ytg of the data TGv passing through the low-pass filter 601 is supplied to the noise model memory 607, and the noise standard deviation σY which is defined by the illuminance Lx and the luminance data Ytg is obtained from the noise model memory 607. This noise standard deviation σY is supplied to the addition ratio conversion outputting sections 608 and 609.

Further, the hit ratio β from the motion vector calculation section 15 and the addition adjusting gain GA from the outside are supplied to both of the addition ratio conversion outputting sections 608 and 609.

The addition ratio conversion outputting section 608 uses a conversion function which uses the pixel difference absolute value ΔPxY, noise standard deviation σY, hit ratio β and gain GA as conversion parameters to determine an addition ratio αYA based on the pixel difference absolute value ΔPxY and outputs the addition ratio αYA.

Meanwhile, the addition ratio conversion outputting section 609 uses a conversion function which uses the average difference absolute value ΔMeY, noise standard deviation σY, hit ratio β and gain GA as conversion parameters to determine an addition ratio αYB based on the average difference absolute value ΔMeY and outputs the addition ratio αYB.

Figure 47:
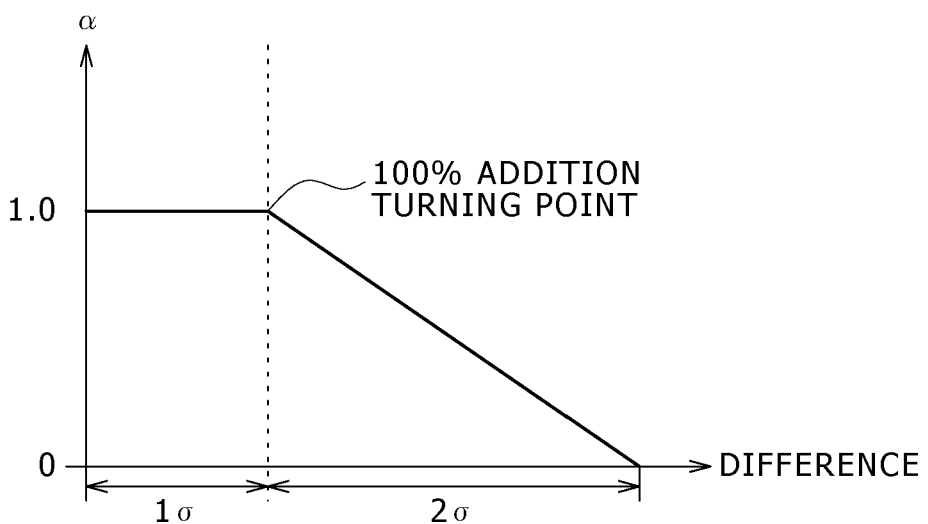

The addition ratio conversion outputting sections 608 and 609 basically determine the addition ratio α from the noise standard deviation σ and the difference value as seen in FIG. 47. It is to be noted that, in the addition ratio conversion outputting sections 608 and 609, the noise standard deviation σ is the noise standard deviation σY from the noise model memory 607, and the difference value is the pixel difference absolute value ΔPxY and the average difference absolute value ΔMeY. Further, the output addition ratio α is the addition ratios αYA and αYB.

In the present embodiment, if the difference value is lower than a predetermined first threshold value, which can be set as a multiple to the noise standard deviation σ, then it is determined that the image portion is a background image portion, and the addition ratio α is set to the maximum value of α=1.

Then, where the difference value is within a range of the first threshold value< difference value< second threshold value, it is decided that the image portion cannot be discriminated between a background portion and a moving image pickup object portion. Thus, the addition ratio α is set so as to linearly decrease as the difference value increases as seen in FIG. 47. Further, while the difference value is within the range of the difference value≧ second threshold value, the image portion is determined a moving image pickup object portion, and the addition ratio α is the lowest value of α=0.

If the background coincidence degree of the target block is unknown, then, in order to moderate such a state as a multiple exposure state at a moving image pickup object image portion, the first threshold value is determined taking the safety into consideration and the addition ratio α is restrained generally. In short, if it is known that the image portion is a background image portion, then the first and second threshold values are set to comparatively high values so that image addition may be carried out at an addition ratio as high as possible.

However, if the background coincidence degree is unknown, then it is necessary to take it into consideration to moderate such a state as a multiple exposure state at a moving image pickup object portion with regard to all target blocks. Therefore, usually the first threshold value is set to approximately one time (1σ) the standard deviation σ and the second threshold value is set to approximately three times (3σ) the standard deviation σ as seen from the example of FIG. 47.

On the other hand, in the present embodiment, the background coincidence degree is calculated as a hit ratio β, which is an index value thereto, for each target block as described hereinabove. Accordingly, if the hit ratio β of the background coincidence degree is used, then at a background still image portion, a comparatively high addition ratio can be used for addition.

Figure 48:
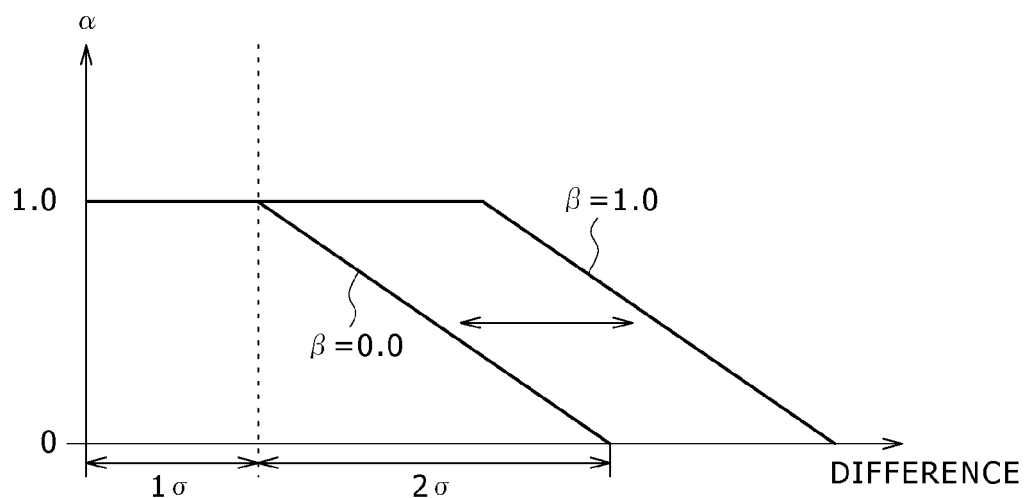

Addition ratio conversion output characteristics by the addition ratio conversion outputting sections 608 and 609 where the hit ratio β is taken into consideration are illustrated in FIG. 48.

In particular, in the example of FIG. 48, the first threshold value for the difference value is varied in response to the hit ratio β. In particular, when the hit ratio β is the lowest and β=0 (this signifies that the image portion is a moving image pickup object portion), the first threshold value is set to one time (1σ) similarly as in the case of the example of FIG. 47. On the other hand, where the hit ratio β is β>0, the first threshold value is varied to a higher value in response to the value of the hit ratio β.

In the example of FIG. 48, the gradient of a gradually decreasing linear line of the addition ratio α where the difference value is higher than the first threshold value is fixed. Accordingly, in the example of FIG. 48, the second threshold value is automatically updated in response to the variation of the first threshold value.

Figure 49:
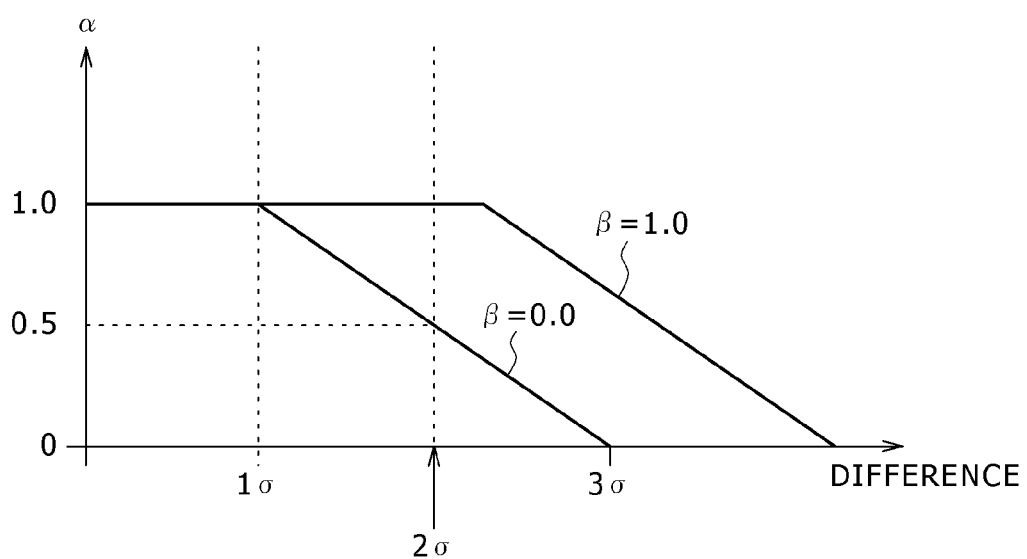

For example, in the case of the example of FIG. 47 wherein the hit ratio β is not taken into consideration (β=0), where the difference value is 2σ, the addition ratio α is always 0.5 as seen in FIG. 49. In contrast, where the hit ratio is taken into consideration, in a background still image portion in which the hit ratio β is β=1.0, the addition ratio α is α=1 as seen in FIG. 49, and the highest addition ratio is used for addition.

Since, in a background still image portion, a comparatively high addition ratio α is set in response to the hit ratio β in this manner, an intended noise reduction effect is achieved. Meanwhile, since, in a moving image pickup object portion, the addition ratio α is restrained to a low value in response to the hit ratio β, the effect that the state of multiple exposure is moderated can be maintained.

It is to be noted that, while, in the example described above, only the first threshold value is varied in response to the hit ratio β and the gradient of the gradually decreasing linear line of the addition ratio α where the difference value is higher than the first threshold value is fixed, also the second threshold value may be varied in response to the hit ratio to vary also the gradient of the gradually decreasing linear line.

Now, contribution of the addition adjusting gain GA to the addition ratio conversion outputting sections 608 and 609 is described.

The addition adjusting gain GA is a parameter for further variably controlling the addition ratio α calculated in such a manner as described above. As described hereinabove, the addition adjusting gain GA is set the user or set in response to the brightness of the image in response to image pickup conditions. For example, where addition adjusting gain GA is set by the user, if it is intended to achieve a higher noise reduction effect by noise reduction addition, then the addition adjusting gain GA is increased. Consequently, the addition ratio α calculated in such a manner as described above is variably controlled to a value corresponding to the addition adjusting gain GA.

FIG. 50 illustrates a relationship among the addition adjusting gain GA, hit ratio β and addition ratio α in the addition ratio conversion outputting sections 608 and 609. In FIG. 50, the addition ratio α is represented as a value determined based on the reference addition ratio αo which is an addition ratio where the hit ratio β is β=0.

In the example of FIG. 50, the addition adjusting gain GA can be variably set to four different values of GA=0, GA=1, GA=2 and GA=3 by the user or in response to image pickup conditions. Also the hit ratio β is set to four different values of β=0, β=0.25, β=0.5 and β=1.0.

Then, while the addition ratio α is set as a value obtained by multiplying the reference addition ratio αo by a coefficient K (K≧1), the coefficient k is a multiple determined in response to the combination of the addition adjusting gain GA and the hit ratio β.

The addition ratio conversion outputting section 608 calculates and outputs the output addition ratio αYA based on the pixel difference of the luminance component from the pixel difference absolute value ΔPxY, noise standard deviation σY, hit ratio β and gain GA. Further, the addition ratio conversion outputting section 609 calculates and outputs the output hit ratio βYB based on the average difference of the luminance component from the average difference absolute value ΔMeY, noise standard deviation σY, hit ratio β and gain GA.

As regards the color difference signal component, the average difference is not calculated, but only the pixel difference absolute value is calculated, and an addition ratio based on the color difference component is calculated similarly to the luminance component described hereinabove.

FIG. 45 shows the processing section configured to the color difference component of the addition ratio calculation section 21. An addition ratio calculation process for the color difference components is described with reference to FIG. 45.

In particular, color difference data Cbtg of blue from within the data TGv of the target image is supplied to a difference absolute value calculation section 623 through a low-pass filter 621. Meanwhile, color difference data Cbmc of blue from within the data MCv of the motion compensation image is supplied to the difference absolute value calculation section 623 through a low-pass filter 622. The difference absolute value calculation section 623 calculates a pixel difference absolute value ΔPxCb between the color difference data Cbtg and the color difference data Cbmc for each pixel and supplies the calculated pixel difference absolute value ΔPxCb to an addition ratio conversion outputting section 625.

Similarly as in the case of the luminance component, the addition ratio calculation section 21 includes a noise model memory 624 for the color difference component of blue of the pixel value, and values of the noise standard deviation σ of the color difference component value of blue of the pixel value are calculated and stored in advance in the noise model memory 624. Similarly as in the case of the luminance component, a plurality of noise models corresponding to the illuminance Lx of the image are stored in the noise model memory 624.

Then, the illuminance Lx for each target block and the color difference data Cbtg of the data TGv passing through the low-pass filter 621 are supplied to the noise model memory 624. Consequently, a noise standard deviation σCb which depends upon the illuminance Lx and the color difference data Cbtg is obtained from the noise model memory 624 and supplied to the addition ratio conversion outputting section 625.

Further, the hit ratio β from the motion vector calculation section 15 and the gain GA from the outside are supplied to the addition ratio conversion outputting section 625.

The addition ratio conversion outputting section 625 has a configuration similar to that of the addition ratio conversion outputting sections 608 and 609 described hereinabove, and an addition ratio αCb which is based on a combination of the pixel difference absolute value ΔPxCb, noise standard deviation σCb, hit ratio β and gain GA is obtained from the addition ratio conversion outputting section 625.

Similarly, color difference data Crtg of red from within the data TGv of the target image is supplied to a difference absolute value calculation section 633 through a low-pass filter 631. Further, the color difference data Crmc of red from within the data MCv is supplied to the difference absolute value calculation section 633 through a low-pass filter 632. The difference absolute value calculation section 633 calculates a pixel difference absolute value ΔPxCr between the color difference data Crtg and the color difference data Crmc for each pixel and supplies the calculated pixel difference absolute value ΔPxCr to a addition ratio conversion outputting section 635.

Similarly as in the case of the luminance component, a noise model memory 634 for the color difference component of red of the pixel value is provided, and values of the noise standard deviation σ corresponding to the color difference component value of red of the pixel value are calculated and stored in advance in the noise model memory 634. Similarly as in the case of the luminance component, a plurality of noise levels corresponding to the illuminance Lx of an image are stored in the noise model memory 634.

Then, the illuminance Lx for each target block and the color difference data Crtg of the image data TGv passing through the low-pass filter 631 are supplied to the noise model memory 634. Consequently, a noise standard deviation σCr which depends upon the illuminance Lx and the color difference data Crtg is obtained from the noise model memory 634 and supplied to the addition ratio conversion outputting section 635.

Further, the hit ratio β from the motion vector calculation section 15 and the gain GA from the outside are supplied to the addition ratio conversion outputting section 635.

The addition ratio conversion outputting section 635 has a configuration similar to that of the addition ratio conversion outputting sections 608 and 609 described hereinabove, and an addition ratio αCr which depends upon a combination of the pixel difference absolute value ΔPxCr, noise standard deviation σCr, hit ratio β and gain GA is obtained from the addition ratio conversion outputting section 635.

Further, in the present embodiment, an addition ratio is determined also based on the pixel variance value of the target image. The variance value is determined regarding a noticed pixel or self pixel and, for example, eight pixels in the proximity of and around the noticed pixel. The variance value is determined for each of the luminance component and the color difference component. Then, an addition ratio is calculated from all of the determined variance values.

In particular, as seen in FIG. 44, the luminance data Ytg of the data TGv of the target block is supplied to a spatial variance filter 610 through the low-pass filter 601. Then, variance values VaY, for example, regarding the totaling nine pixels including the noticed pixel or self pixel and eight pixels in the proximity of and around the noticed pixel are obtained from the spatial variance filter 610.

Then, as seen in FIG. 45, the color difference data Cbtg of blue of the data TGv of the target block is supplied to a spatial variance filter 626 through the low-pass filter 621. Then, variance values VaCb regarding totaling nine pixels including the noticed pixel or self pixel and eight pixels in the proximity of and around the noticed pixel are obtained from the spatial variance filter 626.

Further, the color difference data Crtg of red of the data TGv of the target block is supplied to a spatial variance filter 636 through the low-pass filter 631. Then, variance values VaCr regarding totaling nine pixels including the noticed pixel or self pixel and eight pixels in the proximity and around the noticed pixel are obtained from the spatial variance filter 636.

Then, the variance values VaY, VaCb and VaCr are added by an addition section 611 and then supplied to an addition ratio conversion outputting section 612 as seen in FIG. 44. Further, the hit ratio β from the motion vector calculation section 15 and the gain GA from the outside are supplied to the addition ratio conversion outputting section 612.

The addition ratio αC is determined by the addition ratio conversion outputting section 612 in order to suppress the addition ratio where the image of the target block includes a small amount of texture components and exhibit a moderate luminance level variation (in the case of gradation). In an image process wherein an image is divided into blocks as in the present embodiment, a block boundary is made much less conspicuous by an effect of the visual sense of the human being, and particularly it is taken into consideration that this is especially true where the luminance level variation is moderate.

In order to implement the object, basically the addition ratio should be set so as to decrease as the variance value in the block decreases. The addition ratio conversion outputting section 612 in the present embodiment divides, as seen in FIG. 51A wherein the axis of abscissa indicates the variance value and the axis of ordinate indicates the output addition ratio, variance values for each predetermined step width into several steps such that the output addition ratio is determined in response to the variance value of each step.

In the example of FIG. 51A, variance values are divided for each step width of 8 into five steps, and the addition ratio for the variance values of 0 to 7 is set to 0.0; the addition ratio for the variance values of 8 to 15 is set to 0.25; the addition ratio for the variance values of 16 to 23 is set to 0.5; the addition ratio for the variance values of 24 to 31 is set to 0.75; and the addition ratio for the variance values of 32 and more is set to 1.0.

Incidentally, the reason why the boundary between blocks where images are superposed stands out as described above is that the images to be superposed are different from each other. In other words, since the images are not different from each other regarding a background still image portion, there is no necessity to suppress the addition ratio in response to the variance value.

Therefore, in the present embodiment, the addition ratio conversion outputting section 612 controls the step width of the variance value in response to the hit ratio β such that, as the hit ratio β increases, the step width for the variance value decreases. By this control, as regards a background still image portion, reduction of the addition ratio in response to the variance value is suppressed so that the addition can be carried out at an addition ratio as high as possible.

In particular, in the examples of FIGS. 51A to 51C, where the hit ratio β has a low value such as, for example, β=0, the step width for the variance value is set to "8" as seen in FIG. 51A. Then, when the hit ratio β has such a value as, for example, β=0.5, the step width for the variance value is set to "4" as seen in FIG. 51B.

Further, where the hit ratio β is β=1 which indicates the image portion is a background still picture portion, the step width for the variance value is set to "0" as seen in FIG. 51C. In other words, in this instance, reduction of the addition ratio depending upon the variance value is not carried out.

As described hereinabove, the gain GA is supplied also to the addition ratio conversion outputting section 612 so that control of the output addition ratio can be carried out based on the gain GA. In the case of this example, the step width for the variance value is variably controlled depending upon the combination of the gain GA with the hit ratio β.

FIG. 52 illustrates a relationship among the gain GA, hit ratio β and step width in the addition ratio conversion outputting section 612. Also in the example of FIG. 52, the gain GA can be variably set to four different values of GA=0, GA=1, GA=2 and GA=3 by the user or in response to image pickup conditions. Also the hit ratio β is set to four different values of β=0, β=0.25, β=0.5 and β=1.0.

It is to be noted that, in the example of FIG. 52, the step width is set to values which can be implemented by bit shift mathematical operation.

It is to be noted that, while, in the present embodiment, upon calculation of an addition ratio using a variance value, a plurality of steps using a step width are set for variance values as described above with reference to FIGS. 51A to 51C, the variance values may not be divided into a plurality of steps, but linear interpolation may be applied between a plural number of steps. Further, not linear interpolation but quadratic curve interpolation or cubic curve interpolation may be used instead.

In this manner, the addition ratio conversion outputting sections 608, 609, 612, 625 and 635 calculate the addition ratios αYA, αYB, αC, αCb and αCr which are based on the luminance difference value, color difference value, luminance average difference value or variance value and the hit ratio β.

Further, in the present embodiment, the addition ratios αYA, αYB, αC, αCb and αCr are synthesized to obtain an output addition ratio α of the addition ratio calculation section 21. In particular, as seen from FIG. 44, the addition ratios αYA and αYB from the addition ratio conversion outputting sections 608 and 609 are multiplied by a multiplier 613, and a result of the multiplication is supplied to another multiplier 614. Also the addition ratio αCb from the addition ratio conversion outputting section 625 is supplied to the multiplier 614 and multiplied by the result of the multiplication of the multiplier 613 by the multiplier 614.

Then, a result of the multiplication of the multiplier 614 is supplied to a further multiplier 615. Also the addition ratio αCr from the addition ratio conversion outputting section 635 is supplied to the multiplier 615 and multiplied by the result of multiplication of the multiplier 614 by the multiplier 615. Further, a result of the multiplication by the multiplier 614 is supplied to a still further multiplier 616. Also the addition ratio αC from the addition ratio conversion outputting section 612 is supplied to the multiplier 616 and multiplied by the result of the multiplication of the multiplier 615 by the multiplier 616.

As a result, a multiplication result of all of the calculated addition ratios αYA, αYB, αC, αCb and αCr is obtained from the multiplier 616 and outputted as an output addition ratio α of the addition ratio calculation section 21.

In this manner, the addition ratio α is calculated as a value corresponding to the hit ratio β in a unit of a pixel by the addition ratio calculation section 21 and supplied to the addition section 17.

The addition section 17 adds the image data TGv of the target block and the image data MCv of the motion compensation block in a unit of a pixel in response to the addition ratio α for each pixel from the addition ratio calculation section 21. Then, the addition image data from the addition section 17 are recorded through the image memory section 4 and the still picture codec section 18 by the recording and reproduction apparatus section 5.

According to the embodiment described above, since the addition ratio α can be set to a comparatively high value in a still image portion using the hit ratio β which is an index value of the background coincidence degree for each target block, a prominent effect that an image which exhibits a high noise reduction effect can be obtained as a reduced noise image.

Figure 53A:
FIGS. 53 to 58 are diagrammatic view illustrating effects of an embodiment.
Figure 53B:

For example, a reduced noise image originating from such a target image having noise as seen in FIG. 53A and such a reference image as shown in FIG. 53B is considered. It is to be noted that a portion indicated by a circle in each of FIGS. 53A and 53B is a moving image pickup object portion between the target image and the reference image, The two images of this example are formed fully from a background still picture portion other than the moving image pickup object portion.

Figure 54:
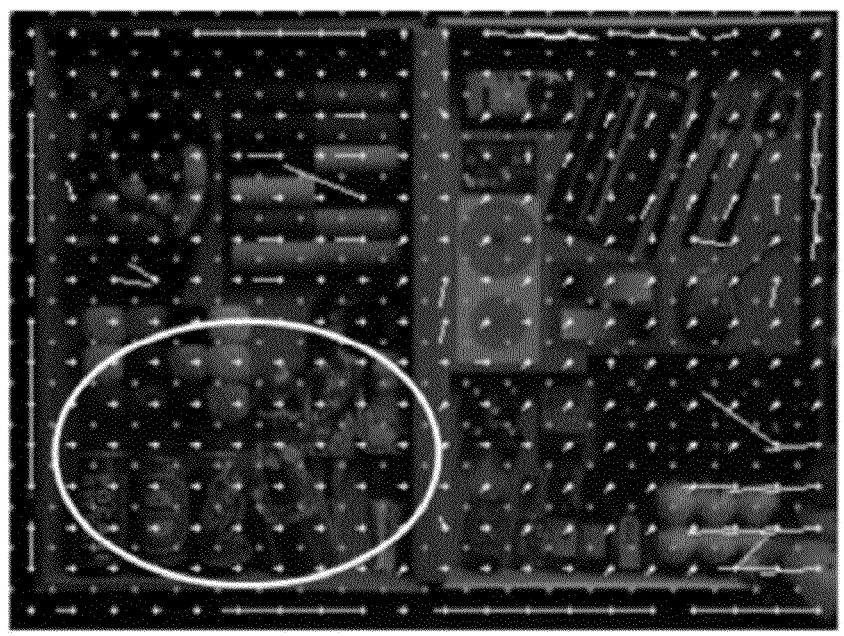

If block matching is carried out for the two images of the example of FIGS. 53A and 53B to determine the local motion vector LMV of each target block and such local motion vectors LMV are indicated, then such an image as shown in FIG. 54 is obtained.

Figure 55:
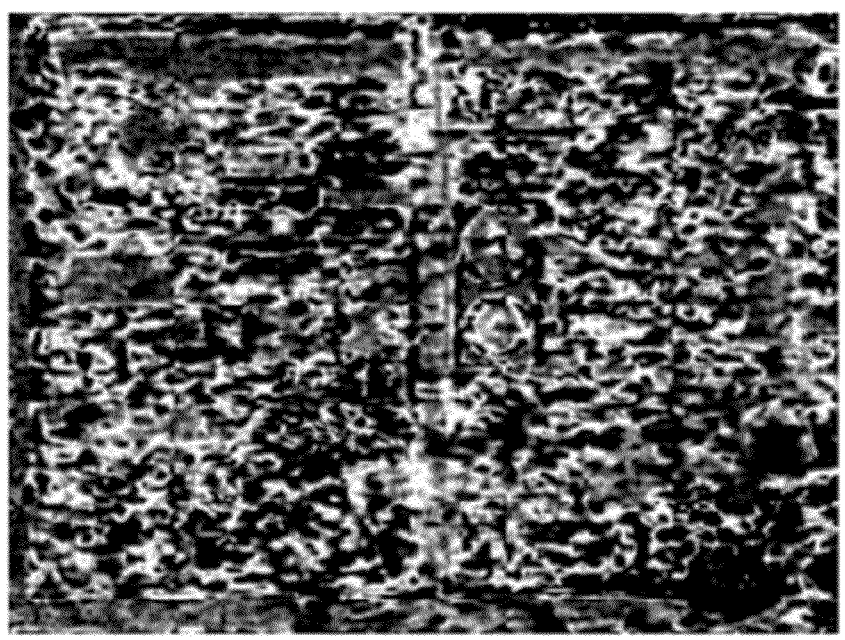

An addition ratio distribution image of a result when such local motion vectors LMV as described above are used to carry out motion compensation from the reference image to carry out decision of the addition ratio without taking such a hit ratio β as described above into consideration is shown as a monochromatic image in FIG. 55. In FIG. 55, the image is shown such that, as the addition ratio increases, the degree of whiteness increases, and as the addition ratio decreases, the degree of blackness increases.

A portion indicated by a circle in FIG. 54 is a background still picture portion, and in the portion, determined local motion vectors LMV are correct. However, since the hit ratio β is not taken into consideration, it can be recognized that, in a corresponding portion in FIG. 55, the addition ratio exhibits lowered values. In other words, it can be recognized that an anticipated noise reduction effect cannot be achieved.

Figure 56A:
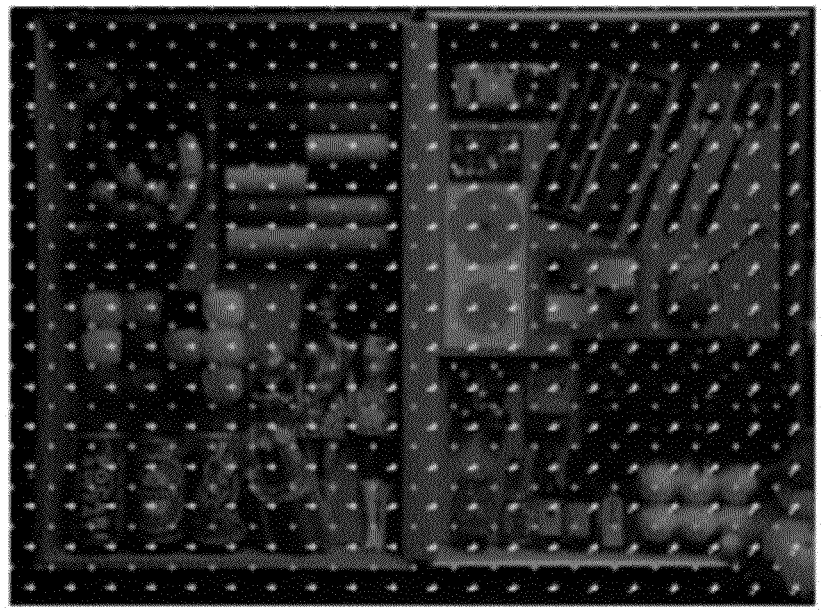

If global motion vectors GMV produced from global motions GM determined with regard to the two images shown in FIGS. 53A and 53B as described hereinabove are shown as an image, then such an image as shown in FIG. 56A is obtained.

Figure 56B:
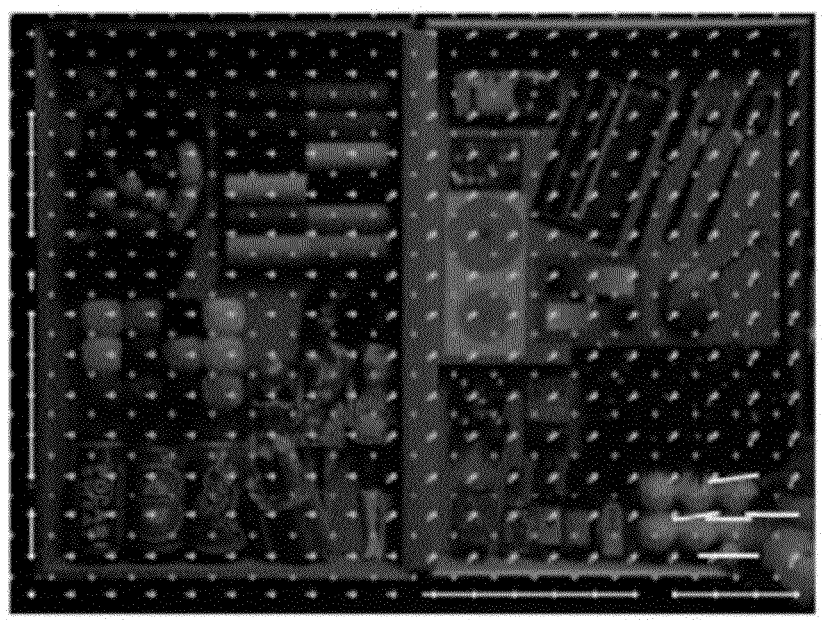

Then, if the coincidence degree between the thus produced global motion vectors GMV and the local motion vectors LMV is checked and motion vectors determined to be outputted to the motion compensation picture production section 16 as a result of the check are indicated as an image, then such an image as shown in FIG. 56B is obtained. Large motion vectors in an image portion at a right lower portion of FIG. 56B correspond to the moving image pickup object portion shown in FIGS. 53A and 53B. As can be seen from FIG. 56, according to the present embodiment, a background still picture portion and a moving image pickup portion are decided in a correctly distinguished state.

Figure 57:

Then, if the hit ratio β calculated when the motion vector of FIG. 56B is produced is illustrated in a corresponding relationship to the image, then such an image as shown in FIG. 57 is obtained. It is to be noted that, in FIG. 57, the coincidence degree between the local motion vector LMV and the global motion vector GMV is indicated as one of binary values of the hit ratio β including β=0 and β=1 by deciding the coincidence degree between two values of coincidence and incoincidence. The white portion is a portion of β=1 and the black portion is a portion of β=0.

Figure 58:
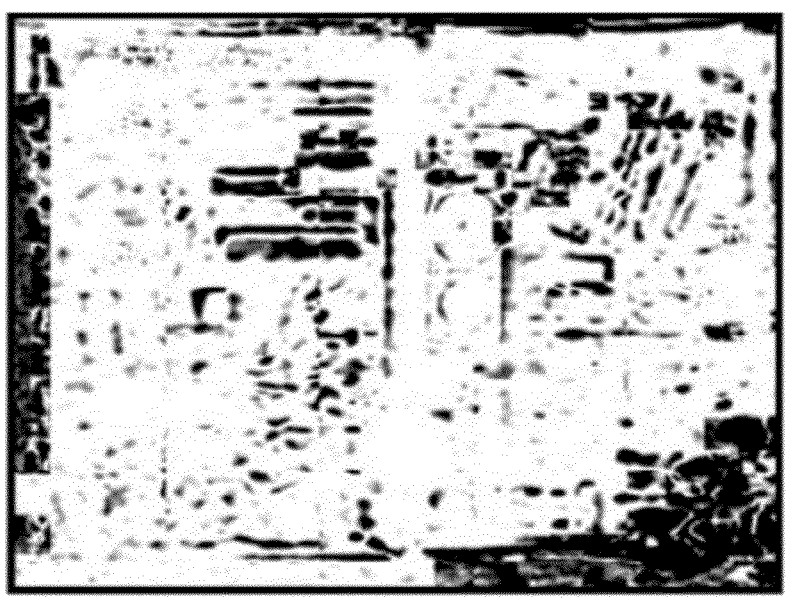

FIG. 58 shows values of the addition ratio α determined by the addition ratio calculation section 21 described above in a corresponding relationship to the image. In FIG. 58, the addition ratio α is indicated such that the values of 0.0 to 1.0 of the addition ratio α are divided into 128 gradations and the addition ratio decreases (α approaches α=0.0) as the color changes from the white to the black.

If FIGS. 54 and 58 are compared with each other, then it can be recognized that, according to the present embodiment, the addition ratio α exhibits a higher value in a background still picture portion. Consequently, with the present embodiment, an intended noise reduction effect is achieved.

It is to be noted that the addition ratio conversion outputting sections 608, 609, 612, 625 and 635 can be configured as a ROM which includes a conversion table which outputs the output addition ratios αYA, αYB, αC, αCb and αCr in response to four parameter inputs described hereinabove.

Second Embodiment

In the first embodiment described above, the hit ratio β is outputted in a unit of a target block. Then, the hit ratio β in a unit of a target block is used to control the addition ratio α. Therefore, the first embodiment has a problem that, although the addition ratio α is calculated in a unit of a pixel, the boundary between blocks of a reduced noise image is liable to stand out.

Therefore, in the second embodiment, the hit ratio of a target block neighboring with a noticed block is referred to carry out an interpolation process so that the hit ratio β calculated in a unit of a target block may vary spatially smoothly.

<First Example of the Interpolation Process of the Hit Ratio β>

In a first example of the interpolation process of the hit ratio β, interpolation of the hit ratio β is carried out in a unit of a target block. FIGS. 59A to 60B illustrate examples of an interpolation process in the case of the first example. It is to be noted that, in FIGS. 59A to 60B, reference character Bk denotes a target block, and the numerical value indicated in each target block Bk indicates a value of the hit ratio β. Here, for the simplified illustration, the hit ratio β calculated has one of two values of β=1.0 and β=0.5.

Figure 59A:
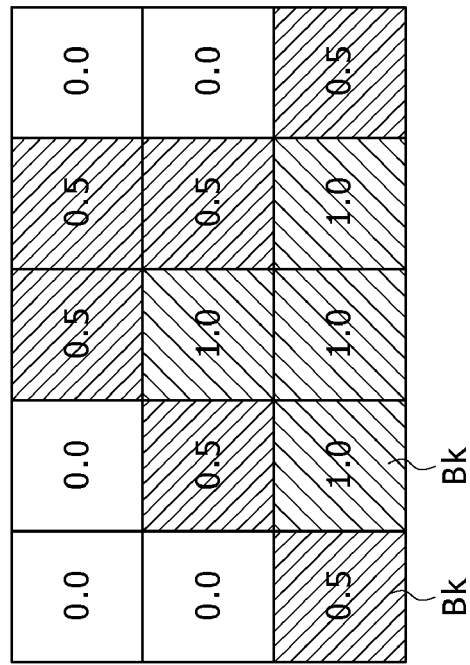
Figure 59B:
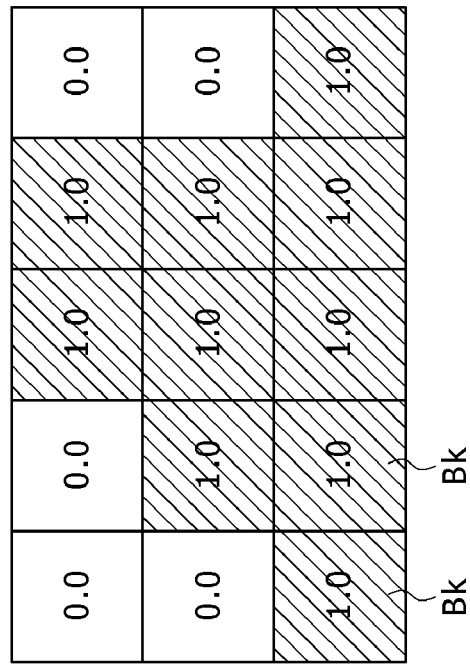

FIGS. 59A and 59B illustrate an example wherein the hit ratio β of the noticed target block Bk is interpolated in the decreasing direction so as to vary spatially smoothly by referring to the hit ratio β of the other target blocks Bk neighboring with the noticed target block Bk. In other words, where the hit ratio β calculated in a unit of a target block Bk has such values as illustrated in FIG. 59A, the hit ratios β of predetermined ones of the target blocks Bk are varied as seen in FIG. 59B by the interpolation process.

In the example of FIGS. 59A and 59B, when the hit ratio β of the noticed target block Bk is β=1.0 and the hit ratio β of the other neighboring target blocks Bk is β=0.0, the noticed target block Bk is determined as a target block of an object of interpolation. Then, the hit ratio β of the target block of the object of interpolation is changed, in the example illustrated, from β=1.0 to β=0.5. Consequently, the hit ratio β in a unit of a target block Bk exhibits a spatially smooth variation as seen in FIG. 59B.

Meanwhile, in the example of FIG. 60, the hit ratio β of the noticed target block Bk is interpolated in the increasing direction so as to vary spatially smoothly by referring to the hit ratio β of the other target blocks Bk neighboring with the noticed target block Bk. In other words, where the hit ratio β calculated in a unit of a target block Bk has such values as illustrated in FIG. 60A, the hit ratios β of predetermined ones of the target blocks Bk are varied as seen in FIG. 60B by the interpolation process.

In the example of FIGS. 60A and 60B, when the hit ratio β of the noticed target block Bk is β=0.0 and the hit ratio β of the other neighboring target blocks Bk is β=1.0, the noticed target block Bk is determined as a target block of an object of interpolation. Then, the hit ratio β of the target block of the object of interpolation is changed from β=0.0 to β=0.5. Consequently, the hit ratio β in a unit of a target block Bk exhibits a spatially smooth variation as seen in FIG. 60B.

Consequently, even if the hit ratio β is calculated in a unit of a target block, the boundary between blocks can be made less conspicuous.

<Second Example of the Interpolation Process of the Hit Ratio β>

In a second example of the interpolation process of the hit ratio β, interpolation of the hit ratio β is carried out in a unit of a sub-block obtained by subdividing a target block Bk. An example of an interpolation process in the second example is illustrated in FIGS. 61A to 61C and 62A to 62C. Referring to FIGS. 61A to 61C and 62A to 62C, reference character Bk denotes a target block, SBk a sub-block obtained by subdividing the target block Bk into four portions or sub-blocks, and SSBk a sub-block obtained by dividing the target block Bk into eight portions or sub-blocks. The numerical value described in each target block Bk or each sub-block indicates a value of the hit ratio β. Also in the present second example, for simplified description, the hit ratio β calculated, that is, the hit ratio β before the interpolation process, assumes one of two values of β=1.0 and β=0.5.

In the example of FIGS. 61A to 61C, the values of the hit ratio β of the other target blocks Bk neighboring with the noticed target block Bk are referred to interpolate the hit ratio β in a decreasing direction of the hit ratio β of the noticed target block Bk so that the hit ratio β may vary spatially smoothly.

In the example of FIGS. 61A and 61B, interpolation in a unit of a sub-block SBk when a target block Bk is divided into four sub-blocks is carried out. In other words, where the hit ratio β calculated in a unit of a target block Bk has such values as illustrated in FIG. 61A, the hit ratios β of the sub-blocks SBk in predetermined ones of the target blocks Bk are varied as seen in FIG. 61B by the interpolation process.

In the example of FIG. 61B, when the hit ratio β of the noticed target block Bk is β=1.0 and the hit ratio β of the other neighboring target blocks Bk is β=0.0, the noticed target block Bk is determined as a target block of an object of interpolation. Then, the hit ratio β of the noticed target block of the object of interpolation is changed to a value lower than β=1.0 in a unit of a sub-block SBk.

In this instance, the hit ratio β not of all of the sub-blocks SBk in the noticed target block Bk is varied to β=0.5 but the hit ratio β only of those sub-blocks SBk which neighbor with the other target blocks Bk whose hit ratio β is β=0.0 is varied to β=0.5. Meanwhile, the hit ratio β of the other sub-blocks in the noticed target block Bk is maintained at β=1.0. In the case of the present second example, the neighboring target blocks Bk include those which neighbor in oblique directions. Accordingly, also the hit ratio β of those sub-blocks SBk whose hit ratio β is β=0.0 in the target blocks Bk adjacent in the oblique directions is varied to β=0.5.

Further, in the example of FIGS. 61A and 61C, interpolation is carried out in a unit of a sub-block SSBk obtained by dividing a target block Bk into eight portions or sub-blocks. In the present example, where the hit ratio β of the noticed target block Bk is β=1.0, in the target block Bk of an object of interpolation, the hit ratio β is varied with a variation width of 0.25 to 0.25, 0.5, 0.75 or 1.0 in a unit of a sub-block SSBk.

In other words, where the hit ratio β calculated in a unit of a target block Bk is such as illustrated in FIG. 61A, the hit ratio β of the sub-blocks SSBk in a predetermined target block Bk is changed as seen in FIG. 61C by the interpolation process.

In the example of FIG. 61C, when the hit ratio β of the noticed target block Bk is β=1.0 and the hit ratio β of the other neighboring target blocks Bk is β=0.0, the noticed target block Bk is determined as a target block of an object of interpolation. Then, the hit ratio β of the noticed target block Bk of the object of interpolation is varied in a unit of a sub-block SSBk.

In this instance, the hit ratio β of the sub-blocks SSBk neighboring with the other target blocks Bk whose hit ratio β is β=0.0 is varied to β=0.25. Then, the hit ratio β of the sub-blocks neighboring with the sub-blocks SSBk in the noticed target block Bk whose hit ratio β is varied to β=0.25 is varied to β=0.5.

Meanwhile, the hit ratio β of the sub-blocks SSBk neighboring with the other target blocks Bk whose hit ratio β is β=1.0 in the target block Bk of the object of interpolation is left as β=1.0. Then, the hit ratio β of the sub-blocks neighboring with the sub-blocks SSBk whose hit ratio β remains β=1.0 in the noticed target block Bk is varied to β=0.75. Further, the hit ratio β of the sub-blocks neighboring with the sub-blocks SSBk whose hit ratio β is varied to β=0.75 in the noticed target block Bk is varied to β=0.5.

Also in the case of the present example, the neighboring target blocks Bk include those which neighbor in oblique directions.

Consequently, the hit ratio β in a unit of a target block Bk exhibits a spatially smooth variation as seen from FIG. 61B or 61C.

Figure 62A:
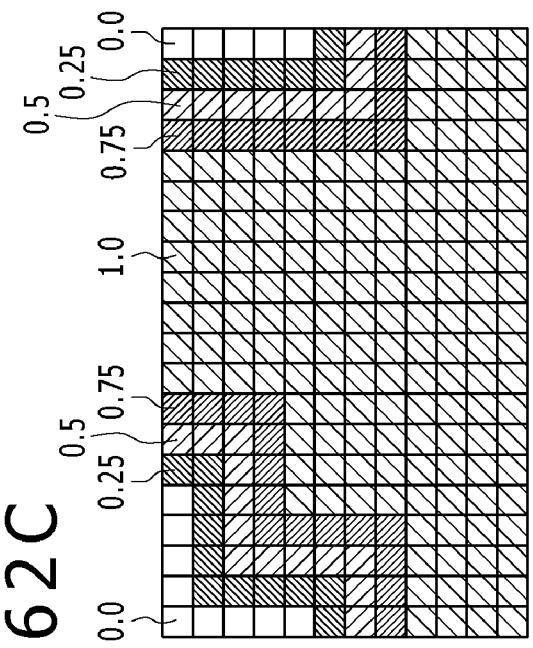
Figure 62B:
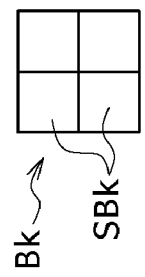
Figure 62C:
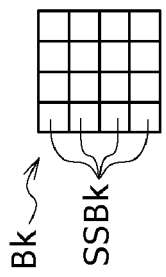

Referring now to FIGS. 62A to 62C, the example illustrates interpolation in an increasing direction of the hit ratio β of the noticed target block Bk by referring to the hit ratio β of the other target blocks Bk neighboring with the noticed target block Bk so that the hit ratio β may exhibit a spatially smooth variation.

In the example illustrated in FIGS. 62A and 62B, interpolation is carried out in a unit of a sub-block SBk obtained by dividing a target block Bk into four portions or sub-blocks. In particular, where the hit ratio β calculated in a unit of a target block Bk has such values as illustrated in FIG. 62A, the hit ratios β of the sub-blocks SBk in predetermined ones of the target blocks Bk are varied as seen in FIG. 62B by the interpolation process.

In the example of FIG. 62B, when the hit ratio β of the noticed target block Bk is β=0.0 and the hit ratio β of the other neighboring target blocks Bk is β=1.0, the noticed target block Bk is determined as a target block of an object of interpolation. Then, the hit ratio β of the noticed target block of the object of interpolation is changed to a value higher than β=0.0 in a unit of a sub-block SBk.

In this instance, the hit ratio β not of all of the sub-blocks SBk in the noticed target block Bk is varied to β=0.5 but the hit ratio β only of those sub-blocks SBk which neighbor with the other target blocks Bk whose hit ratio β is β=1.0 is varied to β=0.5. Meanwhile, the hit ratio 30 of the other sub-blocks in the noticed target block Bk is maintained at β=0.0. In the case of the present second example, the neighboring target blocks Bk include those which neighbor in oblique directions. Accordingly, also the hit ratio β of those sub-blocks SBk whose hit ratio β is β=0.0 in the target blocks Bk adjacent in the oblique directions is varied to β=0.5.

Further, in the example of FIGS. 62A and 62C, interpolation is carried out in a unit of a sub-block SSBk obtained by dividing a target block Bk into eight portions or sub-blocks. In the present example, where the hit ratio 30 of the noticed target block Bk is β=0.0, in the target block Bk of an object of interpolation, the hit ratio β is varied with a variation width of 0.25 to 0.25, 0.5, 0.75 or 1.0 in a unit of a sub-block SSBk.

In other words, where the hit ratio β calculated in a unit of a target block Bk is such as illustrated in FIG. 62A, the hit ratio 30 of the sub-blocks SSBk in a predetermined target block Bk is changed as seen in FIG. 62C by the interpolation process.

In the example of FIG. 62C, when the hit ratio 30 of the noticed target block Bk is β=0.0 and the hit ratio 30 of the other neighboring target blocks Bk is β=1.0, the noticed target block Bk is determined as a target block of an object of interpolation. Then, the hit ratio β of the noticed target block Bk of the object of interpolation is varied in a unit of a sub-block SSBk.

In this instance, the hit ratio β of the sub-blocks SSBk neighboring with the other target blocks Bk whose hit ratio β is β=1.0 is varied to β=0.75. Then, the hit ratio β of the sub-blocks neighboring with the sub-blocks SSBk in the noticed target block Bk whose hit ratio β is varied to β=0.75 is varied to β=0.5.

Meanwhile, the hit ratio β of the sub-blocks SSBk neighboring with the other target blocks Bk whose hit ratio β is β=0.0 in the target block Bk of the object of interpolation is left as β=0.0. Then, the hit ratio β of the sub-blocks neighboring with the sub-blocks SSBk whose hit ratio β remains β=0.0 in the noticed target block Bk is varied to β=0.25. Further, the hit ratio β of the sub-blocks neighboring with the sub-blocks SSBk whose hit ratio β is varied to β=0.25 in the noticed target block Bk is varied to β=0.5.

Also in the case of the present example, the neighboring target blocks Bk include those which neighbor in oblique directions.

Consequently, the hit ratio β in a unit of a target block Bk exhibits a spatially smooth variation as seen from FIG. 62B or 62C.

Third Embodiment

In the first embodiment described above, the local motion vector calculation section 154 carries out layered block matching to calculate a local motion vector LMV on the base plane. Then, the motion vector reliability index value calculation section 156 calculates the reliability index value Ft to the local motion vector LMV of the base plane.

Further, the global motion calculation section 157 produces the reliability index values Ft of the local motion vectors LMV of the base plane and uses the reliability index value Ft to extract those local motion vectors LMV which have high reliability. Then, the global motion calculation section 157 uses the local motion vectors LMV having high reliability to calculate the global motion GM and then calculates global motion vector GMV from the global motion GM.

Incidentally, by multiplying the reduction plane motion vector MVs and the intermediate plane motion vector MVm by a reciprocal number to the image reduction ratio to the base plane, the base plane motion vector MVb can be obtained. Therefore, in order to calculate the global motion GM, it is possible not to determine the base plane motion vector MVb but to determine the global motion GM from the reduction plane motion vector MVs or the intermediate plane motion vector MVm.

For example, in order to determine the global motion vector GM from the reduction plane motion vector MVs, the local motion vector calculation section 154 first calculates the local motion vector LMV of the base plane, that is, the reduction plane motion vector MVs.

Then, the motion vector reliability index value calculation section 156 calculates the reliability index Ft to the calculated reduction plane motion vector MVs. Further, the global motion calculation section 157 extracts those local motion vectors LMV having high reliability using the reliability index values Ft to the local motion vectors LMV of the reduction plane. Then, the global motion calculation section 157 uses the local motion vectors LMV having high reliability to calculate the global motion GM and the global motion vector GMV.

Also where the global motion GM is used, it can be calculated similarly from the intermediate plane motion vector MVm obtained by carrying out block matching in the layers up to the intermediate plane. However, the offset value OFS or the gain g where correction regarding the SAD value at the position of the global motion vector GMV is to be carried out can be set suitably in accordance with the individual layers.

The determination of the global motion GM and the global motion vector GMV using local motion vectors of the reduction plane or the intermediate plane in this manner provides the following merits.

The first merit resides in that, since a low-pass filter is applied for production of the reduction plane or the intermediate plane as described above, noise is removed, and as a result, resulting local motion vectors are less likely to be influenced by noise.

The second merit resides in that, since the number of target blocks is reduced in the reduction plane or the intermediate plane, the number of local motion vectors decreases and the mathematic operation cost decreases and besides, since the time required for the processing is reduced, the processing can be carried out at a higher speed.

The matching process block units of the reduction plane, intermediate plane and base plane normally have an equal size from restrictions of hardware as in the example described above. Therefore, the number of target blocks of the reduction plane having a small picture size, that is, the number of local motion vectors, relatively decreases in comparison with an alternative case wherein block matching is carried out only on the base plane.

Then, where the global motion and the global motion vector GMV are determined from reduction plane motion vectors, the motion vector detection process on the intermediate plane and the base plane can be omitted. On the other hand, where the global motion and the global motion vector GMV are determined from intermediate plane motion vectors, the motion vector detection process on the base plane can be omitted. Accordingly, increase of the processing speed can be anticipated.

Particularly where reduction plane motion vectors MVs are used to determine the global motion GM and the global motion vector GMV, the merit is significant.

Figure 63:
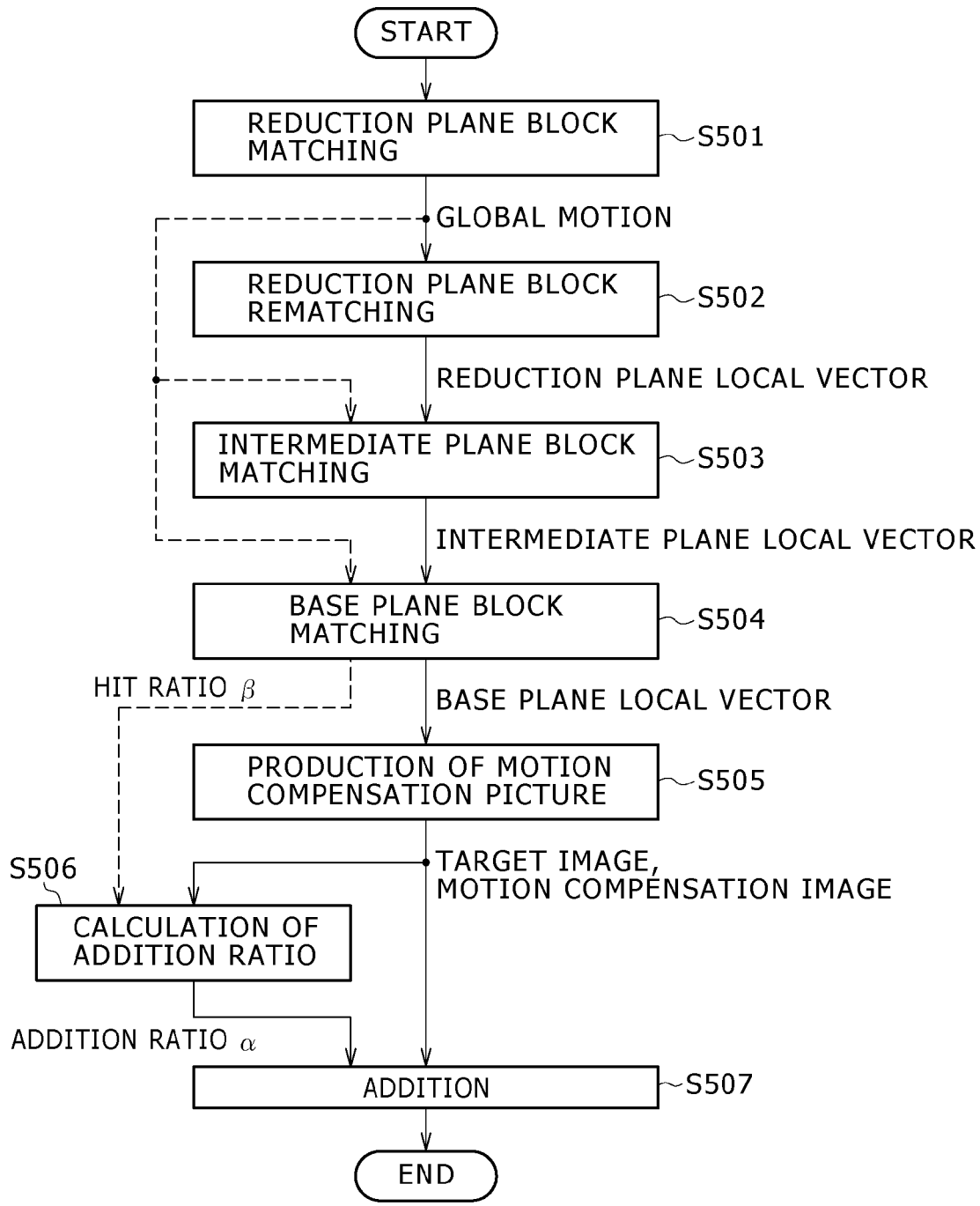
FIG. 63 is a flow chart illustrating processing operation by an image processing apparatus according to a second embodiment.

FIG. 63 illustrates a general flow of a process where the global motion and the global motion vector GMV are determined using the reduction plane motion vector MVs and are compared with the local motion vector LMV on the base plane.

First at step S501, the motion vector calculation section 15 carries out reduction plane block matching to determine the local motion vector LMVs for each target block on the reduction screen. Then, the motion vector calculation section 15 evaluates the reliability of the reduction plane local motion vector LMVs of each target block and only uses those of the reduction plane local motion vectors LMVs which have high reliability to calculate the global motion GM. Then, the motion vector calculation section 15 calculates the global motion vector GMV from the calculated global motion GM.

Then at step S502, the motion vector calculation section 15 carries out reduction plane block rematching for layered block matching to recalculate the reduction plane local motion vectors LMVs.

Then at step S503, the motion vector calculation section 15 determines a search range for the reference blocks corresponding to the target block on the intermediate plane from the reduction plane local motion vectors LMVs and carries out intermediate plane block matching. Then, the motion vector calculation section 15 calculates the intermediate plane local motion vectors LMVm.

Then at step S504, the motion vector calculation section 15 determines a search range for the reference blocks corresponding to the target block on the base plane from the intermediate plane local motion vectors LMVs and carries out base plane block matching. Then, the motion vector calculation section 15 calculates the base plane local motion vectors LMVb. Then, the motion vector calculation section 15 uses the base plane local motion vectors LMVb and the global motion vectors GMV calculated at step S501 to carry out evaluation and decision of the background coincidence degree described hereinabove for each target block. Then, the motion vector calculation section 15 determines the hit ratio β and detects the noise reduction processing motion vectors MVnr based on the evaluation decision.

Then at step S505, the motion compensation picture production section 16 uses the noise reduction processing motion vectors MVnr to produce a motion compensation picture in a unit of a block from the image data of the reference frames.

Then at step S506, the addition ratio calculation section 21 calculates the addition ratio α in a unit of a pixel or in a unit of a target block based on the hit ratio β calculated at step S504. Then at step S507, the addition section 17 adds the motion compensation image produced at step S505 and the target image at the addition ratio α calculated at step S506 in a unit of a block to produce a reduced noise image.

It is to be noted that, in the description of the processing flow of FIG. 63 described above, the global motion GM and the global motion vector GMV determined upon motion vector detection by the first time block matching are applied only to the base plane motion vector in layered block rematching.

However, also on the reduction plane and/or the intermediate plane of the layered block rematching, background coincidence degree evaluation of a target block may be carried out using the global motion vector GMV, local motion vectors LMVs and intermediate plane local motion vectors LMVs. In this instance, the noise reduction processing motion vector MVnr as a result of the background coincidence degree evaluation may be used as a motion vector output regarding each target block on the reduction plane or the intermediate plane.

This makes it possible to acquire the motion vector, that is, the local motion vector, regarding each target block on the reduction plane or the intermediate plane with a higher degree of accuracy than that in an ordinary case. This similarly applies also to the base plane. Thereupon, the offset value OFS or the gain g is set suitably in accordance with each layer as described hereinabove.

An example of a result of the block matching when processing is carried out in accordance with the processing flow of FIG. 63 and a manner of detected motion vectors is illustrated in FIGS. 64A to 64D. The example of FIGS. 64A to 64D indicates a result of processing when the process described above is applied to the target image and the reference image described hereinabove.

Figure 64B:
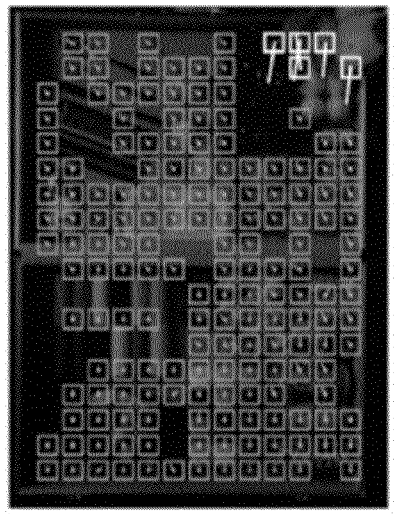
FIGS. 64A to 64D are views illustrating an effect achieved by the image processing apparatus according to the second embodiment.
Figure 64D:
Figure 64A:
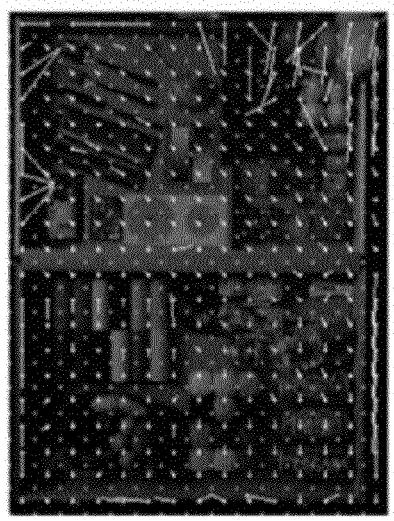

FIG. 64A illustrates a result of detection of the local motion vectors LMVs when the reduction plane block matching is carried out for the target image and the reference image.

FIG. 64B illustrates reduction plane local motion vector LMVs determined to have high reliability as a result of reliability evaluation carried out for the reduction plane local motion vector LMVs and target blocks of the reduction plane local motion vector LMVs. It is to be noted that the emphasized blocks at a right corner portion in FIG. 64B are moving image pickup object portions, which have a high local motion vector LMVs.

Figure 64C:
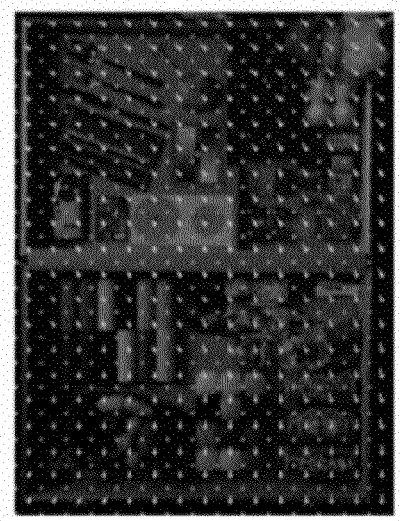

FIG. 64C illustrates the global motion vectors GMV of the target blocks calculated based on the global motion GM calculated from the base plane local motion vectors LMVb. Further, FIG. 64D illustrates noise reduction processing motion vectors MVnr detected by evaluation of the background portion and the moving image pickup object portions through motion vector detection carried out again.

From FIG. 64D, a state wherein the motion vectors in the background portion are arranged orderly as global motion vectors GMV can be recognized.

It is to be noted that, in FIG. 64D, a large motion vector at a right lower portion is that of a moving image pickup object block determined, in the evaluation decision using the local motion vectors LMV and the global motion vector GMV, as a moving image pickup object from which the global motion vector GMV is not outputted as a noise reduction processing motion vector. Meanwhile, a vector which is blank inside indicates a block with regard to which a reference vector which coincides with the global motion vector GMV does not exist in the effective pixel region within the search range.

FIGS. 64A to 64D are prepared in order to indicate an effect so as to be recognized readily, and actually the target block size is smaller. It is more effective to produce the hit ratio β in a unit of a smaller block as described hereinabove.

However, in the case of an application wherein a moving image pickup object region and a vector in an image are detected in a rough unit and traced, it is preferable to output a noise reduction processing motion vector MVnr based on evaluation carried out using the global motion vector GMV in such a rough unit as seen in FIG. 64D. Thereupon, information of all of the blocks in the screen image is not required, but if importance is attached to the reliability of moving image pickup object detection, then separation of moving image pickup object blocks may be carried out only from those vectors which have high reliability upon the first time motion vector detection as in the case of FIG. 64B.

Enhancement of the Accuracy by an Interpolation Process

Incidentally, since the reduction plane or the intermediate plane is produced by reducing an image of the base plane, it should be taken into consideration that the accuracy of such reduction plane motion vectors or intermediate plane motion vectors is comparatively low.

Therefore, in order to eliminate or moderate the problem of low accuracy, where reduction plane motion vectors or intermediate plane motion vectors are used, an interpolation process is carried out. In particular, an interpolation process is carried out using SAD values of reduction plane reference blocks or intermediate plane reference blocks in the proximity of reduction plane reference block positions or intermediate plane reference block positions indicated by calculated reduction plane motion vectors or calculated intermediate plane motion vectors and position information of the SAD values. By this interpolation process, detection of reduction plane motion vectors or intermediate plane motion vectors of the pixel accuracy can be carried out. The interpolation process is described below taking an interpolation process in the case of the reduction plane as an example.

For example, where block matching is carried out on a reduction plane reduced to 1/4 in both of the horizontal and vertical directions, the reduction plane motion vector is a motion vector of the 4-pixel accuracy. However, it is apparent that, in the base plane reference frame, a base plane motion vector MVb of the 1-pixel accuracy exists in the proximity of a motion vector obtained by increasing the reduction plane motion vector MVs to n times.

Figure 65:
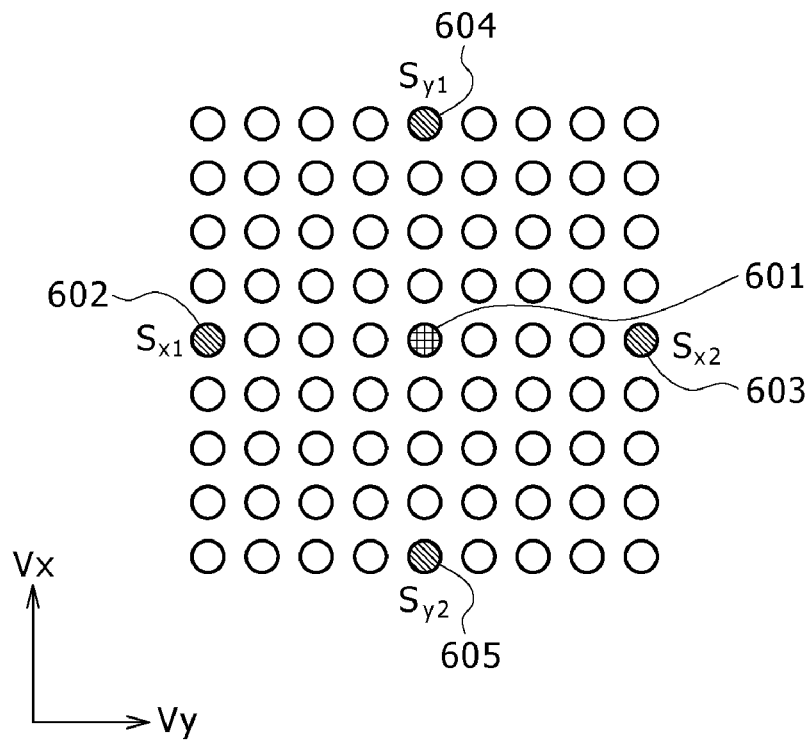
FIGS. 65 and 66 are diagrammatic views illustrating another example of processing of determining local motion vectors detected by the image processing apparatus according to the second embodiment.

Accordingly, it is a possible idea to carry out, where the lowest SAD value 601 on the reduction plane is determined as seen in FIG. 65, an interpolation process using a plurality of SAD values in the proximity of the lowest SAD value 601, for example, using four SAD values 602, 603, 604 and 605 adjacent the lowest SAD value 601 in the upward, downward, leftward and rightward directions, respectively, to detect a motion vector of the 4-pixel accuracy. In this instance, the interpolation magnification required is four times.

For example, it is a possible idea to use a quadratic curve to carry out interpolation for the SAD table to calculate motion vectors of the pixel accuracy from the reduction plane SAD table for which a matching process has been carried out, for example, in a unit of n pixels. In this instance, although not quadratic curve approximate interpolation but linear, cubic or higher-order curve approximate interpolation may be used, in the present example, quadratic curve approximate interpolation is used from the equilibrium between the accuracy and hardware configuration.

In the present quadratic curve approximate interpolation, as seen in FIG. 65, the lowest value 5 min of the SAD value in the reduction plane SAD table indicated by a reduction plane motion vector of the n-pixel accuracy and a plurality of SAD values (hereinafter referred to as neighboring reduction plane SAD values) in the proximity of the position of the lowest value 5 min are used. In the present example, four neighboring SAD values Sx1, Sx2 and Sy1, Sy2 adjacent the position of the lowest value Smin in the X direction or horizontal direction and the Y direction or vertical direction on the reduction plane, are used.

Figure 66:
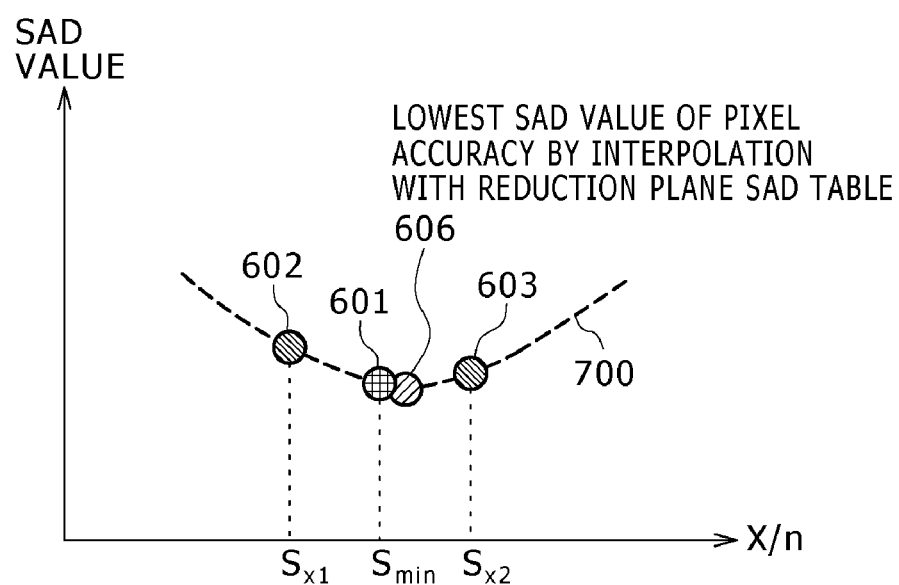

As seen in FIG. 66, in the interpolation in the X direction or horizontal direction, the lowest value 5 min of the reduction plane SAD value and the neighboring reduction plane SAD values Sx1 and Sx2 at the two adjacent points in the X direction or horizontal direction are used to apply a quadratic approximate curve 700. In particular, a quadratic approximate curve 700 which passes the minimum value 5 min and the neighboring reduction plane SAD values Sx1 and Sx2 at two adjacent points in the X direction or horizontal direction is determined. By this, the coordinate at which the quadratic approximate curve 700 assumes a minimum value becomes the X coordinate Vx of the reduction plane motion vector or high-accuracy reduction plane motion vector with which the lowest value SXmin of the SAD value of the pixel accuracy is provided as shown in FIG. 66. The expression for the quadratic curve approximate interpolation at this time is given as the following (expression 19):

$$SXmin = \frac{1}{2} \times (Sx2 - Sx1)/(Sx2 - 2Smin + Sx1) \quad \text{(expression 19)}$$

The X coordinate which is assumed on the SAD table by the lowest value SXmin of the SAD value of the pixel accuracy determined in accordance with the calculation expression (expression 19) becomes the X coordinate Vx at which the reduction plane SAD value of the pixel accuracy assumes the lowest value.

The division in the calculation expression (expression 19) can be implemented by subtraction executed by a plural number of times. If the pixel accuracy to be used is, for example, the accuracy of one fourth the pixel pitch of the reduction plane, then the division described above can be implemented by only two times of subtraction. Therefore, the circuit scale is small and the mathematic operation time is short, and a performance very close to that by cubic curve interpolation which is considerably more complicated than quadratic approximate curve interpolation can be implemented.

Similarly, in the interpolation in the Y direction or vertical direction, the lowest value $S$min of the reduction plane SAD value and the neighboring reduction plane SAD values Sy1 and Sy2 of two points adjacent the lowest value $S$min in the Y direction or vertical direction are used to apply a quadratic approximate curve. Consequently, the Y coordinate at which the quadratic approximate curve assumes a minimum value SYmin becomes a Y coordinate Vy at which the SAD value of the pixel accuracy exhibits the lowest value. The expression for quadratic curve approximate interpolation at this time is given by the following expression (expression 20):

$$SYmin = \frac{1}{2} \times (Sy2 - Sy1)/(Sy2 - 2Smin + Sy1) \quad \text{(expression 20)}$$

By carrying out approximation to a quadratic curve twice for the X direction and the Y direction in this manner, a reduction plane motion vector (Vx, Vy) of high accuracy, that is, of the pixel accuracy, is determined.

While, in the foregoing description, the lowest value of the reduction plane SAD value and reduction plane SAD values of two points adjacent the lowest value in the X direction or horizontal direction and the Y direction or vertical direction are used, the number of reduction plane SAD values adjacent in the different directions may be more than two. Further, in place of application of a quadratic curve in the X direction and the Y direction, an approximate curve may be applied, for example, in oblique directions. Further, an approximate curve may be applied in oblique directions in addition to the X and Y directions.

Figure 67:
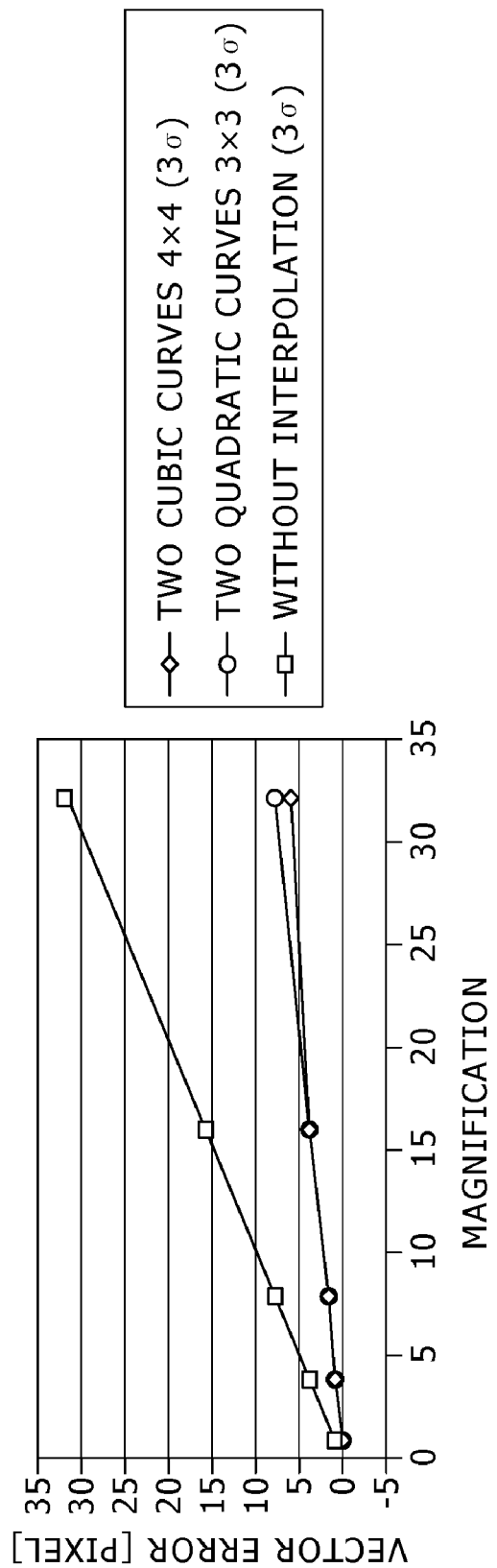
FIG. 67 is a diagrammatic view illustrating a further example of processing of determining local motion vectors detected by the image processing apparatus according to the second embodiment.

It is illustrated in FIG. 67 that, by using such means and procedure as described above, a vector detection result of the pixel accuracy can be obtained from the values of a SAD table of the accuracy of a unit of n pixels. The axis of abscissa of FIG. 67 indicates the interpolation magnification and represents to what times the resolution should be set in a one-dimensional direction. Since the SAD table is two-dimensional, the table area decreases at a ratio of the square. However, since the error by interpolation increases only to a linear degree, the usefulness of the interpolation technique can be recognized.

It is to be noted that the interpolation method described above with reference to FIGS. 65 to 67 can naturally be applied not only to the reduction plane but also to the intermediate plane and the base plane. Where the interpolation technique is applied to the base plane, the local motion vector LMV obtained has accuracy finer than the pixel pitch, that is, sub-pixel accuracy.

Where a local motion vector LMV of the sub pixel accuracy is determined on the base plane, the global motion vector GMV to be outputted as the noise reduction processing motion vector MVnr should be a local motion vector LMV of the sub pixel accuracy of the base plane coincident therewith. In particular, with regard to a block determined as the background, a global motion vector GMV calculated from the global motion GM may be outputted, or a local motion vector LMV coincident with the global motion vector GMV may be outputted. Although either one of the global motion vector GMV and the local motion vector LMV may be outputted, in this instance, it is better to output the local motion vector LMV of higher accuracy as the global motion vector GMV.

On the other hand, where a local motion vector LMV of the sub pixel accuracy is calculated on the base plane, there is a merit that also the motion compensation picture production section 16 can produce an interpolation image in the sub pixel accuracy as a motion compensation picture.

EFFECTS OF THE EMBODIMENTS

As described above, according to the embodiments described above, motion vectors regarding all target blocks in an image can be detected with a high degree of accuracy. Further, it can be decided whether an image portion is a background image portion or a moving image pickup object portion, and a hit ratio which is an index value to such decision can be obtained. Then, the addition ratio of the image can be set to a high value in response to the hit ratio.

Accordingly, detection of a local motion vector of a high degree of accuracy and extraction of a background still picture region and a moving image pickup object portion of an entire image, which are hitherto difficult, can be carried out. Further, in the background still picture region, superposition of images can be carried out at a high addition ratio. Therefore, a reduced noise image which exhibits an intended noise reduction effect can be obtained.

Other Embodiments And Modifications

In the foregoing description, the background/moving image pickup object decision section 150 carries out evaluation decision of the background coincidence degree with regard to all of the target blocks in a target frame.

However, the background/moving image pickup object decision section 150 may determine the global motion by convergence mathematical operation using only those local motion vectors LMV which have high reliability. Those of the local motion vectors LMV having high reliability which are excluded from the convergence mathematical operation of the global motion described hereinabove with reference to FIGS. 31 and 32 are local motion vectors LMV of moving image pickup object blocks with high possibility. Further, those local motion vectors LMV used finally for calculation of a global motion in the convergence mathematical operation of the global motion can be determined as background blocks.

Accordingly, those evaluated blocks which exhibit a local motion vector LMV having high reliability need not be subject to evaluation decision between the background and a moving image pickup object again. Therefore, the block rematching process and the background/moving image pickup object decision process can be omitted for such target blocks of the local motion vector LMV having high reliability as just described. This can reduce the processing time and the mathematical operation amount.

It is to be noted that, in the global motion convergence mathematical operation, the local motion vectors LMV used finally for calculation of the global motion can be decided as background blocks, the hit ratio $\beta$ of them can be decided as $\beta = 1.0$.

Then, when the hit ratio $\beta$ is 1.0, the addition ratio $\alpha$ between the target block and the compensation picture block is set to 1.0. By this, positive strong addition is carried out for the background portion, and a high noise reduction effect can be anticipated.

It is to be noted that, while, in the example described above, the motion compensation image is produced through motion compensation in a unit of a target block, since the global motion GM is obtained, it may be produced through motion compensation in a unit of a pixel. In particular, for example, in the case of an image of a target block which exhibits a high background coincidence degree in that the hit ratio $\beta$ thereof is as high as 1.0 or 0.75, a global motion vector is calculated from a global motion for each pixel. Then, the calculated global motion vectors for the individual pixels are used to carry out motion compensation. Since a result of the motion compensation may possibly be coincident with a pixel position, an interpolation process is carried out to produce motion compensation pixels, and a motion compensation picture is produced using the motion compensation pixels.

Where motion compensation is carried out in a unit of a pixel in this manner, it can be expected that a smoother motion interpolation image is obtained.

It is to be noted that, while, in the embodiments described hereinabove, a SAD value is detected as the correlation value, it is a matter of course that the correlation value is not limited to the SAD value.

Further, while, in the embodiments described hereinabove, the motion detection process regarding a still picture and the superposition process of images are carried out such that a plurality of picked up images are fetched into the image memory section 4 and such motion detection and image superposition processes as described above are carried out for the thus fetched plural picked up images. However, a plurality of images of a processing object may otherwise be produced on the real time basis similarly as upon image pickup of moving pictures.

It is to be noted that naturally the image information of an object of detection of a motion vector is not restricted to picked up image information.

Further, in the embodiments described hereinabove, decision of the reliability of a motion vector is carried out based on the motion vector reliability index value. However, in addition to the difference or the ratio between a first maximum value and a second maximum value of the correlation value, a positional difference between a reference vector which assumes the first maximum value of the correlation value and another reference vector which assumes the second maximum value of the correction value may be used to make a decision of the reliability. Further, a third maximum value of the correlation value, a higher order maximum value or values or a positional distribution of reference vectors which assumes such a maximum value or values may be referred to additionally to make a decision of the reliability.

It is to be noted that, in the embodiments described hereinabove, in order to reduce the mathematical operation load when a mathematical operation process of a global motion is carried out, binary values of 0 and 1 are used for the weight coefficient W for the reliability index value to the local motion vector LMV. However, the weight coefficient W obtained by normalization of the reliability index values of the local motion vector LMV and assuming a value, for example, equal to or higher than 0 but equal to or lower than 1 may naturally be used as it is to carry out the mathematical operation process of a global motion.

Further, a global motion may not be calculated by a signal process using affine transformation as in the embodiments described above but may be detected as a displacement applied to an entire image pickup element using an acceleration sensor such as, for example, a gyro. Then, the global motion detected in this manner can be used to determine a global motion vector GMV in a similar manner as described above, and the thus determined global motion vector GMV and the local motion vector LMV may be compared with each other to determine the coincidence degree of them.

In this instance, only one global motion vector GMV determined from the global motion may be compared with the different local motion vectors LMV. Further, it may be decided that the global motion occurs at the position of the center of the image or frame such that the global motion vector GMV of each target block is determined from the global motion with the center position set as the origin coordinate.

Or, the global motion vector GMV for each target block of an image to be superposed may be produced externally. In this instance, the image processing apparatus need not carry out such calculation as described above regarding the global motion vector GMV but may merely acquire the global motion vector GMV from the outside. Outside the image processing apparatus, the global motion vector GMV can be produced by calculation only including such a signal process as described above or by using a sensor such as a gyro and carrying out necessary calculation.

Particular as regards a still image, where consecutively shot images are stored in advance and a noise reduction process is carried out at a later point of time, it is comparatively easy to calculate a global motion and acquire a global motion vector GMV on the outside.

Further, while, in the embodiments described hereinabove, the present application is applied to motion vector detection and background/moving image pickup object decision upon image pickup of a still picture, the present application can naturally be applied also where motion vector detection and background/moving image pickup object decision upon image pickup of moving pictures are carried out.

Figure 68:
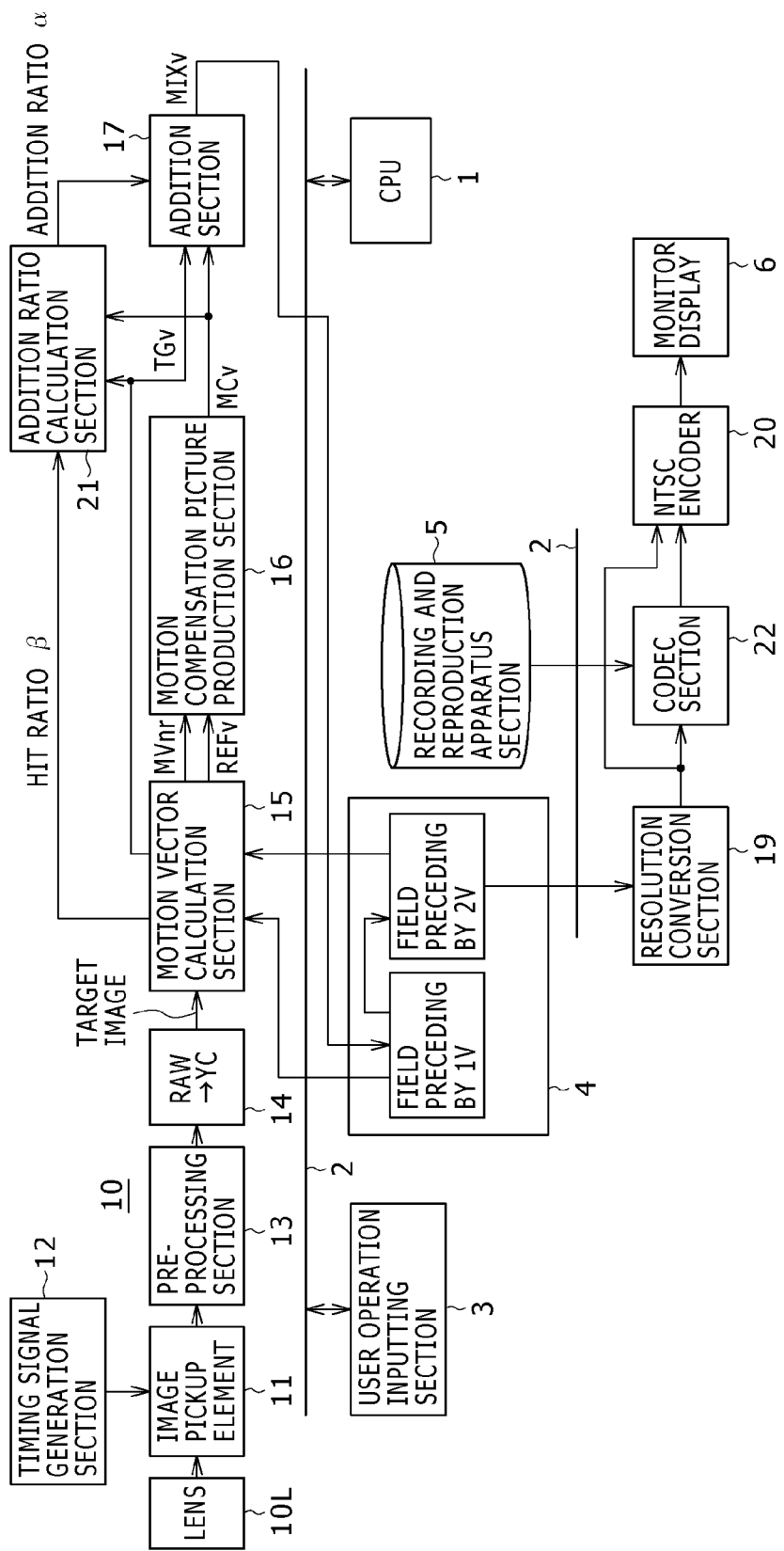
FIG. 68 is a block diagram showing an example of a configuration of image processing apparatus according to another embodiment.

FIG. 68 shows an example of a hardware configuration of an image pickup apparatus which takes moving picture image pickup into consideration. In FIG. 68, the components which are similar to those of the image pickup apparatus shown in FIG. 1 are assigned the same numbers and their overlapping descriptions are omitted.

Further, upon noise reduction processing for moving pictures by the image pickup apparatus of FIG. 68, a picked up image inputted from the image pickup element 11 for each 1V (V is a vertical period for a frame or a field) is used as a target image, and images preceding by 1V and 2V to an output image after addition are used as reference images.

The reason why not only the image preceding by 1V but also the image preceding by 2V are referred to is that, in the case of an interlaced image, a still article exhibits a higher matching rate with the image preceding by 2V.

Also in the system of FIG. 68, a global motion is calculated from local vectors, and hit ratio information is produced depending upon whether or not the motion vector of each block or each pixel in the target image coincides with the global motion to control the addition ratio α at the succeeding stage. The image pickup system thus provides moving pictures which exhibit a high noise reduction effect.

It is to be noted that the codec section 22 in the image pickup apparatus of FIG. 68 is configured so as to carry out compression coding of the MPEG system.

Although the foregoing description is directed to a case wherein image information is picked up image information, it is a matter of course that the image information of an object is not limited to picked up image information.

Further, while, in the embodiments described hereinabove, the addition ratio is calculated in a unit of a pixel, the addition ratio may otherwise be determined in a target block to carry out addition.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. An image processing apparatus, comprising:

local motion vector detection means for dividing a target screen image into a plurality of target blocks, setting, for each of the target blocks, a plurality of reference blocks having a size equal to that of the target blocks in a search range set on a reference screen image different from the target screen image, determining a correlation value between the target block and the reference blocks and detecting a local motion vector of the target block as a displacement of that one of the reference blocks with regard to which the highest value of the correlation value is calculated from the target block;

global motion vector acquisition means for acquiring a global motion vector for each of the target blocks determined from a global motion representative of deformation applied to the entire target screen image;

index value calculation means for calculating, for each of the target blocks, an index value representative of a coincidence degree of the local motion vector detected by said local motion vector detection means and the global motion vector acquired by said global motion vector acquisition means;

motion compensation means for producing a motion compensation image wherein the reference blocks are motion-compensated using the local motion vectors detected by said local motion vector detection means;

addition ratio calculation means for calculating an addition ratio between the image of each of the target blocks and the corresponding motion compensation image based on the corresponding index value calculated by said index value calculation means, wherein the addition ratio represents a ratio of the corresponding motion compensation image to be added to the image of the target block, and the addition ratio for a target block representing a moving image pickup object portion is set lower than an addition ratio for a target block representing a stationary picture portion based on the corresponding index value calculated by the index value calculation means; and addition means for adding the images of the target blocks and the corresponding motion compensation images with the respective addition ratios calculated by said addition ratio calculation means.

2. The image processing apparatus according to claim 1, further comprising global motion calculation means for calculating the global motion representative of the deformation applied to the entire target screen image from a plurality of local motion vectors for each of the target blocks which are selected based on a reliability index value of each local motion vector, wherein said global motion vector acquisition means calculates the global motion vector for each of the target blocks from the global motion calculated by said global motion calculation means.

3. The image processing apparatus according to claim 1, further comprising means for acquiring the global motion representative of the deformation applied to the entire target screen image from the outside, wherein said global motion vector acquisition means including means for calculating the global motion vector for each of the target blocks from the acquired global motion.

4. The image processing apparatus according to claim 1, wherein said global motion vector acquisition means includes means for acquiring the global motion vector for each of the target blocks from the outside.

5. The image processing apparatus according to claim 1, wherein said addition ratio calculation means calculates the addition ratio based on a difference between the image of the target block and the motion compensation image and the index value.

6. The image processing apparatus according to claim 5, wherein said addition ratio calculation means calculates the value of the addition ratio in a unit of a pixel.

7. The image processing apparatus according to claim 1, further comprising index value correction means for correcting the index value for each of the target blocks calculated by said index value calculation means in response to the index values of neighboring ones of the target blocks so that the index values of the target blocks may exhibit a spatially smooth variation.

8. The image processing apparatus according to claim 1, further comprising index value correction means for subdividing the target blocks and correcting the index value for each of the target blocks calculated by said index value calculation means in response to the index values of neighboring ones of the target blocks so that the index values may exhibit a spatially smooth variation in a unit of a subdivided block of the target blocks.

9. An image processing method, comprising:

dividing a target screen image into a plurality of target blocks, setting, for each of the target blocks, a plurality of reference blocks having a size equal to that of the target blocks in a search range set on a reference screen image different from the target screen image, determining a correlation value between the target block and the reference blocks and detecting a local motion vector of the target block as a displacement of that one of the reference blocks with regard to which the highest value of the correlation value is calculated from the target block;

acquiring a global motion vector for each of the target blocks determined from a global motion representative of deformation applied to the entire target screen image;

calculating, for each of the target blocks, an index value representative of a coincidence degree of the local motion vector detected at the local motion vector detection step and the global motion vector acquired by at the global motion vector acquisition step;

producing a motion compensation image wherein the reference blocks are motion-compensated using the local motion vectors detected at the local motion vector detection step;

calculating an addition ratio between the image of each of the target blocks and the corresponding motion compensation image based on the corresponding index value calculated at the index value calculation step, wherein the addition ratio represents a ratio of the corresponding motion compensation image to be added to the image of the target block, and the addition ratio for a target block representing a moving image pickup object portion is set lower than an addition ratio for a target block representing a stationary picture portion based on the corresponding index value; and adding the images of the target blocks and the corresponding motion compensation images with the respective addition ratios calculated at the addition ratio calculation step.

10. An image processing apparatus, comprising:

a local motion vector detection section configured to divide a target screen image into a plurality of target blocks, set, for each of the target blocks, a plurality of reference blocks having a size equal to that of the target blocks in a search range set on a reference screen image different from the target screen image, determine a correlation value between the target block and the reference blocks and detect a local motion vector of the target block as a displacement of that one of the reference blocks with regard to which the highest value of the correlation value is calculated from the target block;

a global motion vector acquisition section configured to acquire a global motion vector for each of the target blocks determined from a global motion representative of deformation applied to the entire target screen image;

an index value calculation section configured to calculate, for each of the target blocks, a coincidence degree of the local motion vector detected by said local motion vector detection section and the global motion vector acquired by said global motion vector acquisition section;

a motion compensation configured to produce a motion compensation image wherein the reference blocks are motion-compensated using the local motion vectors detected by said local motion vector detection section;

an addition ratio calculation section configured to calculate an addition ratio between the image of each of the target blocks and the corresponding motion compensation image based on the corresponding index value calculated by said index value calculation section, wherein the addition ratio represents a ratio of the corresponding motion compensation image to be added to the image of the target block, and the addition ratio for a target block representing a moving image pickup object portion is set lower than an addition ratio for a target block representing a stationary picture portion based on the corresponding index value calculated by the index value calculation section; and an addition section configured to add the images of the target blocks and the corresponding motion compensation images with the respective addition ratios calculated by said addition ratio calculation section.

11. The image processing apparatus according to claim 1, wherein the addition value and the corresponding index value are different values.

\* \* \* \* \*